(12) United States Patent
Schulte, Jr. et al.

(10) Patent No.: US 7,520,391 B2
(45) Date of Patent: Apr. 21, 2009

(54) SCREEN ASSEMBLY FOR VIBRATORY SEPARATOR

(75) Inventors: David L. Schulte, Jr., Willis, TX (US); Thomas C. Adams, Hockley, TX (US); Kerry Ward, Cypress, TX (US); Kenneth Wayne Seyffert, Houston, TX (US); Charles N. Grichar, Houston, TX (US); Vincent D. Leone, Spring, TX (US); Jeffrey E. Walker, Lafayette, LA (US); David W. Largent, Cleveland, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 11/810,543

(22) Filed: Jun. 6, 2007

(65) Prior Publication Data
US 2008/0029442 A1    Feb. 7, 2008

Related U.S. Application Data

(60) Division of application No. 10/429,233, filed on May 2, 2003, now abandoned, and a continuation-in-part of application No. 10/057,755, filed on Jan. 23, 2002, now Pat. No. 6,769,550, which is a continuation-in-part of application No. 10/050,690, filed on Jan. 16, 2002, now abandoned, and a continuation-in-part of application No. 10/053,350, filed on Jan. 16, 2002, now Pat. No. 6,662,952, and a continuation-in-part of application No. 10/037,474, filed on Oct. 19, 2001, now Pat. No. 6,669,985, and a continuation-in-part of application No. 10/087,025, filed on Oct. 19, 2001, now Pat. No. 6,736,270, which is a continuation-in-part of application No. 09/517,212, filed on Mar. 2, 2000, now Pat. No. 6,565,698, and a continuation-in-part of application No. 09/454,722, filed on Dec. 4, 1999, now abandoned.

(51) Int. Cl.
B07B 1/49        (2006.01)
(52) U.S. Cl. .................................. 209/412; 209/405
(58) Field of Classification Search ................ 209/404, 209/405, 412
See application file for complete search history.

(56) References Cited

U.S. PATENT DOCUMENTS 40,242 A    10/1863    Capell (Continued)

FOREIGN PATENT DOCUMENTS

DE        199 31 258 A1    3/2000

(Continued)

OTHER PUBLICATIONS

Derrick Pyramid Screens, Derrick Equipment Company, 2 pp., Apr. 1993.
Derrick Products; Flo-Line Cleaner 500 Series, 2 pp., 2002.
Derrick Pyramid Screens 3 Dimensional Screen Technology, Derrick Corportation, 4 pp., Jul. 1994.

(Continued)

Primary Examiner—Patrick H Mackey
Assistant Examiner—Mark Hageman
(74) Attorney, Agent, or Firm—Guy McClung

(57) ABSTRACT

A mount for a screen assembly, a screen assembly with such a mount, and a vibratory separator (e.g., a shale shaker) with such a screen assembly; the mount in certain aspects including a body with an inwardly projecting handle apparatus accessible when the screen assembly with such a mount is located in operation position on a mount structure of a vibratory separator.

20 Claims, 33 Drawing Sheets

U.S. PATENT DOCUMENTS

| | | |
|---|---|---|
| 236,416 A | 1/1881 | Bourne |
| 246,144 A | 8/1881 | Koeler |
| 268,491 A | 12/1882 | Hubbell |
| 275,190 A | 4/1883 | Gilbert |
| 275,340 A | 4/1883 | Kimball |
| 500,302 A | 6/1893 | Stoecket et al. |
| 516,673 A | 3/1894 | Wilson |
| 526,562 A | 9/1894 | Cross |
| 560,858 A | 5/1896 | Missroon |
| 583,981 A | 6/1897 | Plaisted |
| 607,598 A | 7/1898 | Closz |
| 777,317 A | 12/1904 | Traylor |
| 865,185 A | 9/1907 | Kerrigan |
| 948,222 A | 2/1910 | Honabach |
| 964,897 A | 7/1910 | Bryant |
| 966,578 A | 8/1910 | Murphy et al. ......... 209/401 X |
| 984,866 A | 2/1911 | Tate |
| 1,098,979 A | 6/1914 | Schuchard |
| 1,132,667 A | 3/1915 | Milliot |
| 1,139,041 A | 5/1915 | Larson |
| 1,174,539 A | 3/1916 | Bauer |
| 1,242,982 A | 10/1917 | Reynolds |
| 1,248,081 A | 11/1917 | Couch |
| 1,250,768 A | 12/1917 | Baumgartner ............... 209/392 |
| 1,344,747 A | 6/1920 | Wright |
| 1,397,339 A | 11/1921 | Sturtevant |
| 1,423,021 A | 7/1922 | Reynolds |
| 1,462,804 A | 7/1923 | Evans |
| 1,505,735 A | 8/1924 | Stebbins |
| 1,561,632 A | 11/1925 | Woodward |
| 1,626,774 A | 5/1927 | Allan |
| 1,614,586 A | 10/1927 | Anderson et al. |
| 1,663,164 A | 3/1928 | Helman |
| 1,678,941 A | 7/1928 | Helman |
| 1,713,143 A | 5/1929 | Overstrom |
| 1,716,758 A | 6/1929 | Bland |
| 1,785,195 A | 12/1930 | Hoes et al. |
| 1,879,377 A | 9/1932 | McNeely |
| 1,947,307 A | 2/1934 | Rafton |
| 1,950,861 A | 3/1934 | O'Toole. Sr. |
| 1,997,713 A | 4/1935 | Boehm |
| 1,997,740 A | 4/1935 | Nickerson |
| 2,052,467 A | 8/1936 | Hermann ................... 209/401 |
| 2,061,850 A | 11/1936 | Roberts |
| 2,082,513 A | 6/1937 | Roberts |
| 2,089,548 A | 8/1937 | Frantz et al. |
| 2,104,785 A | 1/1938 | Akeyson ................... 210/384 |
| 2,190,262 A | 2/1940 | Geist |
| 2,217,920 A | 10/1940 | Roubal ...................... 209/403 |
| 2,251,909 A | 8/1941 | Lidnsay ...................... 210/149 |
| 2,274,700 A | 3/1942 | Jenks |
| 2,314,879 A | 3/1943 | Heller |
| 2,335,084 A | 11/1943 | Rice ........................... 209/408 |
| 2,406,051 A | 8/1946 | Weiss |
| 2,462,878 A | 3/1949 | Logue |
| 2,480,320 A | 8/1949 | Carrier ...................... 210/388 |
| 2,511,239 A | 6/1950 | Behnke et al. ............. 209/403 |
| 2,648,441 A | 8/1953 | Soldan |
| 2,667,975 A | 2/1954 | Seaholm ..................... 210/152 |
| 2,670,079 A | 2/1954 | Betts ........................... 209/405 |
| 2,677,462 A | 5/1954 | Conkling .................... 209/403 |
| 2,723,032 A | 11/1955 | Gisler et al. |
| 2,726,184 A | 12/1955 | Cox et al. |
| 2,774,477 A | 12/1956 | Pollitz ........................ 209/403 |
| 2,800,227 A | 7/1957 | Kigor ..................... 209/412 X |
| 2,813,629 A | 11/1957 | Brugmann ................... 209/403 |
| 2,827,169 A | 3/1958 | Cusi |
| 2,893,484 A | 7/1959 | Gordon |
| 2,902,165 A * | 9/1959 | Imershein ................... 210/486 |
| 2,929,464 A | 3/1960 | Sprouse |
| 2,973,865 A | 3/1961 | Cibula ...................... 209/392 X |
| 2,980,208 A | 4/1961 | Neumann |
| 2,985,303 A | 5/1961 | Wright |
| 3,057,481 A | 10/1962 | Palo .......................... 210/493 |
| 3,070,231 A | 12/1962 | McCorkel et al. ........... 209/319 |
| 3,092,573 A | 6/1963 | Lambert et al. ............. 209/403 |
| 3,165,473 A | 1/1965 | Pall et al. ..................... 210/510 |
| 3,176,843 A | 4/1965 | Hoskins et al. ............. 209/403 |
| 3,243,943 A | 4/1966 | Getzin .......................... 55/499 |
| 3,255,885 A | 6/1966 | Burls ......................... 209/314 |
| 3,285,413 A | 11/1966 | Taylor-Smith |
| 3,306,794 A | 2/1967 | Humbert, Jr. |
| 3,458,978 A | 8/1969 | Davis ......................... 55/499 |
| 3,465,413 A | 9/1969 | Rosaen et al. ................ 29/428 |
| 3,542,636 A | 11/1970 | Wandel ...................... 161/114 |
| 3,565,251 A | 2/1971 | Pennington ................ 209/323 |
| 3,574,103 A | 4/1971 | Latkin ......................... 428/72 |
| 3,655,060 A | 4/1972 | Hagdahl ..................... 210/493 |
| 3,679,057 A | 7/1972 | Perez .......................... 210/223 |
| 3,684,091 A | 8/1972 | Wehner ...................... 209/403 |
| 3,700,105 A * | 10/1972 | Piper .......................... 209/421 |
| 3,716,138 A | 2/1973 | Lumsden .................... 209/401 |
| 3,747,770 A | 7/1973 | Zentis ........................ 210/402 |
| 3,747,772 A | 7/1973 | Brown ....................... 210/493 |
| 3,789,498 A | 2/1974 | Cole ........................ 29/470.9 |
| 3,793,692 A | 2/1974 | Tate et al. .................. 29/163.5 |
| 3,853,529 A | 12/1974 | Boothe et al. ................ 55/499 |
| 3,900,628 A | 8/1975 | Stewart |
| 3,929,642 A | 12/1975 | Ennis et al. ................. 210/113 |
| 3,968,033 A | 7/1976 | Illemann ..................... 209/403 |
| 3,970,549 A | 7/1976 | Ennis et al. ................. 209/341 |
| 4,019,987 A | 4/1977 | Krashow .................... 210/232 |
| 4,022,596 A | 5/1977 | Pedersen ..................... 55/528 |
| 4,033,865 A | 7/1977 | Derrick, Jr. ................. 209/275 |
| 4,040,951 A | 8/1977 | Cole ........................... 209/408 |
| 4,062,769 A | 12/1977 | Simonson .................... 209/399 |
| 4,065,382 A | 12/1977 | Derrick, Jr. ................. 209/313 |
| 4,075,106 A | 2/1978 | Yamazaki .................... 210/487 |
| 4,082,657 A | 4/1978 | Gage .......................... 209/311 |
| 4,137,157 A | 1/1979 | Deister et al. ............... 209/403 |
| 4,138,303 A | 2/1979 | Taylor ........................ 156/264 |
| 4,224,146 A | 9/1980 | Kent et al. .................. 209/243 |
| 4,306,974 A | 12/1981 | Harry ........................ 210/388 |
| 4,375,199 A | 3/1983 | Graeme-Barber et al. ... 144/222 |
| 4,380,494 A | 4/1983 | Wilson ........................ 209/319 |
| 4,410,427 A | 10/1983 | Wydeven .................... 210/317 |
| 4,446,022 A | 5/1984 | Harry ........................ 210/388 |
| 4,455,222 A * | 6/1984 | Less ........................... 209/235 |
| 4,457,839 A | 7/1984 | Bailey ........................ 209/234 |
| 4,464,242 A | 8/1984 | Boulton ..................... 204/253 |
| 4,472,473 A | 9/1984 | Davis et al. ................. 428/184 |
| 4,546,783 A | 10/1985 | Lott ........................... 134/109 |
| 4,575,421 A | 3/1986 | Derrick et al. ............. 209/397 |
| 4,582,597 A | 4/1986 | Huber ........................ 204/313 |
| 4,589,983 A | 5/1986 | Wydevan .................... 210/317 |
| 4,603,653 A | 8/1986 | Bews .......................... 116/209 |
| 4,617,122 A | 10/1986 | Kruse et al. ............... 210/493.3 |
| 4,634,535 A | 1/1987 | Lott ........................... 210/780 |
| 4,661,245 A | 4/1987 | Rutherford et al. .......... 209/399 |
| 4,678,578 A | 7/1987 | Nodes et al. ................ 210/445 |
| 4,696,751 A | 9/1987 | Eifling ....................... 210/780 |
| 4,728,422 A | 3/1988 | Bailey ........................ 210/314 |
| 4,744,898 A | 5/1988 | Bailey ........................ 210/236 |
| 4,769,968 A | 9/1988 | Davis et al. .................. 52/814 |
| 4,819,809 A | 4/1989 | Derrick ...................... 209/275 |
| 4,820,407 A | 4/1989 | Lilie .......................... 209/397 |
| 4,832,834 A | 5/1989 | Baird, Jr. .................... 209/397 |
| 4,846,352 A | 7/1989 | Bailey ........................ 209/399 |
| 4,857,176 A | 8/1989 | Derrick et al. ............. 209/392 |
| 4,882,054 A | 11/1989 | Derrick et al. ............. 210/389 |
| 4,940,500 A | 7/1990 | Tado koro et al. ........... 156/204 |
| 4,954,249 A | 9/1990 | Gero et al. .................. 209/273 |
| 5,028,324 A | 7/1991 | Teinert ...................... 210/232 |

| | | | |
|---|---|---|---|
| 5,028,474 A | 7/1991 | Czaplicki | 428/178 |
| 5,084,178 A | 1/1992 | Miller et al. | 210/493.5 |
| 5,116,553 A | 5/1992 | Harvey | 264/39 |
| 5,137,622 A | 8/1992 | Souter | 209/403 |
| 5,139,154 A | 8/1992 | Gero et al. | 209/273 |
| 5,162,143 A | 11/1992 | Porter et al. | 428/179 |
| 5,167,740 A | 12/1992 | Michaelis et al. | 156/73.1 |
| 5,211,291 A | 5/1993 | Kelley et al. | 209/680 |
| 5,221,008 A | 6/1993 | Derrick, Jr. et al. | 209/269 |
| 5,226,546 A * | 7/1993 | Janssens et al. | 209/319 |
| 5,240,479 A | 8/1993 | Bachinski | 55/103 |
| 5,248,043 A | 9/1993 | Dorn | 209/399 |
| 5,256,292 A | 10/1993 | Cagle | 210/499 |
| 5,293,837 A * | 3/1994 | Caldwell | 119/166 |
| 5,310,482 A * | 5/1994 | Sather | 210/485 |
| 5,312,508 A | 5/1994 | Chisholm | 156/292 |
| 5,316,676 A | 5/1994 | Drori | 210/411 |
| 5,330,057 A | 7/1994 | Schiller et al. | 209/392 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,858 A | 5/1995 | Derrick et al. | 210/388 |
| 5,417,859 A * | 5/1995 | Bakula | 210/388 |
| 5,445,557 A * | 8/1995 | Gramm et al. | 451/75 |
| H1481 H | 9/1995 | Ray | 428/98 |
| 5,490,598 A | 2/1996 | Adams | 209/403 X |
| 5,614,094 A | 3/1997 | Deister et al. | 210/388 |
| 5,615,776 A | 4/1997 | Bjorklund et al. | 209/403 |
| 5,626,234 A | 5/1997 | Cook et al. | 209/315 |
| 5,636,749 A | 6/1997 | Wojciechowski | 209/403 |
| 5,667,661 A | 9/1997 | Hughes | 205/138 |
| 5,690,826 A | 11/1997 | Cravello | 210/384 |
| 5,720,881 A | 2/1998 | Derrick et al. | 210/308 |
| 5,783,077 A | 7/1998 | Bakula | 210/388 |
| 5,814,218 A | 9/1998 | Cagle | 210/388 |
| 5,816,413 A * | 10/1998 | Boccabella et al. | 209/399 |
| 5,819,952 A | 10/1998 | Cook et al. | 209/400 |
| 5,851,393 A | 12/1998 | Carr et al. | 204/489 |
| 5,868,889 A | 2/1999 | Kahler | 156/204 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,927,511 A | 7/1999 | Riddle et al. | 209/405 |
| 5,944,197 A | 8/1999 | Baltzer et al. | 209/400 |
| 5,944,993 A | 8/1999 | Derrick et al. | 210/388 |
| 5,950,841 A | 9/1999 | Knox et al. | 209/315 |
| 5,958,236 A | 9/1999 | Bakula | 210/388 |
| 5,967,336 A | 10/1999 | Baltzer et al. | 209/403 |
| 5,984,107 A | 11/1999 | Bleh | 209/320 |
| 5,992,641 A | 11/1999 | Caldwell, Jr. | 209/273 |
| 6,000,556 A | 12/1999 | Bakula | 210/388 |
| 6,000,558 A | 12/1999 | Proulx et al. | 210/486 |
| 6,006,923 A | 12/1999 | Helmy et al. | 209/397 |
| 6,018,383 A | 1/2000 | Dunn et al. | 355/49 |
| 6,019,152 A | 2/2000 | Haynes et al. | 156/433 |
| 6,019,228 A | 2/2000 | Duggan | 209/408 |
| 6,053,331 A | 4/2000 | Cravello | 210/388 |
| 6,053,332 A | 4/2000 | Bakula | 210/388 |
| 6,161,700 A | 12/2000 | Bakula | 209/401 |
| 6,186,337 B1 | 2/2001 | Adams et al. | 209/401 |
| 6,209,726 B1 | 4/2001 | Gallia | 209/397 |
| 6,220,448 B1 | 4/2001 | Bakula et al. | 209/392 |
| 6,267,246 B1 | 7/2001 | Russell et al. | 209/399 |
| 6,269,954 B1 | 8/2001 | Baltzer | 209/405 |
| 6,279,644 B1 | 8/2001 | Wylie | 160/371 |
| 6,305,549 B1 | 10/2001 | Riddle et al. | 209/403 |
| 6,431,368 B1 | 8/2002 | Carr | 209/403 |
| 6,450,345 B1 | 9/2002 | Adams et al. | 209/399 |
| 6,659,286 B2 | 12/2003 | Seyffert et al. | 209/405 |
| 6,669,027 B1 | 12/2003 | Mooney et al. | 209/405 |
| 7,228,971 B2 * | 6/2007 | Mooney et al. | 209/398 |
| 2002/0153289 A1 | 10/2002 | Suter et al. | |

FOREIGN PATENT DOCUMENTS

| | | |
|---|---|---|
| EP | 0 074 935 | 10/1982 |
| EP | 0 169698 | 1/1986 |
| EP | 0693004 B1 | 10/1994 |
| GB | 269877 | 4/1928 |
| GB | 519680 | 4/1940 |
| GB | 823648 | 11/1959 |
| GB | 1412975 | 11/1975 |
| GB | 1575312 | 9/1980 |
| GB | 1578948 | 11/1980 |
| GB | 2085744 | 5/1982 |
| GB | 2124099 A | 2/1984 |
| GB | 2161715 | 1/1986 |
| GB | 2161715 A | 1/1986 |
| GB | 2162091 | 1/1986 |
| GB | 2175222 | 11/1986 |
| GB | 2161715 B | 6/1988 |
| GB | 2206501 | 1/1989 |
| GB | 2312858 | 11/1997 |
| JP | 59-142818 | 8/1984 |
| WO | PCT/GB91/00957 | 6/1991 |
| WO | PCT/US94/00243 | 1/1994 |
| WO | WO 95/23655 | 9/1995 |
| WO | PCT/EP96/03103 | 7/1996 |
| WO | WO 97/47404 | 12/1997 |
| WO | WO 03/013690 A1 | 2/2003 |

OTHER PUBLICATIONS

Derrick Composite Catalog, Derrick Equipment Company, 22 pp., 2002.
Int'l Preliminary Report on Patentability; PCT/GB2004/001936; Jul. 28, 2005; 12 pp.
Int'l Search Report, PCT/GB97/00385 co-owned with present application.
Offical Gazette Entry for U.S. Patent 5,626,234, May 6, 1997.
The Brandt Company General Catalog 1982-1983, 4 pages, 1982.
Take the Drilled Solids Out, The Brandt Company, Sep. 1980.
Sweco Full-Flow, Sweco, Inc, 1992.
Catalog 105 H&K Perforated Materials, Harrington & KingPerforating Co., 1988.
Sweco Oilfield Services, Composito Catalog, 1992.
Screening Equipment Handbook, Pankratz, 1988.
Supertaut Mud Cleaner Screens, Sweco Oilfield Services, 1992.
Filtration & Separation, Flo Trend Systems, Inc. 1989.
Clean Liquids/Dry Solids, Flo Trend Systems, Inc. 1989.
H & K Perforated Haterlate, Harrington and King, Catalog 105, 1988.
Mud Equipment Manual Handbook 3: Shale Shakers, Brandt & Love, Gulf Pub. Co., 1982.
An Innovative Method of ranking Shale Shaker Screens, STC05, Shale Shaker Technology Conference, Feb. 1991.
U.S. Appl. No. 08/282,983, filed Jul. 29, 1994 entitled "Shale Shaker Screens," co-owned with present invention/application.
"Derrick Sandwich Shaker," Derrick Equipment Co. (Prior to 1992).
"The Future of Fine Screening," Derrick Equipment Co. 1993.
"Derrick Pyramid Screens," Derrick Corp.
"Advanced Wirecloth, Inc.," Advanced Wirecloth, Inc., 1993.
"CPI Group, Inc.," CPI Group, Inc., 1990.
"LM3 Full-Flo Shale Shaker," Sweco Oilfield Services, 1991.
Pending U.S. Appl. No. 08/220,101, filed Mar. 30, 1994 entitled "Screen For Vibrating Separator."
Amendment Under 37 CFR 1.115 in pending U.S. Appl. No. 08/220,101.
Mcnally Coal Preparation Manual M 576, pp. 111,73-96, 216 (1978).
Layered Shale Shaker Screens Improve Mud Solids Control, World Oil, 1978.

* cited by examiner

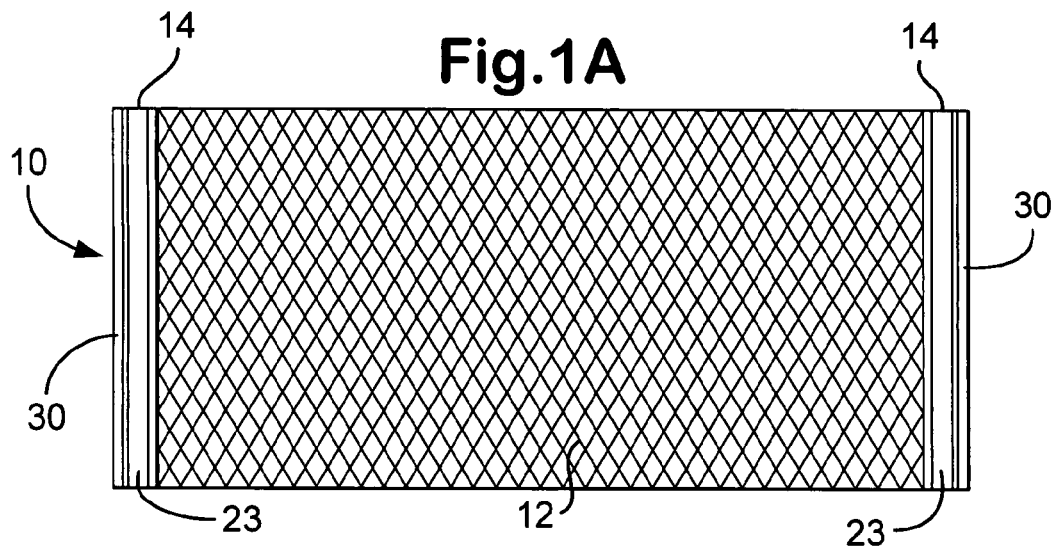
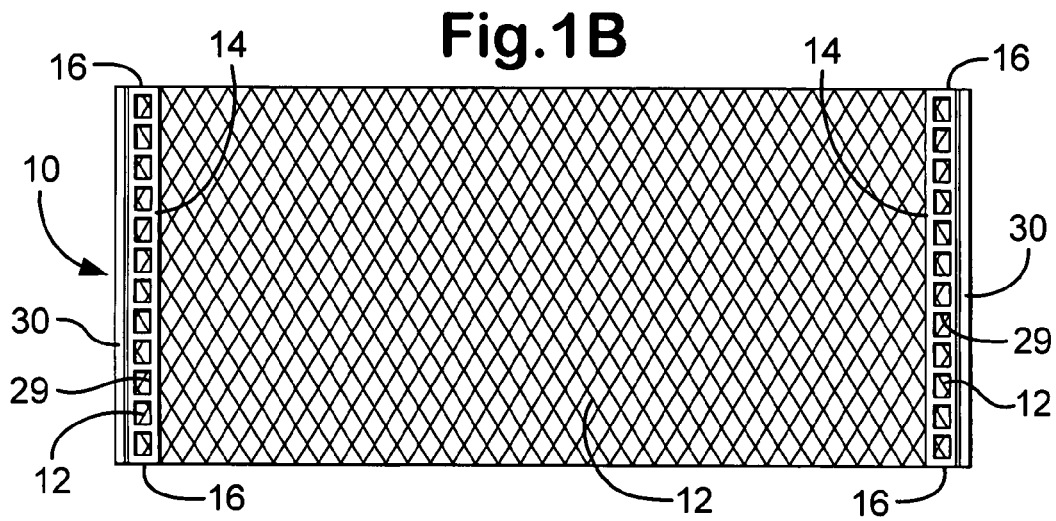
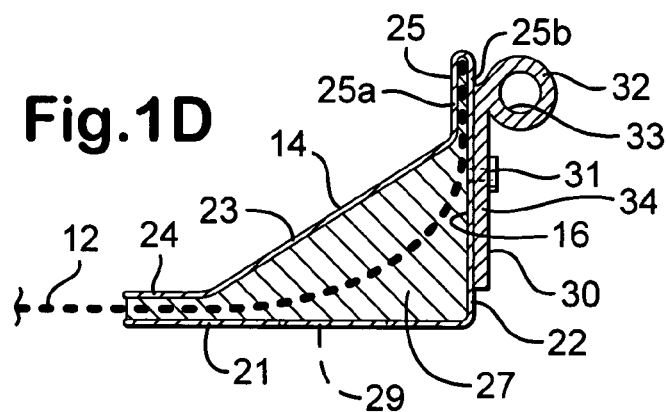

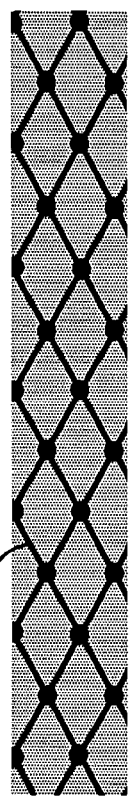
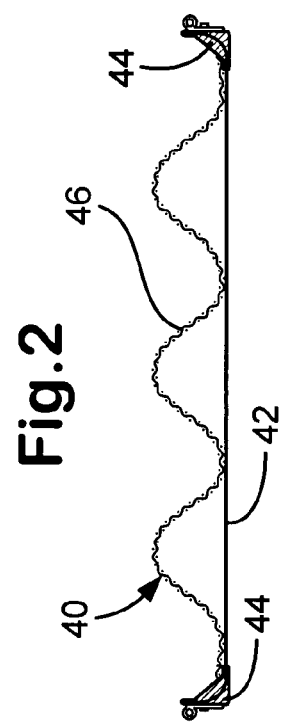
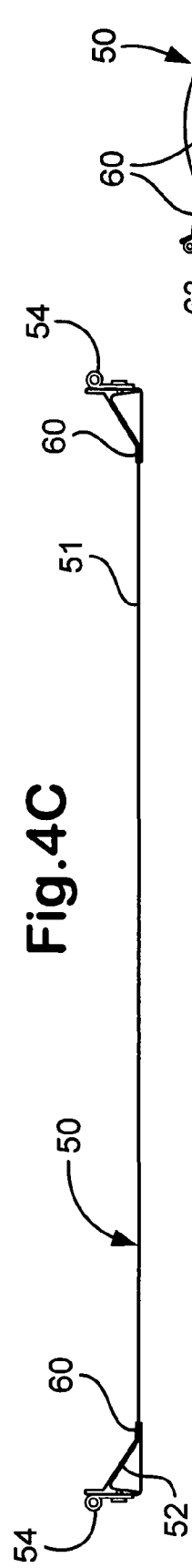
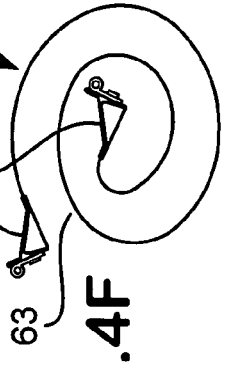
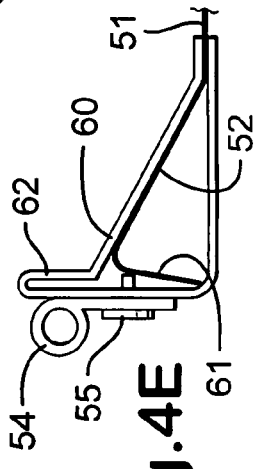
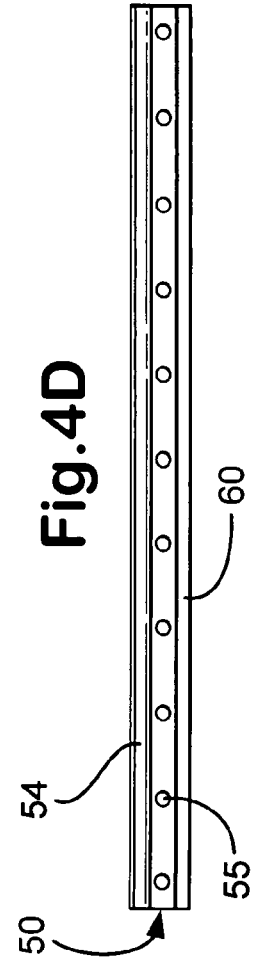

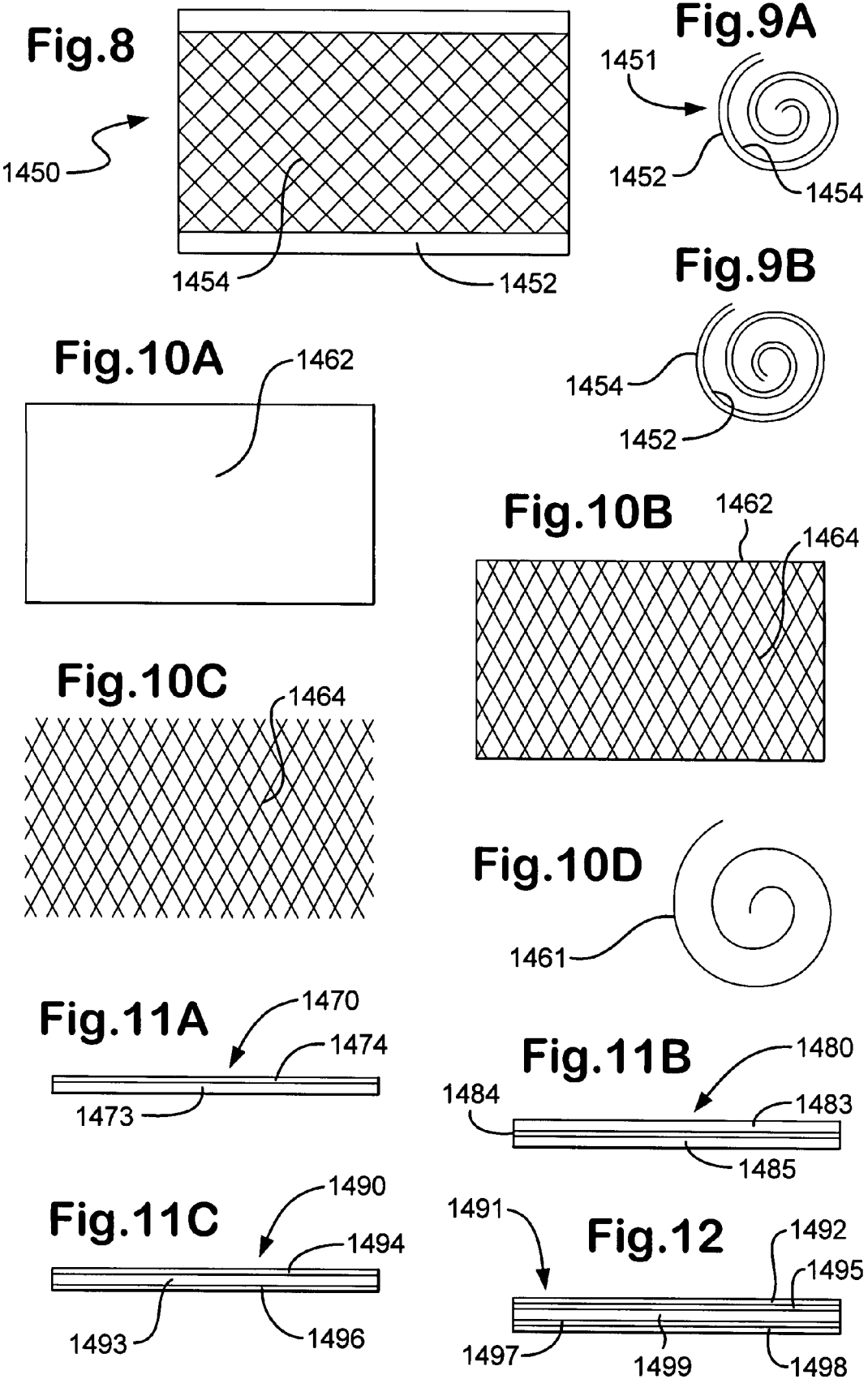

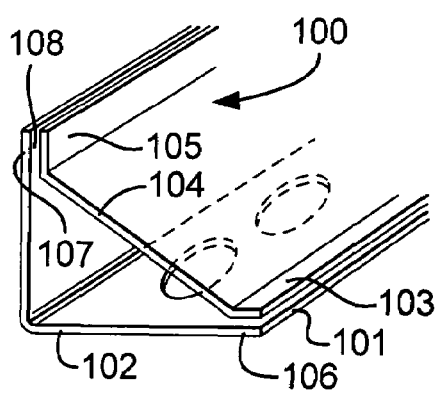
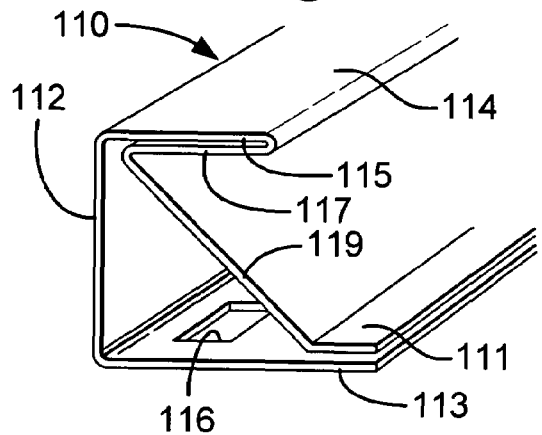
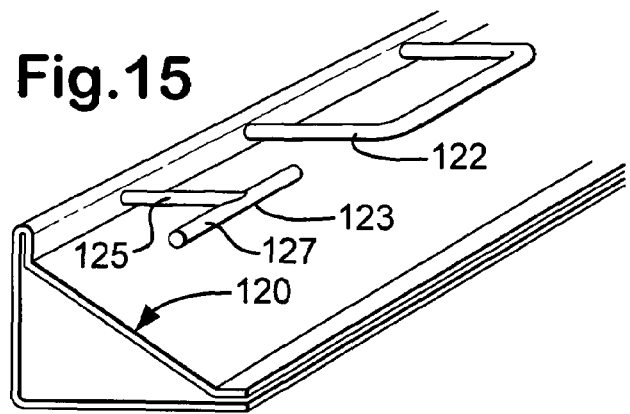
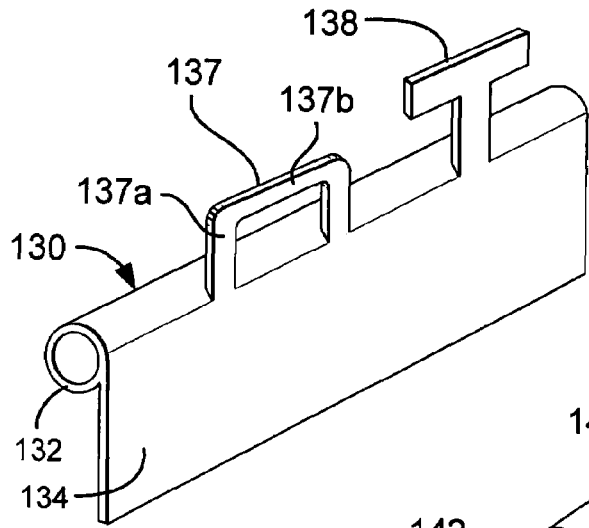
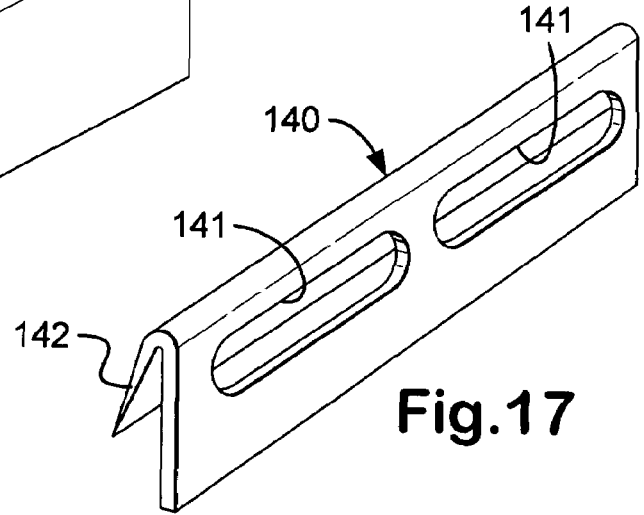

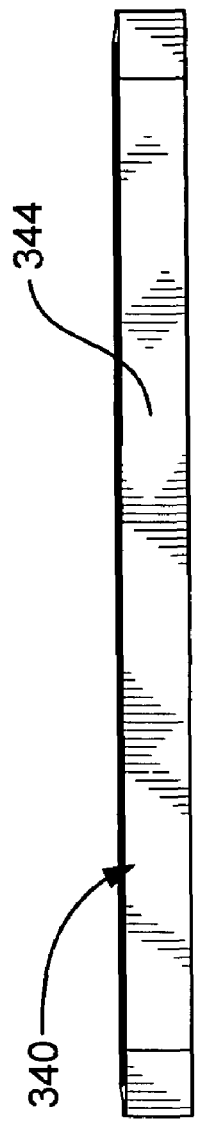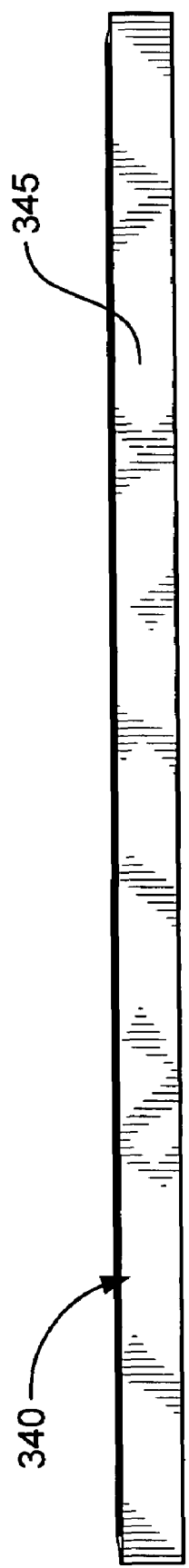

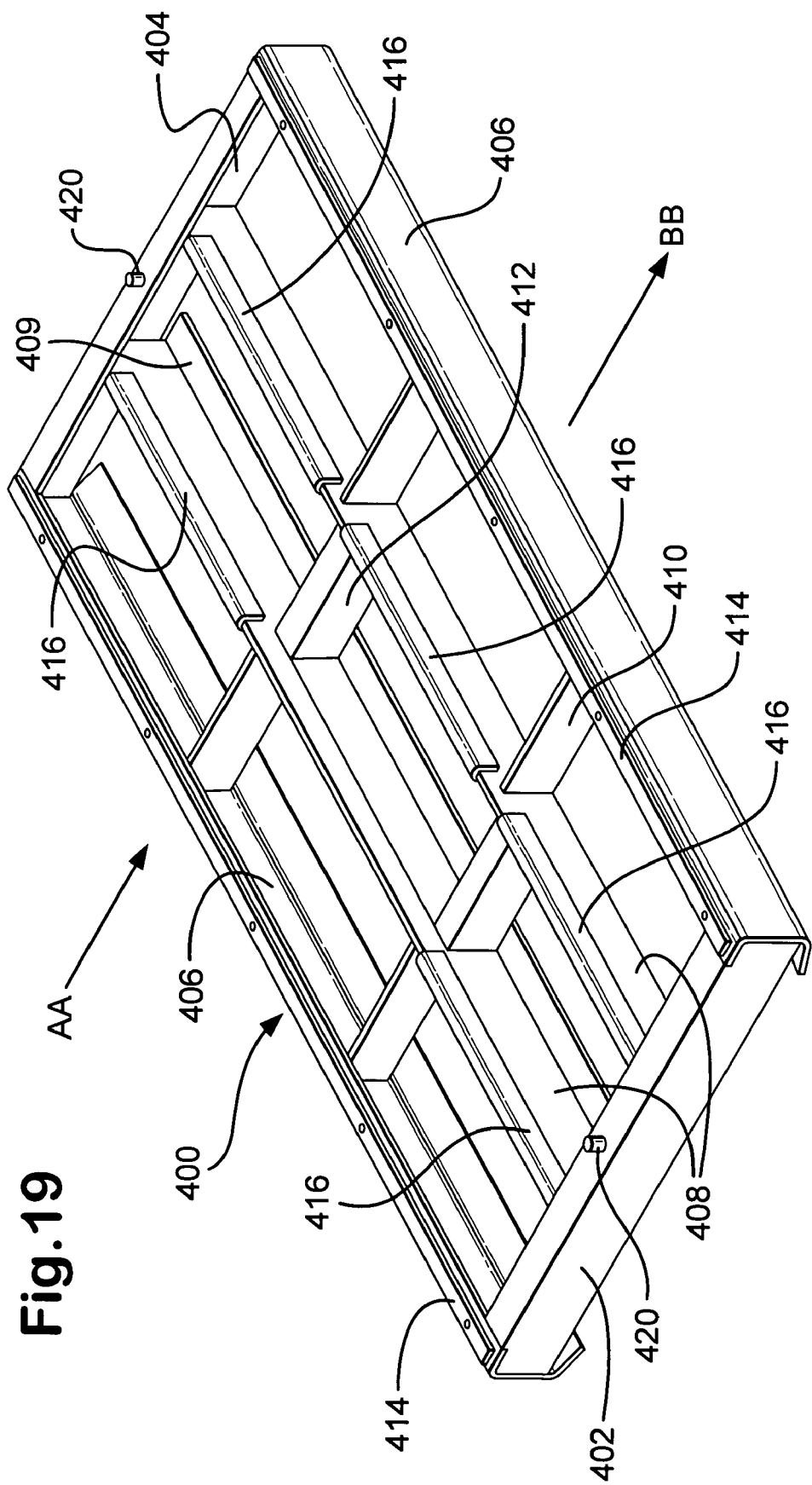

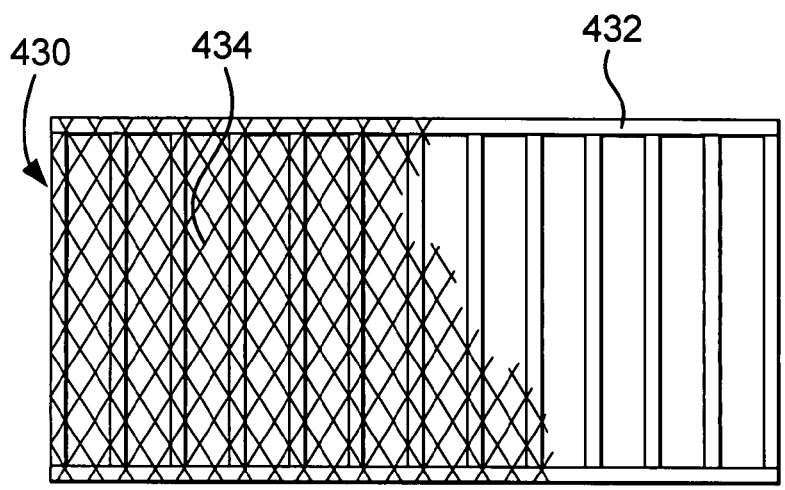
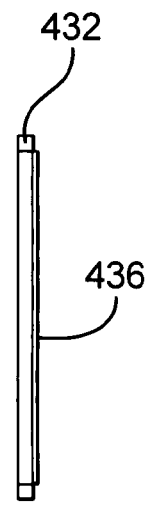
Fig.20A     Fig.20B
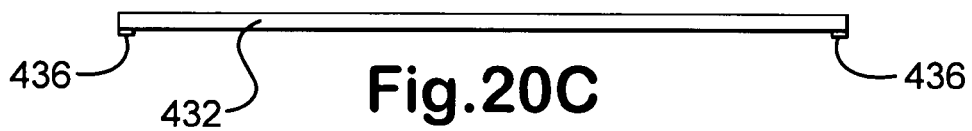
Fig.20C
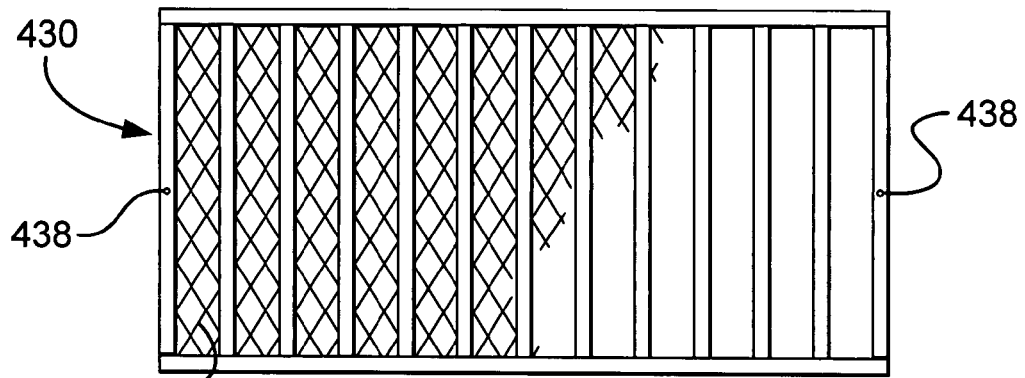
Fig.20D
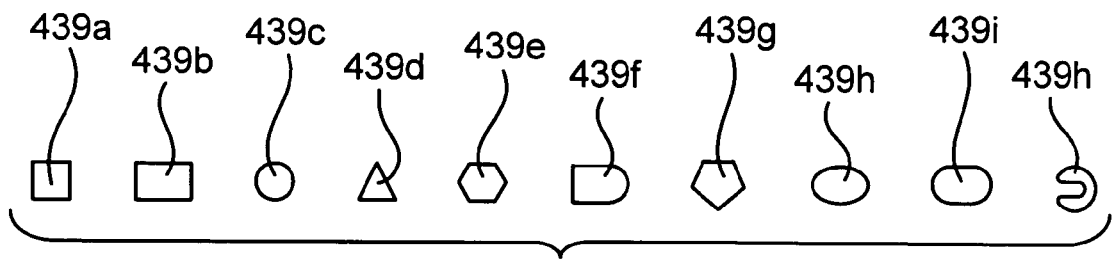
Fig.20E

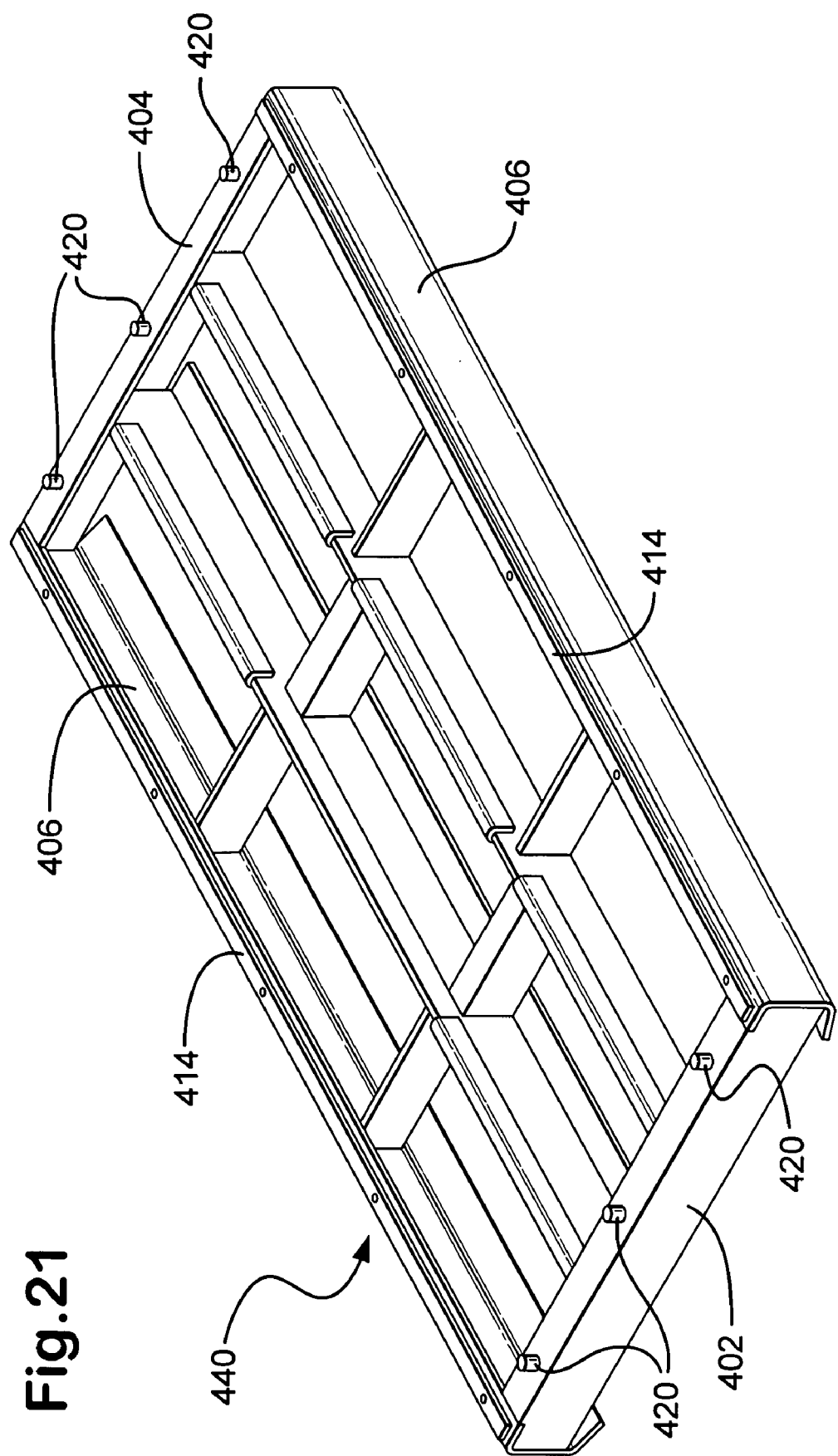

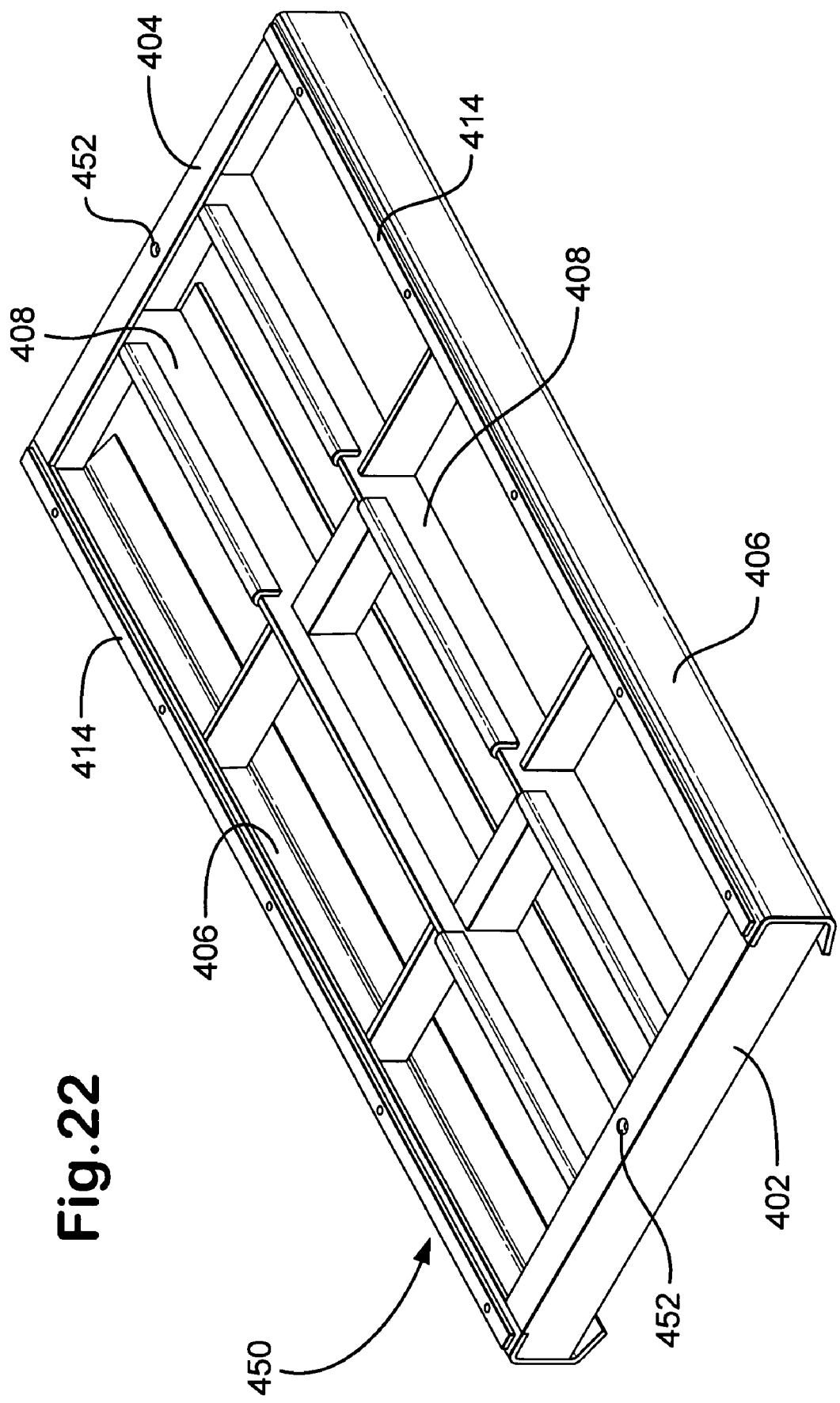

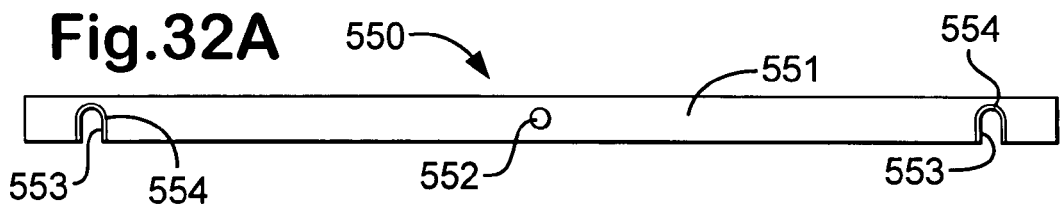
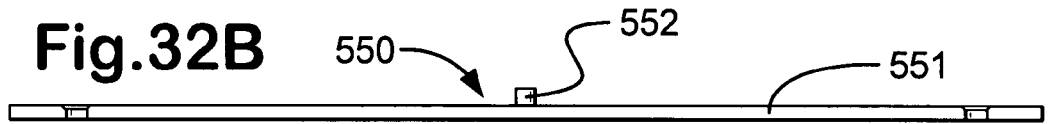
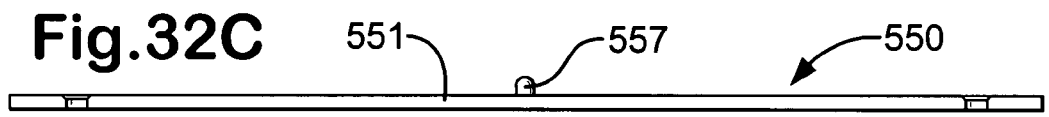
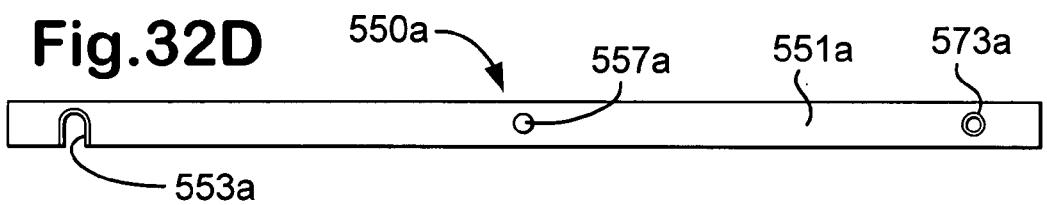
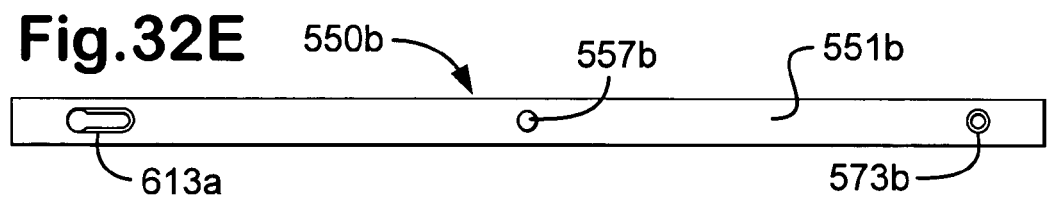
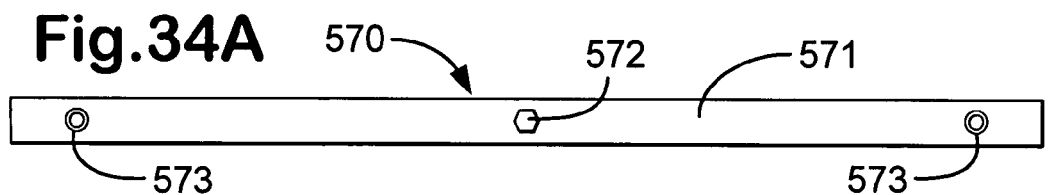
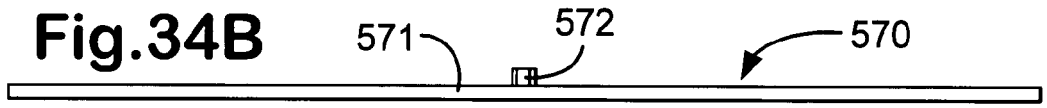
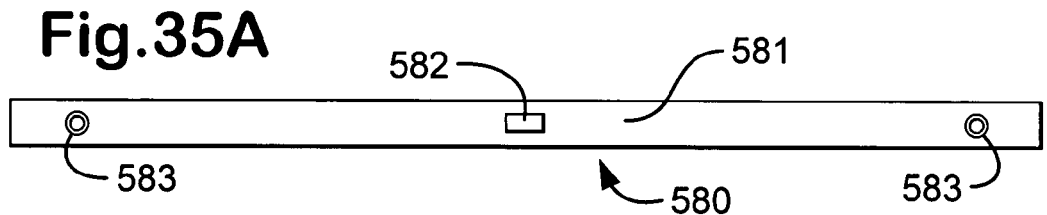
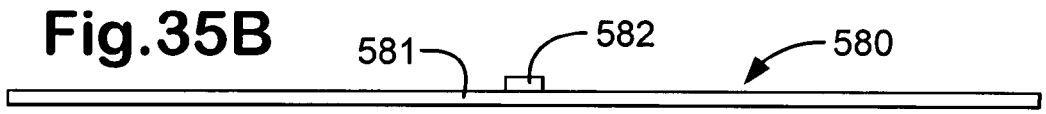

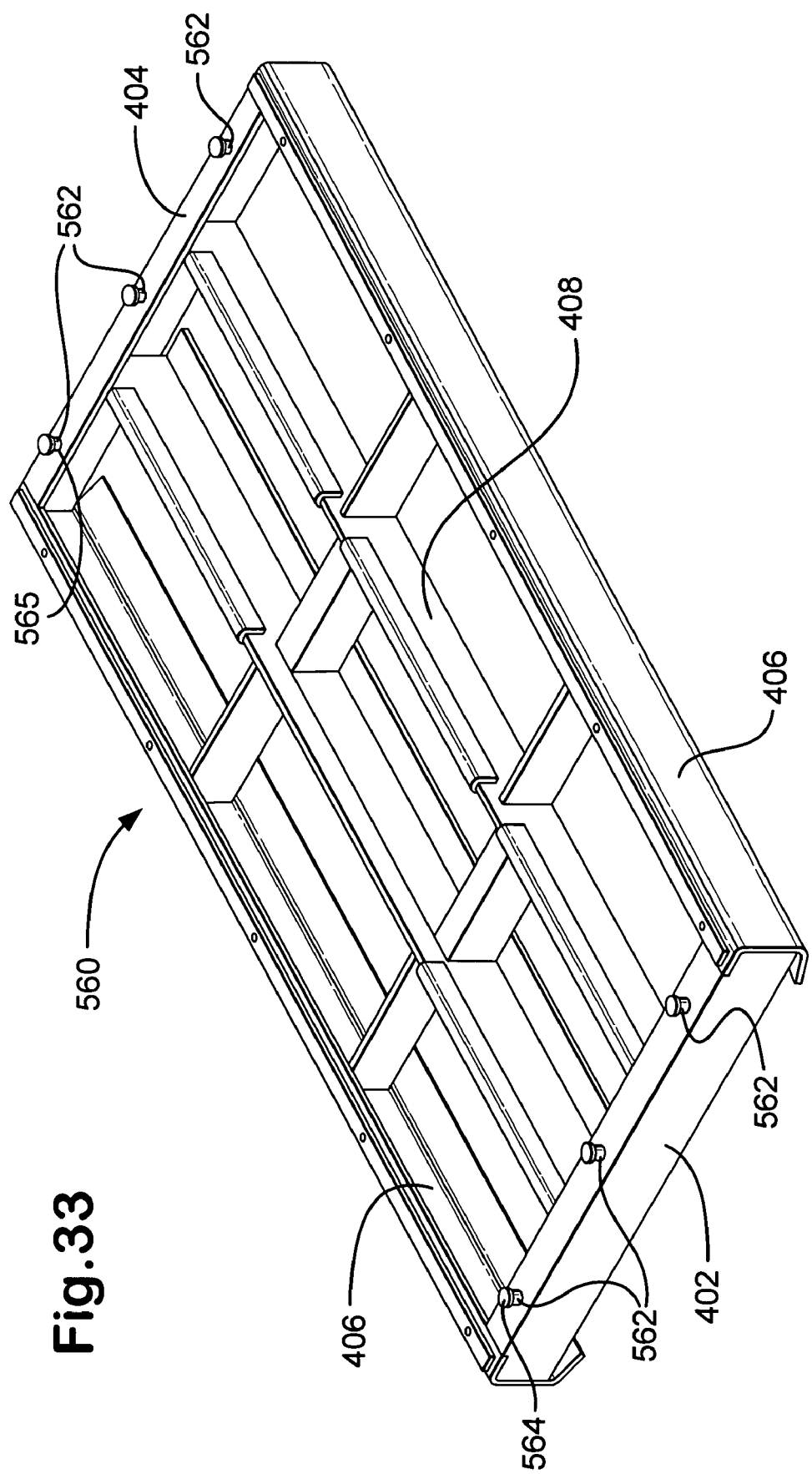

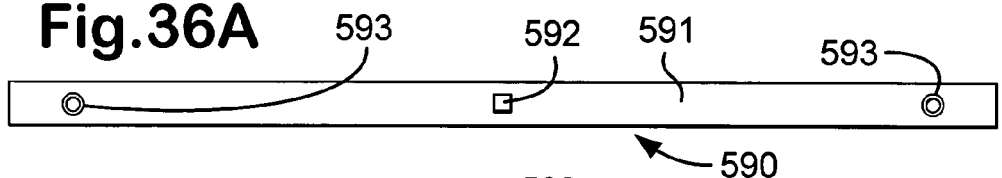
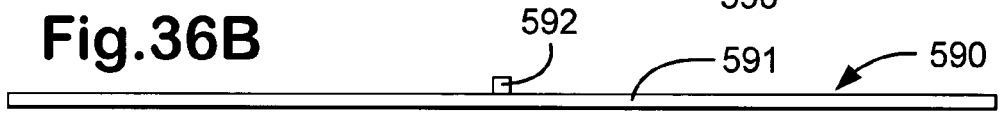
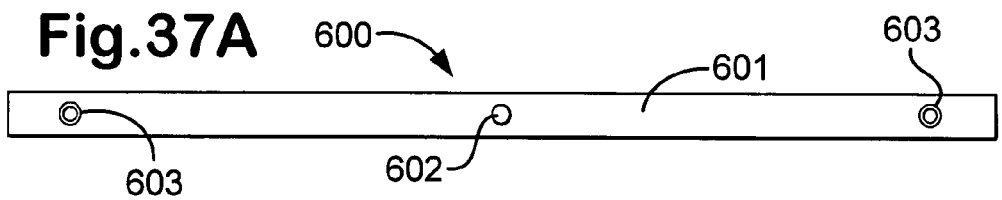
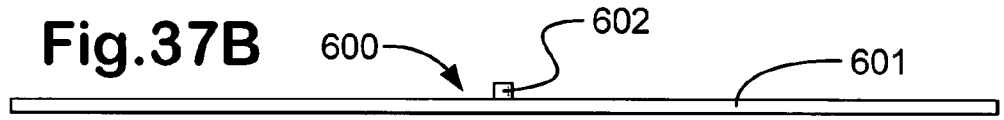
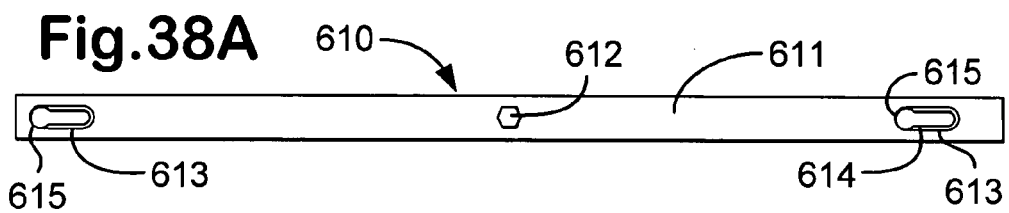
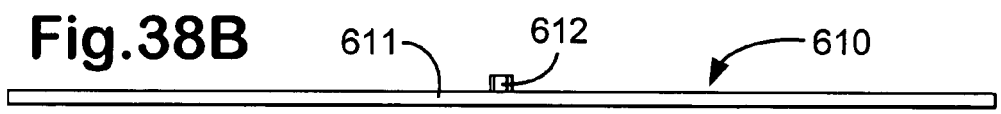
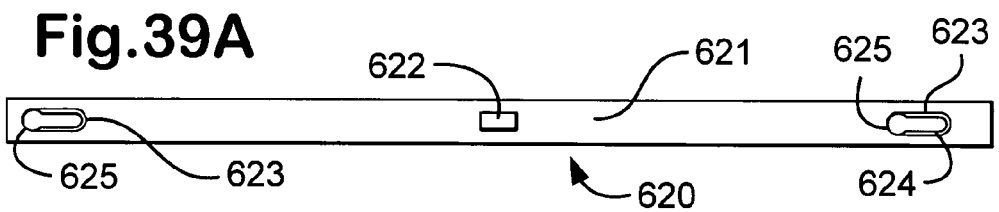
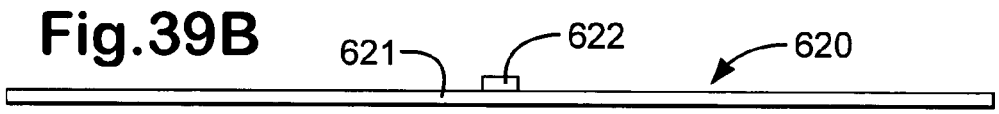
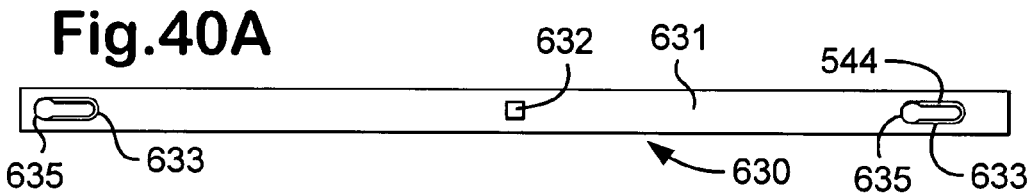
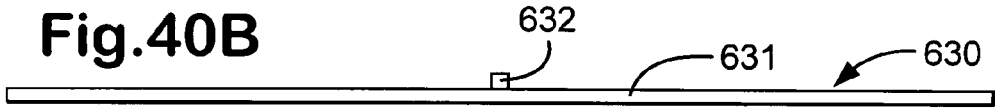

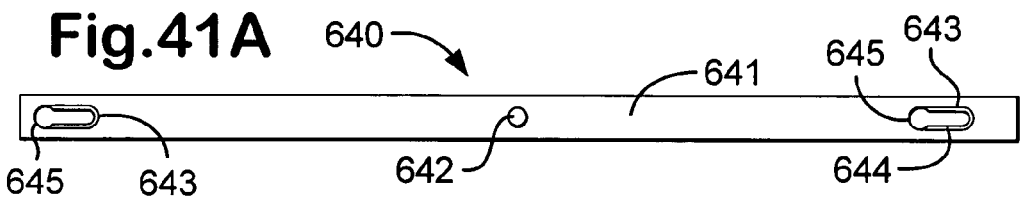
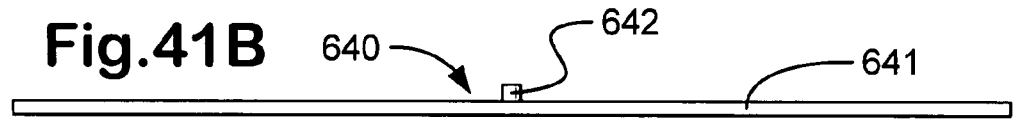
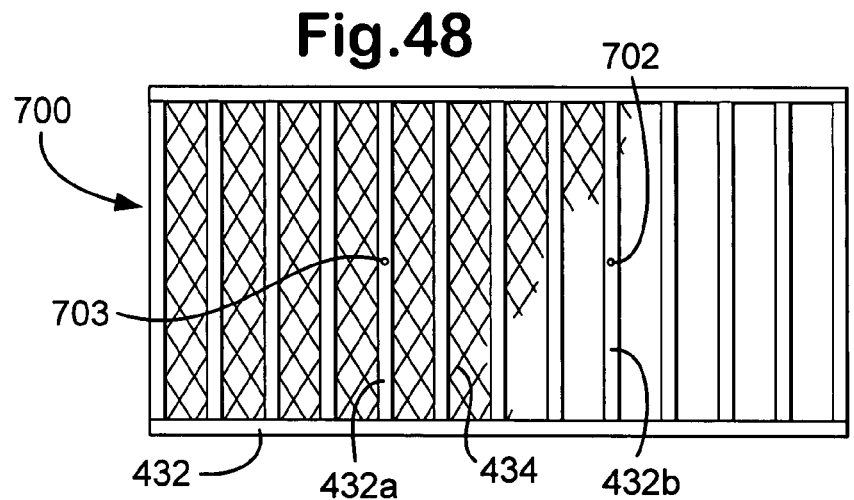
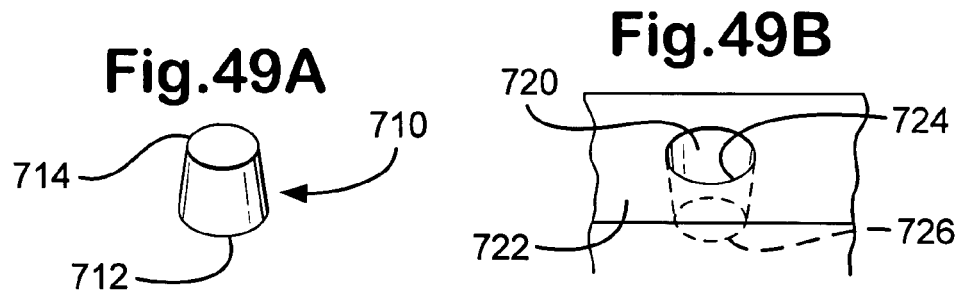
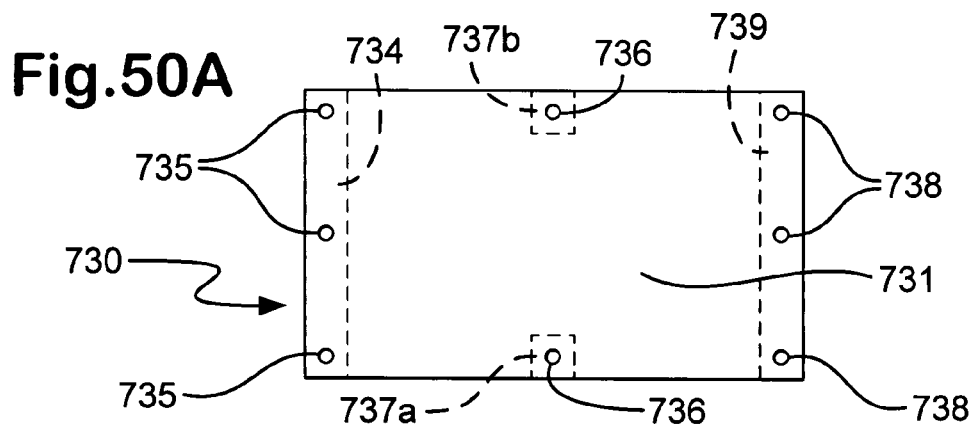

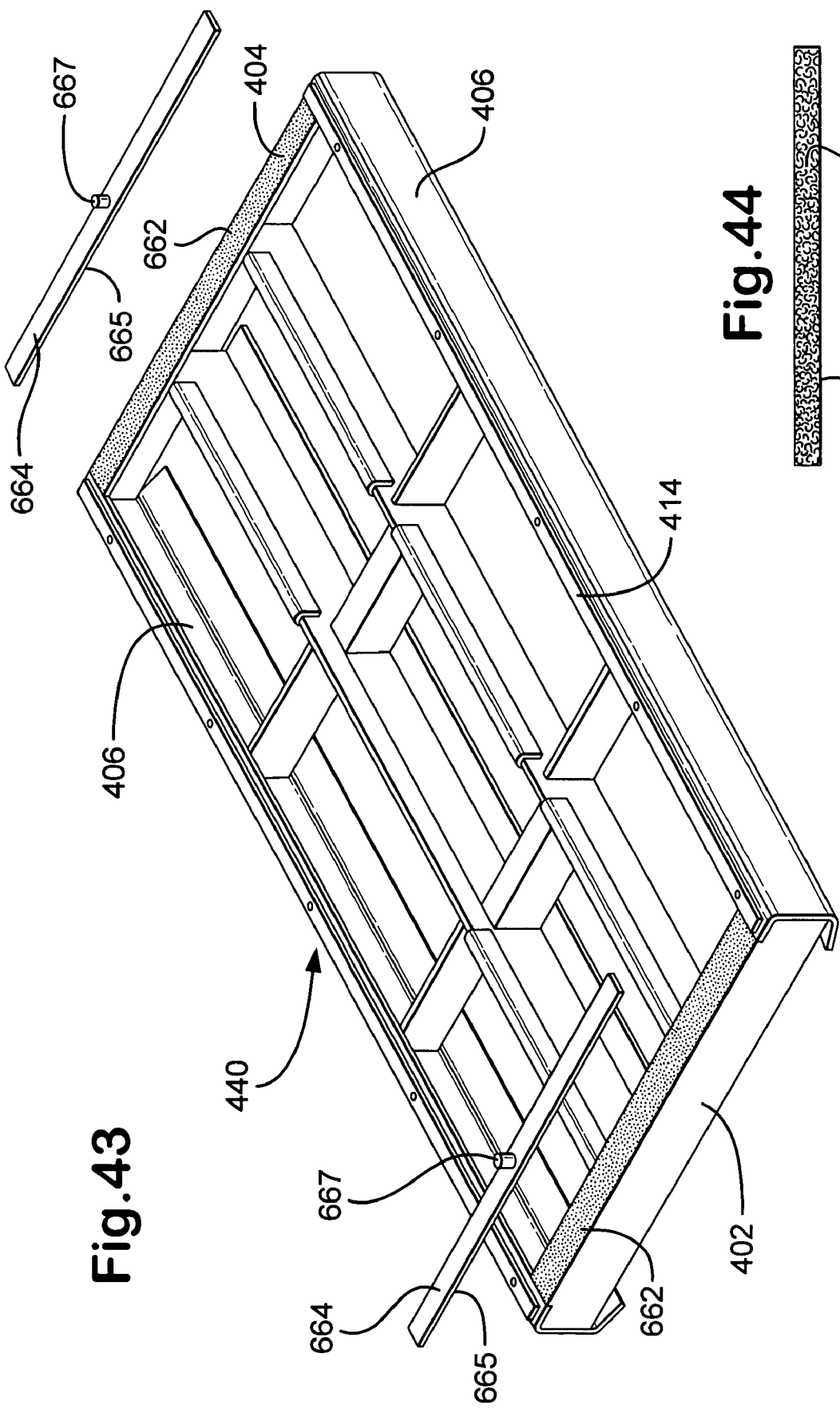
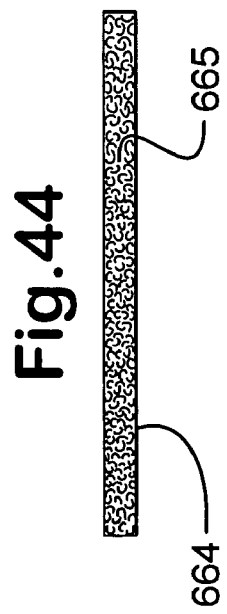

SCREEN ASSEMBLY FOR VIBRATORY SEPARATOR

RELATED APPLICATIONS

This is a division of U.S. application Ser. No. 10/429,233 filed 2 May 2003, now abandoned which is a continuation-in-part of U.S. application Ser. No. 09/517,212 filed Mar. 2, 2000, now U.S. Pat. No. 6,565,698; Ser. No. 10/037,474 filed Oct. 19, 2001, now U.S. Pat. No. 6,669,985; and Ser. No. 10/087,025 filed Oct. 19, 2001, now U.S. Pat. No. 6,736,270; and Ser. No. 09/454,722 filed Dec. 4, 1999, now abandoned; and this is a continuation-in-part of U.S. application Ser. No. 10/057,755 filed Jan. 23, 2002, now U.S. Pat. No. 6,769,550 which is a continuation-in-part of two U.S. application Ser. No. 10/050,690 filed Jan. 16, 2002, now abandoned and Ser. No. 10/053,350 filed Jan. 16, 2002, now U.S. Pat. No. 6,662,952—all of which applications are incorporated fully herein for all purposes and from all of which the present invention and the present application claim priority under the Patent Laws.

BACKGROUND OF THE INVENTION

1. Field of the Invention

This invention is directed to screen assemblies for vibratory separators; to methods for making them; and, in certain aspect to screen assemblies for use in shale shakers for treating drilling fluids.

2. Description of Related Art

The prior art discloses a wide variety of screens and screen assemblies for use in vibratory separators and shale shakers and methods for making screen assemblies.

There has long been a need, recognized by the present inventor, for a screen assembly with screening material mountable on a separator or shaker with an upwardly-projecting mounting structure. There has long been a need for a screen assembly which has mounting structure that securely holds screening material. There has long been a need recognized by the present inventors for such screen assemblies with effective edge seals along screen assembly edges that interface with interior portions of a basket or screen holding structure.

SUMMARY OF THE PRESENT INVENTION

The present invention, in at least certain embodiments provides a screen assembly which has one, two, three or more layers of screening material with opposed sides thereof secured within side mounts. A seal structure is secured on an exterior side of the side mounts for sealing a screen-assembly/basket interface. The side mounts include a piece of material folded or bent over on itself to grasp between parts thereof an edge portion of the screening material.

In certain aspects the screening material includes two or more layers glued together as disclosed in U.S. Pat. No. 6,450,345 and U.S. application Ser. No. 09/517,212 filed Mar. 2, 2000; Ser. No. 10/037,474 filed Oct. 19, 2001; Ser. No. 09/454,722 filed Dec. 4, 1999 and Ser. No. 10/087,025 filed Oct. 19, 2001; all co-owned with the present invention and fully incorporated herein for all purposes. In certain aspects the glue used is hot melt glue.

In certain aspects the side mounts include a hollow elongated member with initially open ends which are, optionally, sealed with any suitable sealing material or structure. In one aspect hot melt glue is used to seal these end openings. In other aspects these ends are sealed with plugs (e.g. of wood, metal, plastic, fiberglass, composite); two part acrylic filler; two-part epoxy filler; thermoplastic material; thermosetting material; moisture cure urethane or PUR.

The present invention discloses, in at least certain aspects, methods for making screen assemblies for vibratory separators and shale shakers, the method including applying glue in a glue pattern to at least one layer of screening material useful for screening fluid introduced to a vibratory separator or shale shaker, the applying done by powered moving mechanical glue application apparatus; and, in one aspect, the glue is heated moisture-curing hot melt glue. Such methods may also include applying moisture to glue in a glue pattern following application of moisture-curing hot melt glue to layer(s) of screening material.

The present invention discloses, in certain embodiments, a screen for vibrating screen apparatus. The screen has one or more upper layers of screen, screen cloth, and/or mesh. The layer or layers may be mounted on frame apparatus which may include a solid side support on each of two spaced apart sides of the layer(s), or a full four sided screen frame, with or without one or more interior crossmembers such as tubular rods or hollow tubular members extending between the sides. A strip support or strips of support material (e.g. flat steel) may be used beneath screen layer(s). In some aspects, hookstrips are used on opposed sides or ends of a screen made by a method according to the present invention so that it can be mounted in a shaker or other separator apparatus. Known hookstrips may be used with screen assemblies according to the present invention.

The present invention provides, in at least certain aspects, a shale shaker or vibratory separator with one or more screens or screen assemblies as disclosed herein; and methods of making such screens. The present invention, in one embodiment includes a shale shaker with a frame; a "basket" or screen mounting apparatus; screen mounting structure with upwardly-directed projection(s) receivable in corresponding holes of a screen assembly; one or more screens or screen assemblies according to the present invention as described above and below; and basket vibrating apparatus. The present invention, in one embodiment includes a shale shaker with a frame; a "basket" or screen mounting apparatus in or on the frame with a bed, tray or deck for a screen assembly or screen assemblies therein; pin(s), projections, and/or finger(s) projecting up from the bed, tray or deck; one or more screen assemblies according to the present invention with a hole (or holes) corresponding to the pin(s), projections, and/or finger(s) of the deck, bed or tray; the one or more screen assemblies mounted to the basket with the pin(s), projections, and/or finger(s) projecting into the corresponding hole or holes of the screen assembly or screen assemblies according to the present invention; basket vibrating apparatus; and a collection tank or receptacle below the basket. In one particular aspect such a shale shaker treats drilling fluid with drilled cuttings, debris, etc. entrained therein. With such a shale shaker, the pin(s), projections, and/or finger(s) of the deck, bed or tray can be formed integrally of the deck, bed or tray; or the pin(s) and/or finger(s) may be part of strips, bars, wear strips or elongated members that are releasably connectable to the deck, bed or tray. In one particular aspect, such pin(s) and/or finger(s) are on separate wear strips that are releasably connected to a shaker tray and which, in position thereon, provide an upward force that forces a screen assembly thereabove upwardly, facilitating the maintenance in position of the screen assembly. Wear strips that are made in an originally upwardly bowed configuration can provide such an upward force or an initially flat wear strip that is installed so that it bows slightly upwardly can provide such a force.

It is, therefore, an object of at least certain preferred embodiments of the present invention to provide:

New, useful, unique, efficient, non-obvious screen assemblies for vibratory separators and shale shakers and methods for making such screen assemblies;

Such screen assemblies with side mounts that hold edges of screening material and/or with one or more openings for receiving projection(s) of a screen mounting structure or apparatus of a vibratory separator or shale shaker;

Such screen assemblies with such side mounts which are hollow and have two sealed ends;

Such screen assemblies with side edge seals for sealing a screen/basket interface;

Such screen assemblies whose screening material layers are flexible and which, in certain aspects, can be folded or rolled into a roll of generally cylindrical shape; and/or New, useful, unique, efficient, non-obvious shale shakers with one or more upwardly projecting members on the shaker's deck, bed or tray for insertion into corresponding hole(s) on a screen assembly support of a screen assembly to be mounted on the shaker.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 1A is a top plan view of a screen assembly according to the present invention. FIG. 1B is a bottom view of the screen assembly of FIG. 1A. FIG. 1C is an end view of the screen assembly of FIG. 1A. FIG. 1D is an enlargement of a side mount of the screen assembly of FIG. 1A.

FIG. 2 is an end view of a screen assembly according to the present invention.

FIG. 3 is a top view of a screen material combination according to the present invention.

FIG. 4C is an end view of the screen assembly of FIG. 4A. FIG. 4D is a side view of the screen assembly of FIG. 4A. FIG. 4E is an enlargement of a side mount structure of the screen assembly as shown in FIG. 4C. FIG. 4F is a top view of the screen assembly of FIG. 4A in a rolled-up configuration.

FIG. 8 is a top view of a screen assembly component according to the present invention.

FIG. 9A is an end view of a rolled up screen component e.g. like the screen component of FIG. 8. FIG. 9B is an end view of a rolled up screen component e.g. like the screen component of FIG. 8.

FIG. 10A is a top view of a substrate for glue for a screen assembly according to the present invention. FIG. 10B is a top view that shows the substrate of FIG. 10A with a glue pattern according to the present invention deposited thereon. FIG. 10C shows the glue pattern of FIG. 10B removed from the substrate of FIG. 10A. FIG. 10D is an end view that shows the glue pattern of FIG. 10C in a roll.

FIG. 11A is a side view of a screen assembly according to the present invention. FIG. 11B is a side view of a screen assembly according to the present invention. FIG. 11C is a side view of a screen assembly according to the present invention.

FIG. 12 is a side view of a screen assembly according to the present invention.

FIGS. 13-15 are perspective views of screen mounts according to the present invention.

FIGS. 16 and 17 are perspective views of seals according to the present invention.

FIG. 18C is an end view of one end of the screen assembly of FIG. 18A (and the opposing end is identical to that of FIG. 18C). FIG. 18D is a side view of one side of the screen assembly of FIG. 18A (and the opposing side is identical to that of FIG. 18C).

FIG. 19 is a perspective view of a screen assembly mounting structure for a shale shaker according to the present invention.

FIG. 20A is a top view of a screen assembly according to the present invention. FIG. 20B is an end view, FIG. 20C is a side view and FIG. 20D is a bottom view of the screen assembly of FIG. 20A. FIG. 20E is a top view of possible hole shapes according to the present invention for the screen assembly of FIG. 20A.

FIG. 21 is a perspective view of a screen assembly mounting structure for a shale shaker according to the present invention.

FIG. 22 is a perspective view of a screen assembly mounting structure for a shale shaker according to the present invention.

FIG. 32A is a top view of a wear strip according to the present invention. FIG. 32B is a side view of the wear strip of FIG. 32A. FIG. 32C is a side view of an alternative embodiment of the wear strip of FIG. 32A. FIGS. 32D and 32E are top views of wear strips according to the present invention.

FIG. 33 is a perspective view of a screen assembly mounting structure for a shale shaker according to the present invention.

FIG. 34A is a top view of a wear strip according to the present invention. FIG. 34B is a side view of the wear strip of FIG. 34A.

FIG. 35A is a top view of a wear strip according to the present invention. FIG. 35B is a side view of the wear strip of FIG. 35A.

FIG. 36A is a top view of a wear strip according to the present invention. FIG. 36B is a side view of the wear strip of FIG. 36A.

FIG. 37A is a top view of a wear strip according to the present invention. FIG. 37B is a side view of the wear strip of FIG. 37A.

FIG. 38A is a top view of a wear strip according to the present invention. FIG. 38B is a side view of the wear strip of FIG. 38A.

FIG. 39A is a top view of a wear strip according to the present invention. FIG. 39B is a side view of the wear strip of FIG. 39A.

FIG. 40A is a top view of a wear strip according to the present invention. FIG. 40B is a side view of the wear strip of FIG. 40A.

FIG. 41A is a top view of a wear strip according to the present invention. FIG. 41B is a side view of the wear strip of FIG. 41A.

FIG. 43 is a perspective view of a screen assembly mounting structure for a shale shaker according to the present invention.

FIG. 44 is a bottom view of a wear strip of FIG. 43.

FIG. 48 is a bottom view of a screen assembly according to the present invention.

FIG. 49A is a perspective view of the upstanding member for embodiments of the present invention. FIG. 49B is a perspective view of the hole for embodiments of the present invention.

FIG. 50A is a top view of a screen assembly according to the present invention.

DESCRIPTION OF EMBODIMENTS PREFERRED AT THE TIME OF FILING FOR THIS PATENT

Figure 4A:
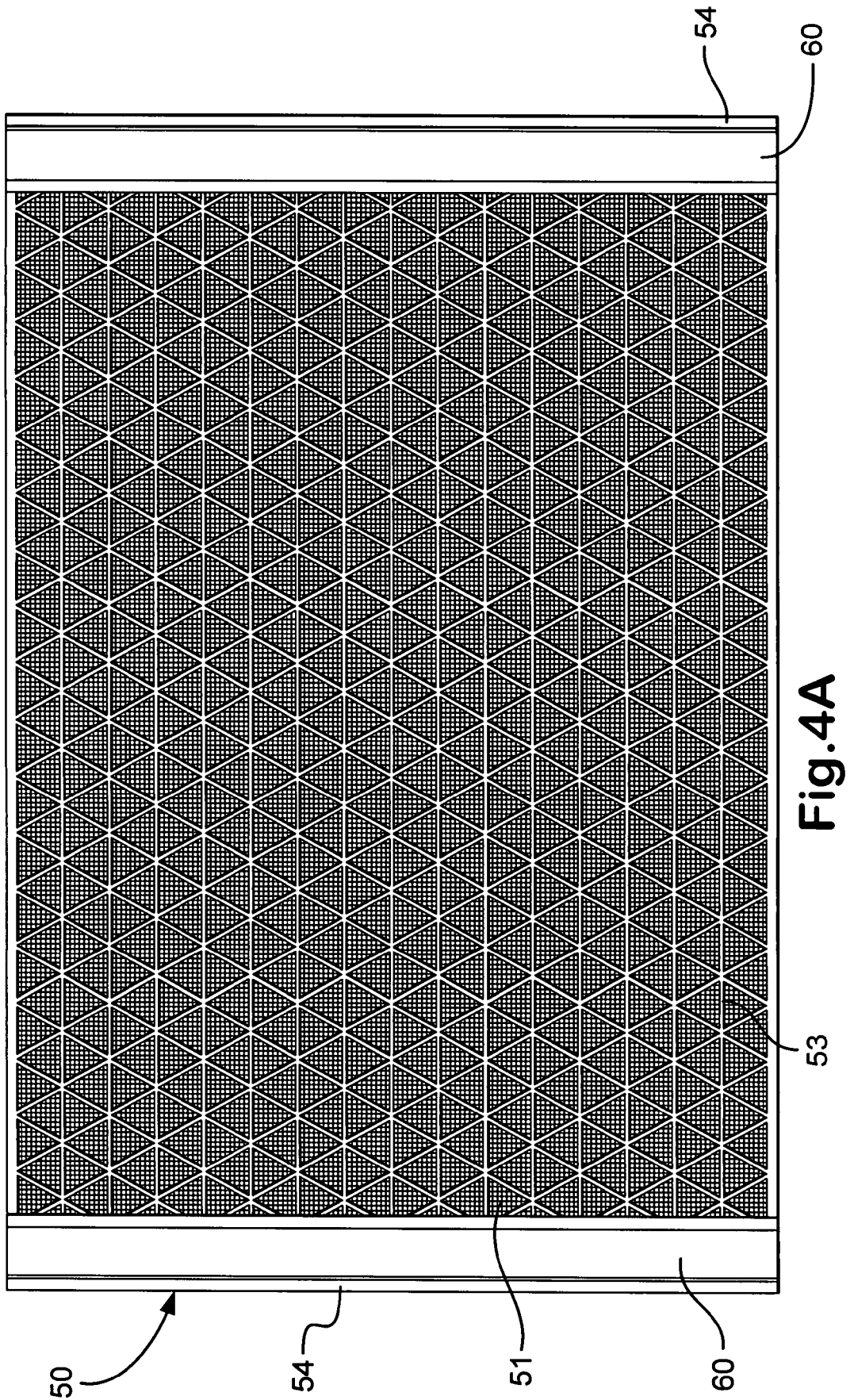
FIG. 4A is a top view of a screen assembly according to the present invention.
Figure 4B:
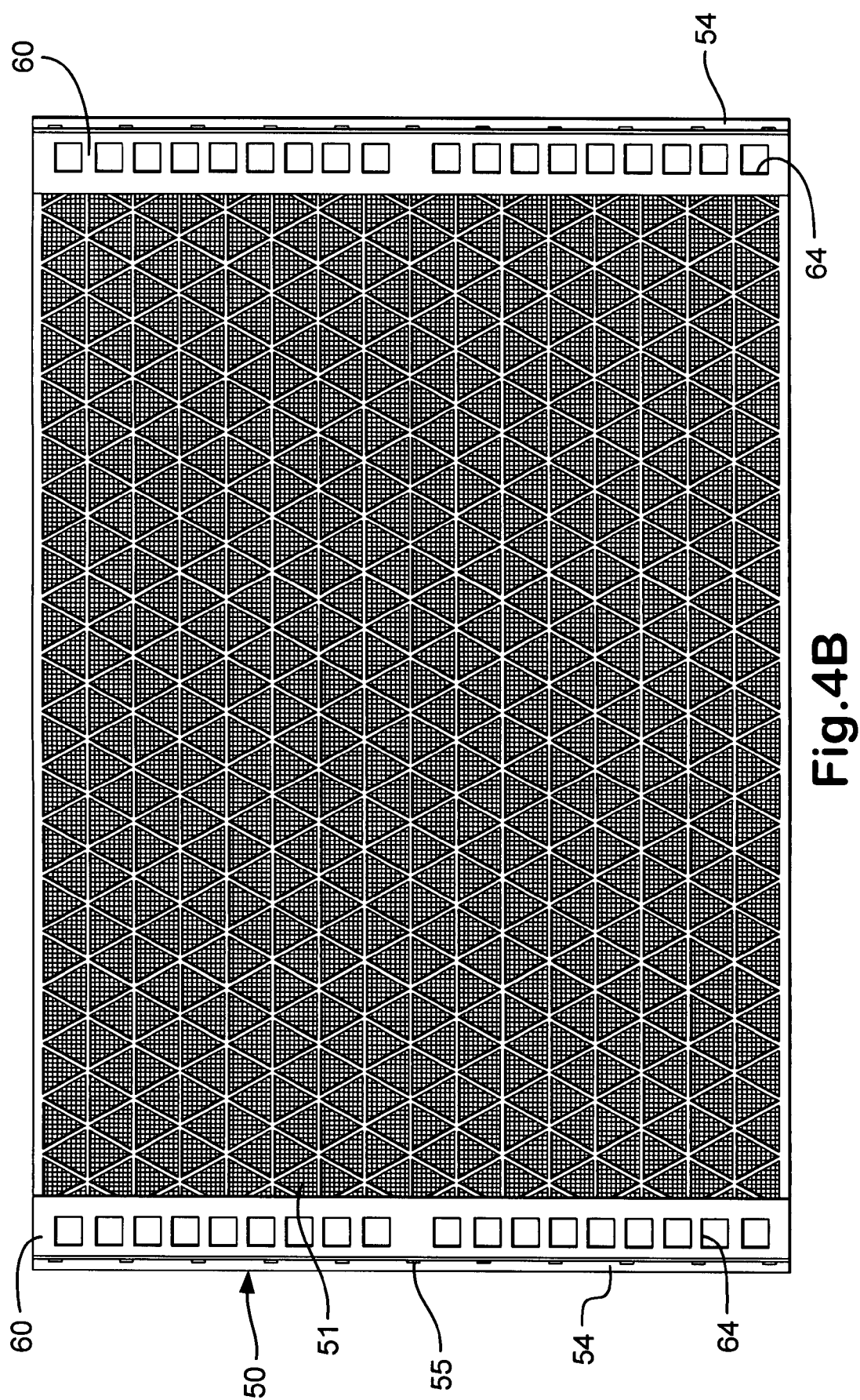
FIG. 4B is a bottom view of the screen assembly of FIG. 4A.
Figure 5A:
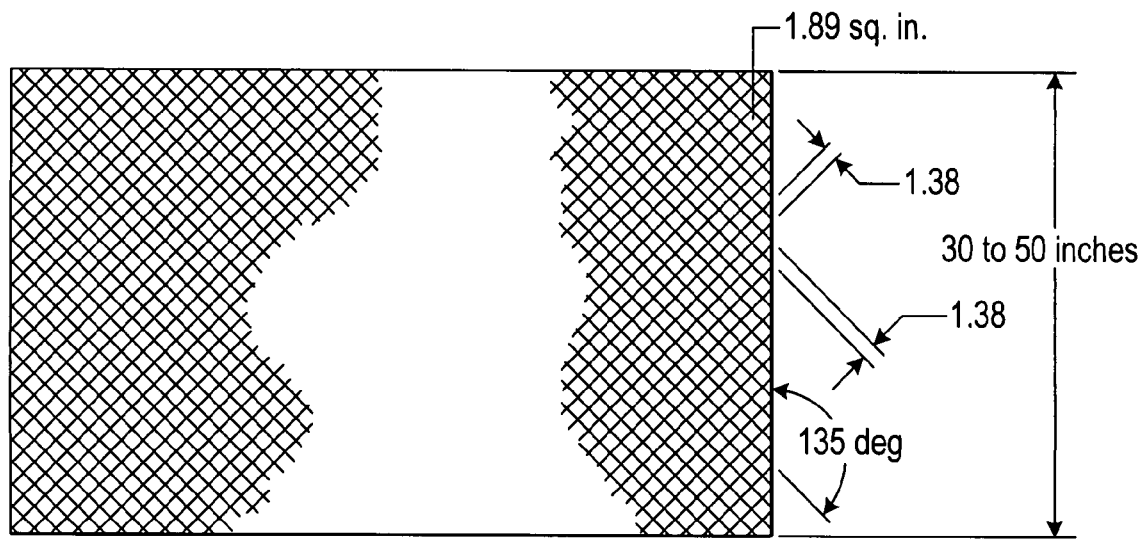
FIGS. 5A-5D are views of glue patterns applied by a system according to the present invention.
Figure 5B:
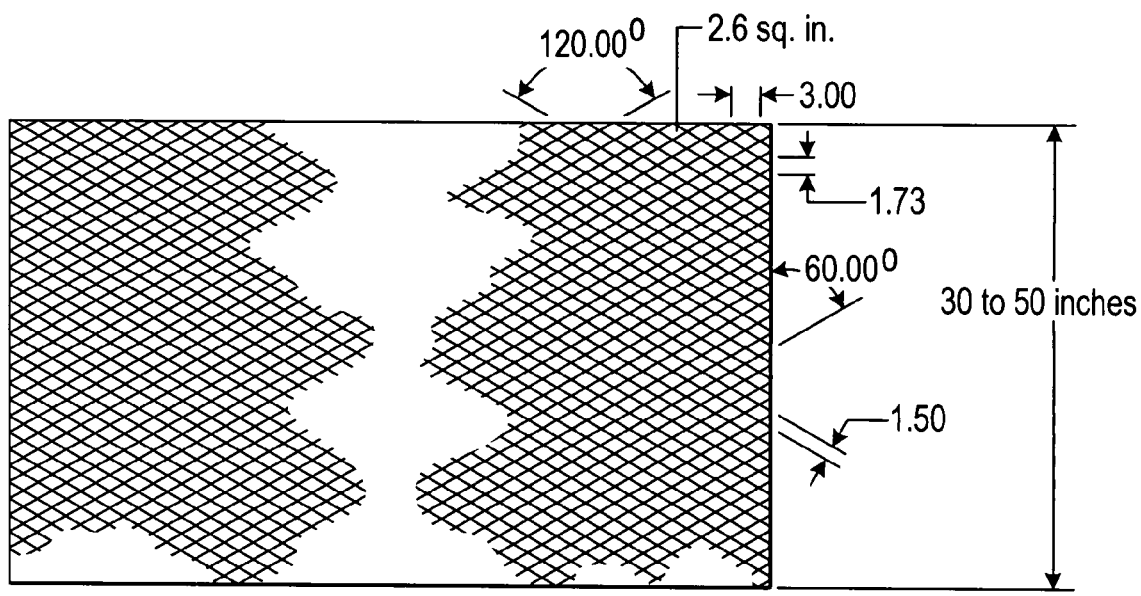
Figure 5C:
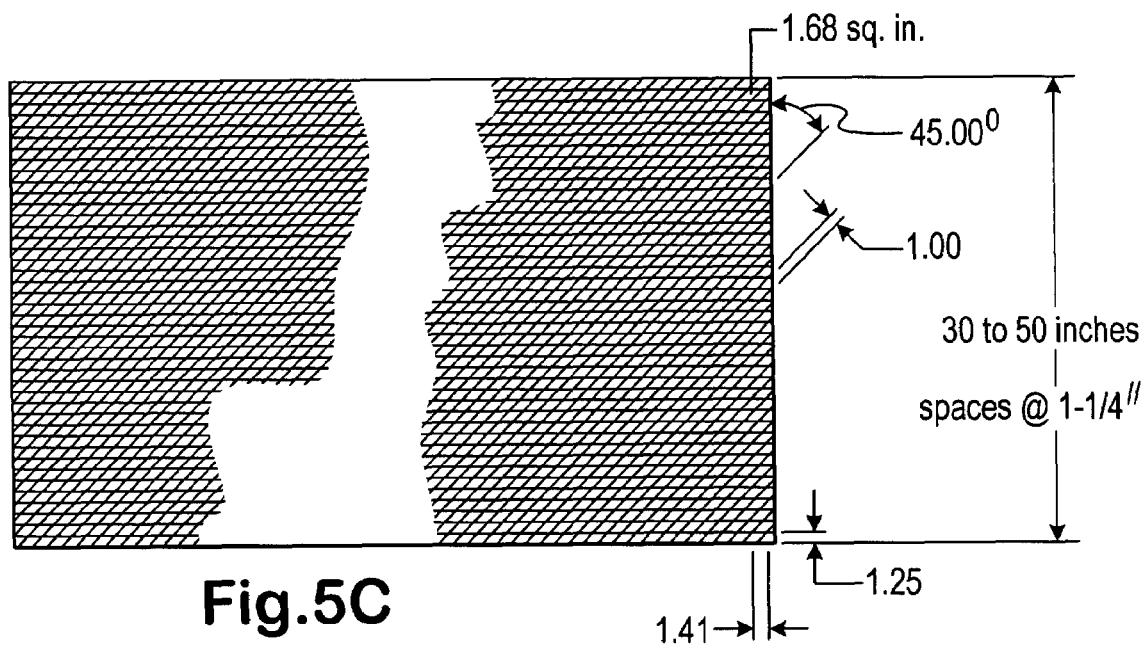
Figure 5D:
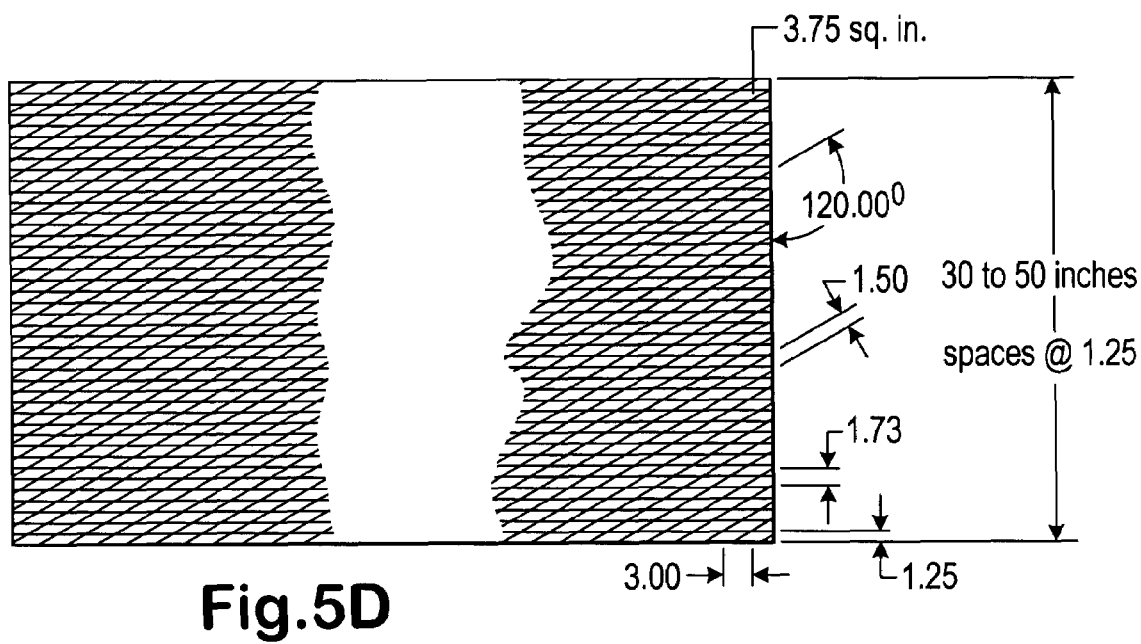

FIGS. 1A-1D show a screen assembly 10 according to the present invention which has layers 12 of screening material and side mounts 14. In one particular aspect there are three layers 12 of stainless steel screening material with a lowermost layer with mesh of 20×20, a middle layer of 105×64 mesh, and a top layer of 170×105 mesh; and these layers are glued together with hot melt glue applied in the diamond pattern shown in FIGS. 1A and 1B. Of course it is within the scope of this invention for the layers 12 to be any known screening material with layers bonded, connected, fused, sintered, glued together, or sewn together in any known manner and the screening material may be made of any known material used for such screen assemblies.

In certain aspects, the layers 12 of screening material are glued together with cured hot melt glue producing glued-together screening material that is flexible and a screen assembly according to the present invention with such material can be folded on itself or rolled up.

FIG. 3 shows an alternative pattern P for glue applied to one or more of the layers 12.

Each side mount 14 has a bottom part 21, a side part 22, a top part 23, a top lip 24, and a top lip 25. The layers 12 pass between and are secured between the bottom part 21 and the top lip 24. An end of the layers 12 is held between opposed parts 25a and 25b of the top lip 25. The top lip 24 may, optionally, be adhesively secured together and/or welded to the bottom part 21 with multiple spaced-apart welds 26 along the length of the side amounts 14. Similar adhesive material and/or welds may be, optionally, used along the top lip 25. In other aspects, the welds 26 are deleted or are supplemented with glued areas along the mounts 14. Alternatively, or in addition, inwardly projecting teeth or humps on the top lip 24 and/or bottom part 21 may be used to hold screening material. The bottom part 21 has a plurality of spaced-apart holes 29 for receiving corresponding upwardly-directed projections of a screen mounting structure or apparatus of a shale shaker or vibratory separator. Optionally ends 16 of the side mounts 14 are sealed with any suitable seal material or seal structure. As shown in FIG. 1D, an amount of hot melt glue 27 has been applied over the end opening 16 and allowed to set. Optionally, such material may encapsulate the edge of screening material layers 12. In certain aspects the side mounts are made of plastic, epoxy, acrylic, steel, stainless steel, fiberglass, composite, aluminum, aluminum alloy, zinc, zinc alloy, brass or bronze. Optionally the top part 23 is deleted and a generally "L" shaped side mount is provided and it is within the scope of this invention to provide such a side mount with any seal or handling apparatus described herein.

A plurality of screws 31 secure a seal member 30 to the side part 22. In one aspect the seal member 30 is (as may be the case for any seal or seal member according to the present invention) made of neoprene, but it may be made of nitrile rubber, rubber, plastic, gasket material, polyurethane, or any suitable seal material. The seal member 30 has an upper portion 32 of generally circular cross-section (but, according to the present invention, this cross-section may be any desired shape, including, but not limited to, square, oval, and rectangular). Optionally, the upper portion 32 is hollow and, e.g. may have a space 33 of a generally circular (or of any desired shape) cross-section. An elongated part 34 of the seal member 30 extends down from the upper portion 32. The seal member 30 is, in one aspect, positioned so that when the screen assembly 10 is in place on a shale shaker or vibratory separator, the seal member 30 is trapped between the screen assembly 10 and the side wall of a basket or other screen holding structure. In another aspect the seal member 30 is positioned so that the upper portion 32 is above a top edge of the top lip 25. The seal member 30 may be adhesively secured to a side mount.

FIG. 2 shows a screen assembly 40 according to the present invention which has side mounts 44 (like the side mounts 14, FIG. 1D); one or more layers 42 of screening material (like the layer or layers 12 of the screen assembly 10); and one, two, three or more layer(s) 46 of ridged or undulating screening material on and/or connected to the layer(s) 42. The screening material layer(s) 46 may be any known undulating or ridged screening material, including, but not limited to, that disclosed in U.S. Pat. Nos. 6,450,345; 5,868,929; 5,720,881; 5,958,236; 5,876,552; 5,636,749; 5,417,858; 5,417,793; 5,417,859; and 5,944,993, all fully incorporated herein fully for all purposes. In the screen assembly 40 a portion of the layers 46 may pass with the layer(s) 42 between the bottom part and lower lip of the side mounts 44 and, if desired, into the top lip. Alternatively only the layer(s) 42 are secured within the side mounts 44.

FIGS. 4A-4F show a screen assembly 50 according to the present invention which has glued-together layers 51 of screening material whose side edges 52 are secured in side mounts 60. Glue in a pattern 53 extends across the surfaces of the layers 51 and has a different pattern than that of the layers 51.

Each side mount 60 has a seal 54 secured thereon with plastic rivets 55. The seal 54 is like the seal member 30 described above. The side mounts 60 are like the side mounts 14, described above, but edges 61 of the layers 51 do not extend up into an uppermost lip 62 of the side mounts 60. Instead, these edges 61 are folded as shown within the side mounts.

As shown in FIG. 4F, unlike the prior art screens with perforated plates, the screen assembly 50 (and any other screen assembly according to the present invention which has layers of screening material glued together with hot melt glue or similar glue) is flexible enough to fold it or to roll it up into a roll 63. Alternatively, the screen assembly 50 may be folded, e.g. folded in half, thirds or fourths. It is within the scope of this invention to delete the side mounts 60 and substitute for them any known hookstrip or other tubular or screen mounting edge structure.

It is within the scope of the present invention to secure together the layers 51 (or any layers of any screen assembly according to the present invention) with plastic, including, but not limited to, any known plastic, thermoplastic, polypropylene, or nylon used to secure screening material layers together. The use of such material that does not result in a screen flexible as are those made with hot melt glue or its equivalents will result in a screen assembly that cannot be rolled up like the screen assembly 50 as shown in FIG. 4F.

The side mounts 60 and screen material layers therein may be welded, e.g. with resistance welds, like the welds 26 described above. The side mounts 60 each have a series of spaced apart openings 64 into which project teeth, fingers, or projecting members of a shale shaker screen assembly mounting apparatus. The ends of side mounts 60 may be filled, as are the side mounts 14 described above, with PUR or other suitable filler, foam, and/or sealing material, e.g. to a thickness of between one-half to three-fourths inches thick. Alternatively the entire side mount is filled.

FIGS. 5A-5D show possible glue patterns that may be applied by systems according to the present invention (including, systems as disclosed in U.S. application Ser. No. 09/517,212 filed Mar. 2, 2000; Ser. No. 10/037,474 filed Oct. 19, 2001; Ser. No. 09/454,722 filed Dec. 4, 1999 and Ser. No. 10/087,025 filed Oct. 19, 2001). These patterns can be achieved by appropriate control of rate of movement of the screen or mesh and/or by the rate and/or direction of travel of glue dispensing nozzle(s). In FIGS. 5A-5D, angle measurements are in degrees (either "°" or "deg"), length measurements are in inches ("inches" or "in" or a number, e.g. FIG. 17A "1.38" is 1.38 inches) and area measurements ("sq. in.") are in square inches.

Figure 6:
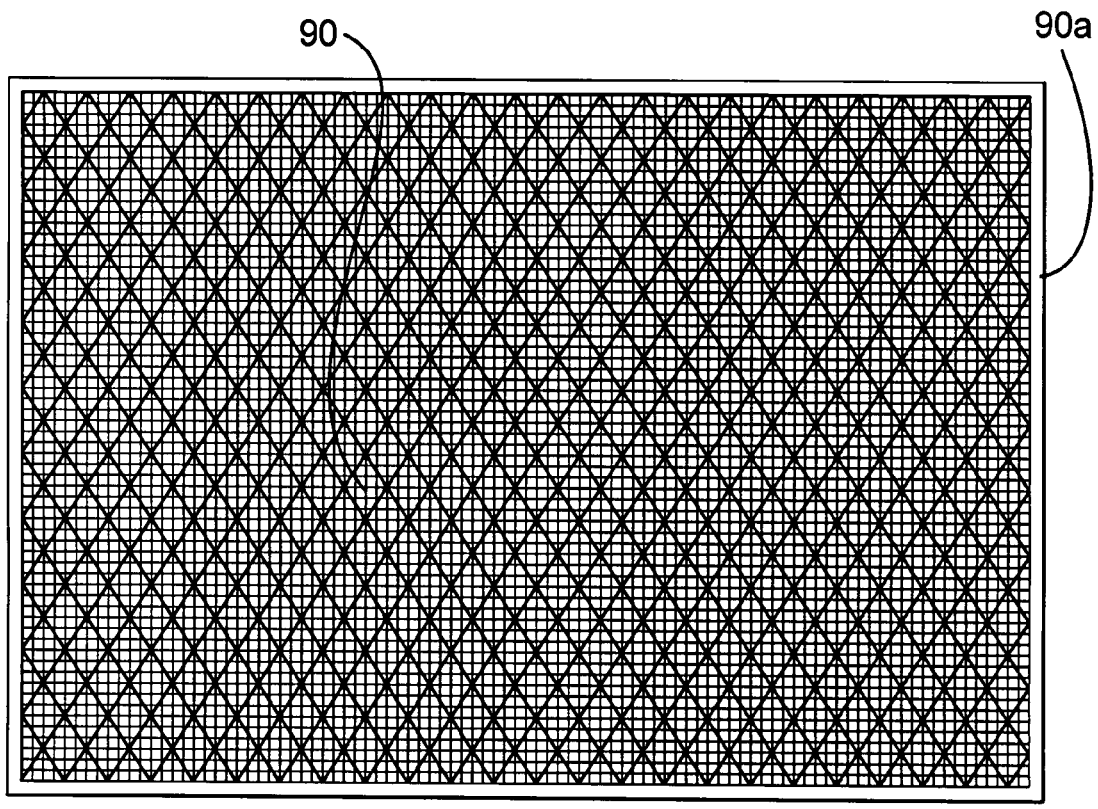
FIG. 6 is a top view and FIG. 7 is a top view, partially cut away of screen assemblies according to the present invention.
Figure 7:
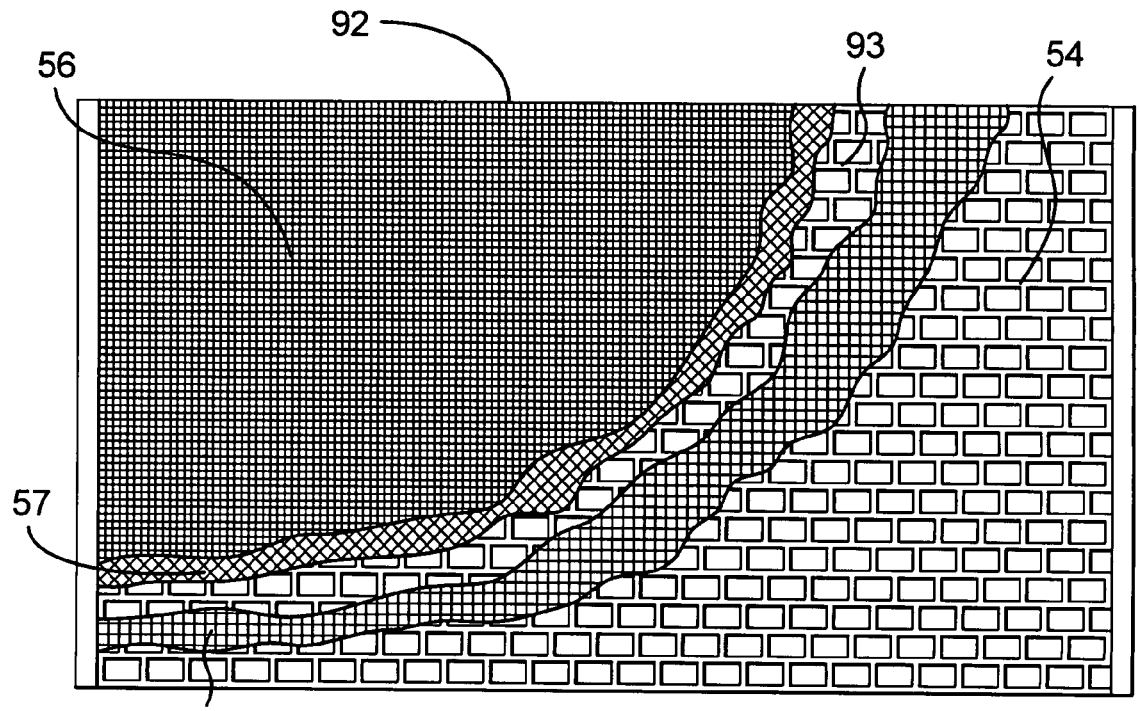
Figure 18A:
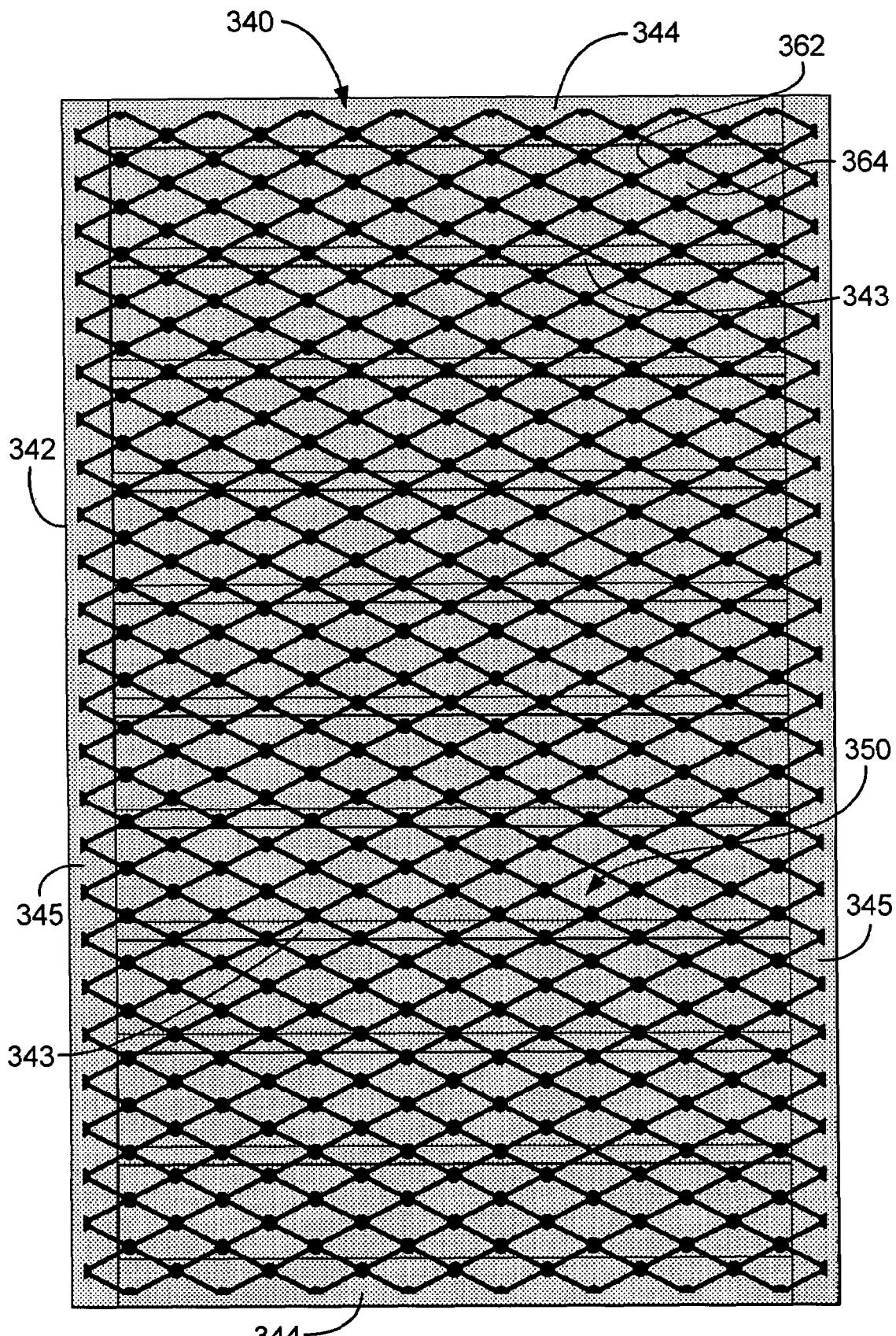
FIG. 18A is a top view of a screen assembly according to the present invention.
Figure 18B:
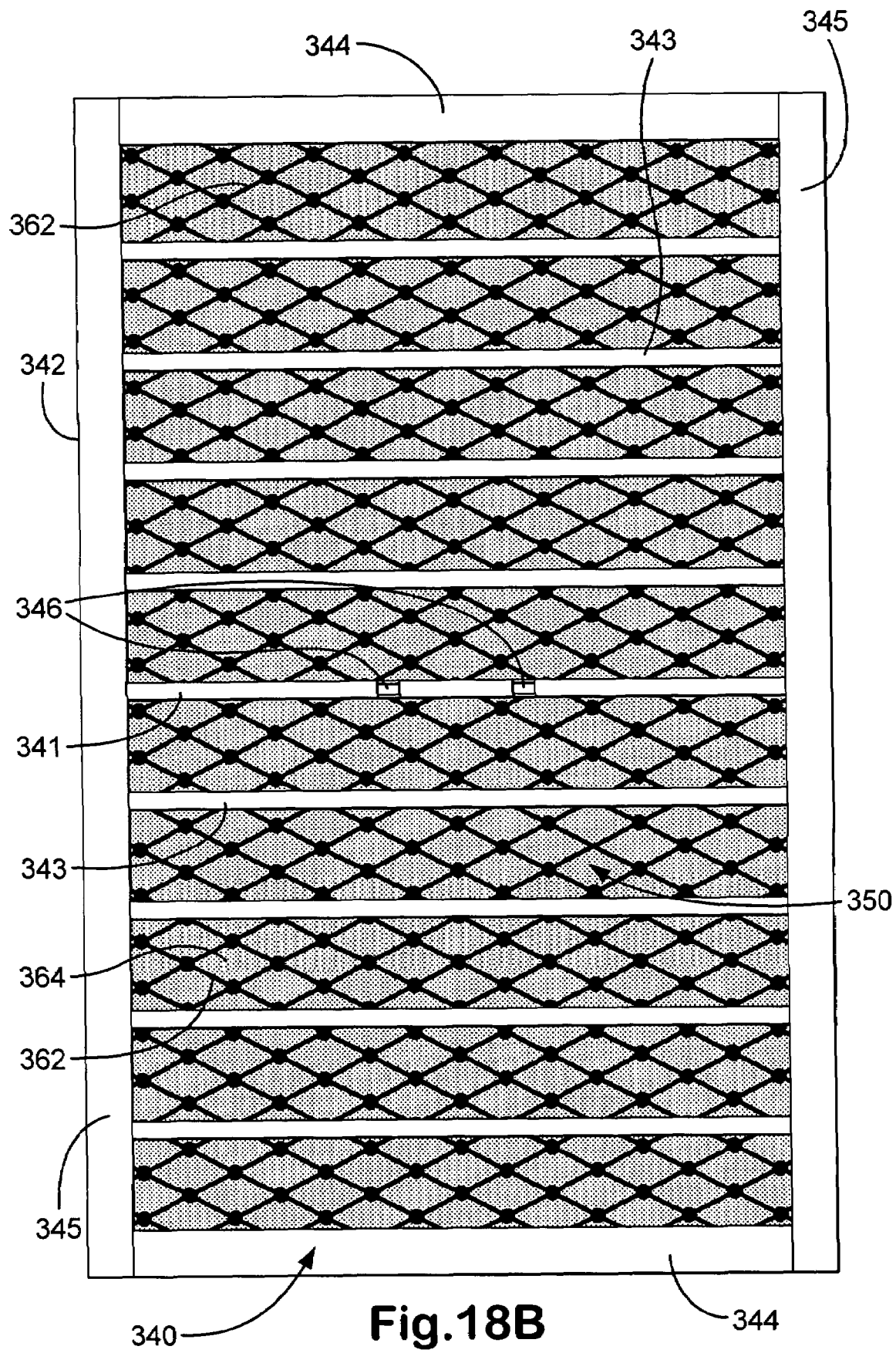
FIG. 18B is a bottom view of the screen assembly of FIG. 18A.
Figure 18E:
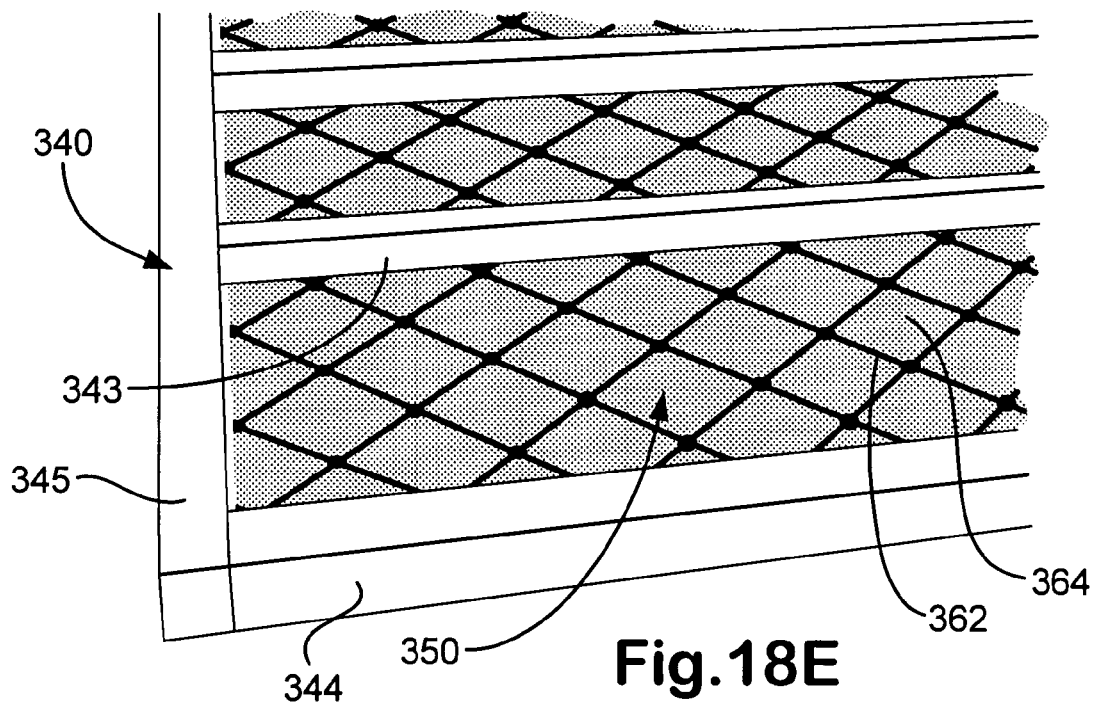
FIG. 18E is a partial bottom perspective view of the screen assembly of 18A.
Figure 18F:
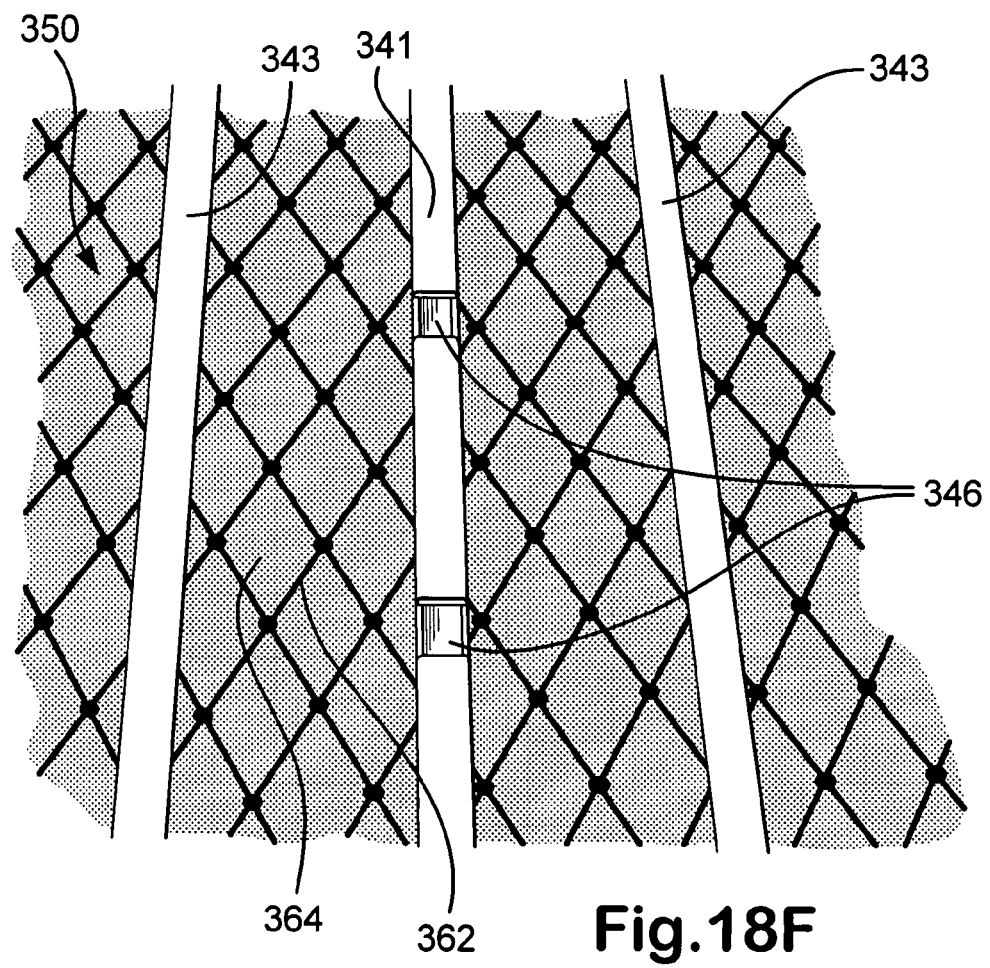
FIG. 18F is a partial bottom view of the screen assembly of FIG. 18A.
Figure 23A:
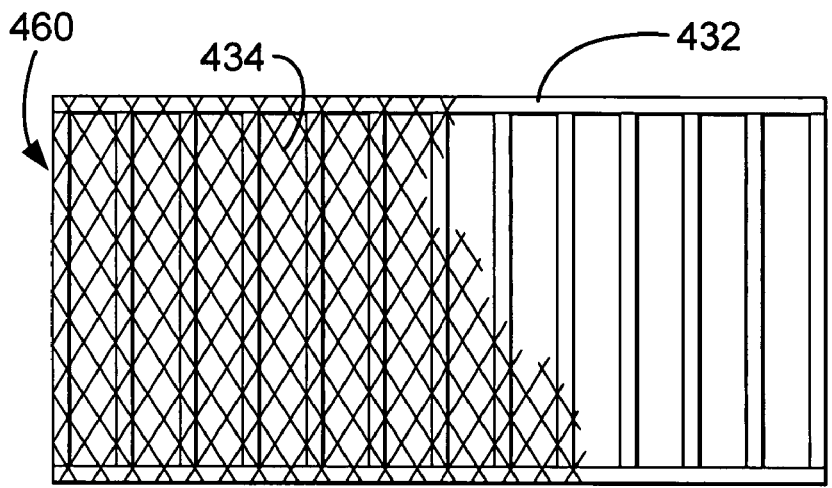
FIG. 23A is a top view of a screen assembly according to the present invention.
Figure 23B:
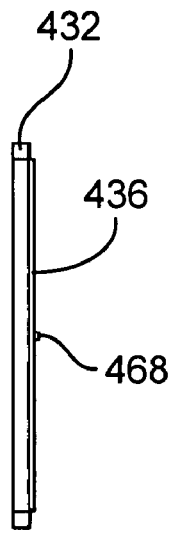
FIG. 23B is an end view.
Figure 23C:
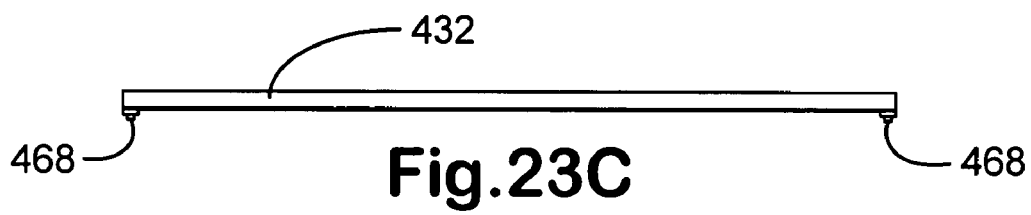
FIG. 23C is a side view and FIG. 23D is a bottom view of the screen assembly of FIG. 23A.
Figure 23D:
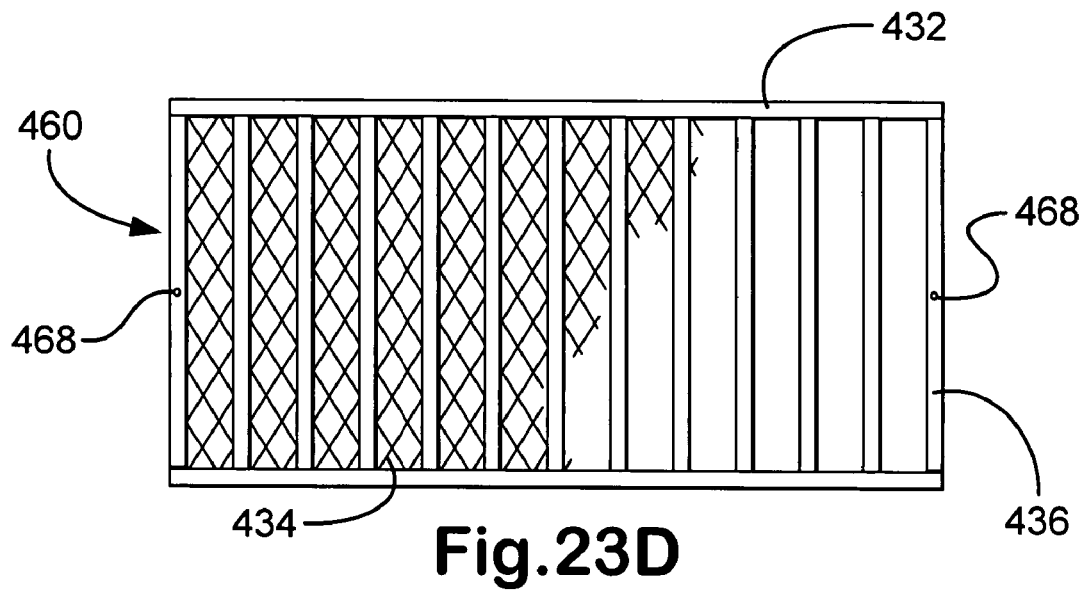

FIG. 6 shows a screen 90 produced with any of the systems disclosed in U.S. application Ser. No. 09/517,212 filed Mar. 2, 2000; Ser. No. 10/037,474 filed Oct. 19, 2001; Ser. No. 09/454722, filed Dec. 4, 1999 and Ser. No. 10/087,025 filed Oct. 19, 2001). An optional frame 90a is used around the screen 190. FIG. 7 shows a screen 92 with a glue layer 93 according to the present invention produced with any of the systems disclosed in U.S. application Ser. No. 09/517,212 filed Mar. 2, 2000; Ser. No. 10/037,474 filed Oct. 19, 2001; Ser. No. 09/454,722 filed Dec. 4, 1999 and Ser. No. 10/087, 025 filed Oct. 19, 2001). The screen 92 is like the screens disclosed in U.S. Pat. No. 4,575,421 (incorporated fully herein for all purposes), but made with a system according to the present invention and by a method according to the present invention. The screen 92 has three layers of mesh or screening material 56, 57 and 58 and a lower perforated plate 54. Any of the layers of mesh may be deleted and the glue 93 may be applied on top of any of the layers. In one aspect the plate 54 is deleted. In one aspect the plate 54 is deleted and any other support is used. The screen 90 is like a screen disclosed in U.S. Pat. No. Des. 366,040 (incorporated fully herein for all purposes) and U.S. Pat. No. 5,971,159 (incorporated fully herein for all purposes).

FIG. 8 shows a glue/substrate combination 1450 with a paper substrate 1452 and a glue pattern 1454 deposited thereon (e.g. by any apparatus and by any method disclosed herein, by hand, or by any suitable machine or apparatus; using any glue suitable for use in a screen assembly for a vibratory separator). Alternatively the pattern may be any desired pattern including any pattern disclosed herein, with or without edges and/or with or without one or more shear lines of glue.

FIG. 9A illustrates a roll 1451 of the glue/substrate combination 1450 of FIG. 8. As shown the roll is rolled with the substrate on the roll's exterior and the glue pattern disposed internally of the roll; but it is within the scope of this invention for the position of these components to be reversed (as is true of any roll of material according to the present invention), e.g. as shown in FIG. 9B. Such a roll (and any roll of material described herein) may be unrolled for subsequent use. In certain aspects, as needed, such a roll of material may be heated to facilitate its unrolling.

FIG. 10A illustrates a piece of release liner material 1462 (or wax paper or waxed cardboard) to which a glue pattern is to be applied. FIG. 10B shows a resulting glue pattern 1464 applied to the release liner material 1462. FIG. 10C shows the resulting layer of glue pattern 1464 after it has been separated from the substrate of release liner material 1462. The layer of glue pattern 1462 may be used flat as shown in FIG. 10C; or as shown in FIG. 10D it can be rolled into a roll 1461 for further future use.

FIG. 11A shows a screen assembly 1470 according to the present invention with a glue pattern 1474 according to the present invention that has been separated from a substrate to which it was previously applied. The glue pattern 1474 has been applied onto a layer (or layers) of screening material 1473. According to the present invention the glue pattern 1474 (any glue pattern according to the present invention) may be pressed onto and/or into the screening material 1473 and/or heat may be applied to the combination of glue pattern and screen layer to fuse and/or connect the two together and/or to impregnate the screening material 1473 with some or all of the glue pattern 1474. The screening material 1473 may be any screen, screens, mesh, or meshes, or any combination thereof. The glue pattern and screen layer(s) may be pressed together in any suitable manner; e.g., but not limited to, between dual opposed pressing rollers, by a flat plate (heated or not) placed on top of the combination; and/or between the flat plates of a press apparatus.

FIG. 11B shows a screen assembly 1480 according to the present invention which has a glue pattern layer 1484 (like the glue pattern 1474, FIG. 11A or any of its alternative versions) between two screen layers 1483, 1485 (each like the screen layer 1473, FIG. 11A or any of its alternative versions). FIG. 11C illustrates a screen assembly 1490 with two glue pattern layers 1494, 1496 (each like the glue pattern layer 1474, FIG. 11A, or any of its alternative embodiments). A screen layer 1493 (like the screen layer 1473, FIG. 11A or any of its alternative embodiments) is disposed between the glue pattern layers 1494, 1496. The components of the screen assemblies of FIGS. 11B and 11C may be heat treated and/or pressure treated as are the components of the screen assembly 1470, FIG. 11A, as described above.

FIG. 12 shows a screen assembly according to the present invention with a screening material layer 1499 on either side of which are glue pattern layers 1495 and 1497. Each glue pattern layer has not been separated from a substrate 1492, 1498 respectively on which the glue pattern layers have been previously deposited. The screening material layer 1499 may be any screening material disclosed herein. The substrates 1492, 1498 may be any substrates disclosed herein. In one particular embodiment the substrates are suitable cardboard release material (e.g. waxed) which serves as a protective cover or package (with ends appropriately folded over and/or sealed) for the resulting screen assembly. Such cardboard may be sized and of such a nature to withstand any heat treatment and/or pressure treatment to the glue/screening material combination.

It is within the scope of this invention for any screen assembly described herein that includes a glue pattern layer to include a substrate on which the glue pattern layer is formed. The substrate is subsequently removed from the resulting screen assembly by peeling it away, by burning, by chemical degradation (chemical applied with or without pressure) or by liquid (e.g. water) blasting. In any embodiment of a screen assembly herein that employs a glue/substrate combination in the screen assembly, the substrate side or the glue pattern side may be on the exterior on either top or bottom (or both) of the screen assembly. It is also within the scope of this invention for the substrate to include multiple layers of similar or different material. Also, any glued screen layer or layers may be rolled up into a roll according to the present invention without a separator sheet or release liner; or with a separator sheet or release liner material under the layer or layers so that screen does not touch screen in a resulting roll of screening material.

When curing glue is in such a roll, using such a separator or liner prevents undesired gluing together of screening material within the roll. A screen assembly with layers connected together by cured glue may be folded and/or rolled up for ease of handling and/or for ease of packaging and/or shipping.

"Screening material" for any screen or screen assembly disclosed herein may be any screening material(s) and/or layer(s) disclosed or referred to herein and it may, optionally, be corrugated following glue application. Such corrugation may be in the form of any corrugated screen disclosed in the prior art for use on vibratory separators or shale shakers.

FIG. 13 shows a screen side mount 100 according to the present invention which has a main member 102 to which is connected a secondary member 104, e.g. by resistance welding and/or adhesives. As shown the members 102, 104 are spaced apart (prior to their connection together) to illustrate areas 106, 108 defined, respectively, by portions 101, 103 and 105, 107 of the member 102, 104. Screening material (not shown) may pass through area 106 and, in one aspect, into area 108. An end opening 109 may be left open or it may be sealed off (e.g. as described above for the side mount 14). A series of spaced-apart holes 102a (two shown) in the main member 102 are like the holes 29, FIG. 1B, and the openings 64, FIG. 4B. There may be any desired number of holes 102a (one, two, three, etc.) and, in one aspect, such holes are spaced-apart along the entire length of the screen side mount 100.

FIG. 14 shows a screen side mount 110 according to the present invention which is formed of a single piece of material 112, (e.g. metal or plastic) which is formed, folded or bent as shown in FIG. 14. A resulting upper edge 114 serves as a rigid handle for manipulating holding, lowering, and raising a screen assembly with such a screen side mount. The screen side mount 110 is similar to the side mount 60, FIG. 4E. A series of holes 116 extend along the length of the screen side mount 110. Screening material may pass between a lip 111 and a lower portion 113 and, in one aspect, may extend up and between top portions 115, 117. The lip 111 and lower portion 113 may be welded together and/or adhered together with adhesive material, as may be the top portions 115, 117.

The edge 114 may serve the functions of: stiffening a screen assembly during use, handling, and shipment; protecting a mid-portion 119 during handling and shipment; and preventing curling of a screen assembly according to the present invention that has flexible screening material. Since the edge 114 is relatively rigid (as opposed to a flexible floppy piece of wire, rope, or cable), it can be pulled on and also torque can be applied to it which is useful in removing a screen assembly from its operational position on a vibratory separator or shale shaker.

FIG. 15 illustrates a rigid handle 122 on a screen side mount 120 according to the present invention which has some of the advantages of the rigid edge 114 described above. The handle 122, in certain aspects, is metal and is welded to a metal screen side mount 120. Alternatively sufficiently rigid and strong plastic, composite, or fiberglass may be used. One, two, three or more such handles may be used with the screen side mount 120 (and with any side mount according to the present invention). Optionally or alternatively, the side mount 120 has one, two, or any desired number of rigid projections 123 with a base 125 and an optional crossmember 127 connected to the side mount 120 as is the handle 122.

FIG. 16 shows a seal member 130 according to the present invention made of any of the materials described above for seal member 30. Formed integrally with or secured to the seal member 130 is a handle 137 useful for handling, moving, and manipulating a screen assembly with a side mount with a seal member 130. The seal member 130 has an upper portion 132 (like the upper portion 32, FIG. 1D) and an elongated portion 134 (like the elongated portion 34, FIG. 1D). It is within the scope of this invention to have a seal member with one, two, three or more handles like the handle 137. Optionally, the upper portion 132 is deleted (as may be the case for the upper portion 32, FIG. 1D). The handle 137 has upright parts 137*a* and a crossmember 137*b*. The crossmember 137*b* may be deleted and one, two, three, or any desired number of upright parts 137*a*, with or without holes for human fingers, may be used to facilitate handling of a screen assembly using a seal member 130. Optionally or alternatively, one or more (two, three, any desired number) "T" shaped upright parts 138, with or without holes for human fingers, may be used formed with or secured to the seal member 130 to facilitate handling and manipulation of a screen assembly with a seal member 130.

FIG. 17 shows a seal member 140 used in a position on a screen side mount as are the seal members 30, 54, and 130. As may be the case with any seal member according to the present invention, the seal member 140 has cut out portions 141 which define openings so that a hand or finger may be inserted therethrough to facilitate handling and manipulation of a screen assembly with a seal member 140. It is within the scope of this invention to use one, two, three or any desired number of such openings of any desired shape for the seal member 140 (or with any seal or seal member according to the present invention). An optional seal portion 142 extends from a main body 143 of the seal member 140. The seal portion 142 may be positioned as are the seal members 30, 54, and 130 on a screen assembly with the portion 142 either between a screen assembly and a basket wall or above the screen assembly.

FIGS. 18A-18F show a screen assembly 340 according to the present invention which has a tubular frame 342 with ends 344 and interconnected sides 345. A screening material combination 350 is secured with cured epoxy to the tubular frame 342. A crossmember 341 (of a plurality of spaced-apart crossmembers 343 that extend between and have ends connected to the sides 345) has two notches 346, either of which is for receiving a portion of an upstanding member of a shale shaker deck.

In certain shale shakers in which screen assemblies without crossmembers such as the crossmember 341 are used, one or more upstanding members are located so that they do not push up on a screen assembly above them and such upstanding members are often used for proper screen assembly positioning, for preventing unwanted screen movement with respect to a shaker deck, or for stabilizing screen assemblies in position. Rather than removing such upstanding member(s) when a screen assembly is used that does have one or more crossmembers that would undesirably abut the top of an upstanding member (preventing correct screen assembly emplacement on a deck), a screen assembly according to the present invention may be installed on such a shaker deck so that a portion of the upstanding member (which is perpendicular to the crossmember 41 as viewed from above or below) is received in and projects into one (or more) of the notches 346. With a screen assembly 340 as shown, the crossmembers 343 on either side of the crossmember 341 are sufficiently spaced-apart from the crossmember 341 that the upstanding member does not contact the adjacent crossmembers 343. Although only one notch 346 can accommodate an upstanding member, by using two notches 346, proper emplacement of the screen assembly 340 over the upstanding member is made "fool proof"—i.e. whichever side of the screen assembly is placed nearest the shaker's exit end (or fluid introduction end) one of the notches will be above the upstanding member. Of course it is within the scope of the present invention to place aligned notches on adjacent crossmembers to accommodate an upstanding member of such dimensions that it extends beyond the distance separating two, three, four or more crossmembers. The screen assembly 340 as shown has a multi-layer combination 350 of layers of screening material glued together with moisture curing hot melt glue in a glue pattern 362. The multi-layer glued-together combination 360 is secured to the tubular frame 342 with cured epoxy.

FIG. 19 shows a mounting structure (or "tray") 400 for a shale shaker on which is releasably securable one or more screen assemblies. As shown a screen assembly mounts on and covers tray 400, but it is within the scope of this invention to have a larger tray on which two, three or more screen assemblies are secured or to have multiple trays 400 on a single shale shaker (as is true for any tray or mounting structure according to the present invention disclosed herein). Although a particular tray is shown in FIG. 19, it is to be understood that, according to the present invention, the teachings of the various holes and projecting members for trays (e.g., but not limited to, as in FIGS. 19-49) are applicable to known screen mounting structures for shale shakers in which and on which the holes and upstanding members may be used; and similarly for the screen assemblies according to the present invention (e.g., but not limited to as shown in FIGS. 20A-48) the various holes and projecting members may be used with any suitable known screen assembly.

The tray 400 has two spaced-apart outer ends 402, 404 which are spaced-apart by sides 406. The entire tray 400 is positioned in and connected to a basket or other suitable enclosure or housing of a shale shaker. Crossmembers 408 extend from end to end of the tray 400 and crossmembers 410, 412 extend between crossmembers 408 and sides 406. A support member 409 extends beneath one of the crossmembers 408 (and such a support may be under any crossmember). Wear strips 414 are connected to tops of the sides 406 and wear strips 416 are on tops of some of the interior crossmembers. An upstanding member 420 projects upwardly from each end 402, 404 of the tray 400. Each upstanding member 420 is located, sized, and configured for receipt within a corresponding hole of a screen assembly placed on the tray 400. Fluid to be treated by a shale shaker with a tray as in FIG. 19 (or any tray disclosed herein) may flow across a screen assembly placed on the tray in any desired direction; and one such direction is indicated by the arrows AA and BB in FIG. 19.

FIGS. 20A-20D show a screen assembly 430 according to the present invention which has a lower support frame 432 (which may be any known screen assembly support frame or which may, alternatively, be any known screen assembly support such as a strip support, perforated plate, or unibody structure). Screening material 434 (shown partially, but covering the frame 432) is on the top of the frame 432 and may be any known screening material used in screen assemblies for shale shakers, including, but not limited to, multi-layer screen meshes and/or flat or 3-D materials. A lower bar 436 is connected to or formed integrally of the frame 432 at each of its ends. Each end of the screen assembly 430 has a hole 438 for receiving a member projecting upwardly from a shale shaker's screen mounting structure, e.g., but not limited to, like the upstanding members 420, FIG. 19. The holes 438 do not extend through the top of the frame 432.

FIG. 20E shows possible shapes 439*a, b, c, d, e, f, g, h, i* and *j* as viewed from above, for any upstanding member or upwardly projecting member according to the present invention, and also for holes corresponding to such upstanding or upwardly projecting members.

FIG. 21 shows a tray 440 according to the present invention which is like the tray 400 (and like parts are designated with the same numerals), FIG. 19; but which has three upstanding members 420 at each of its ends, each for receipt within corresponding holes of a screen assembly to be emplaced on the tray 400. Tray ends or sides according to the present invention may have any desired number of upstanding or upwardly projecting members for receipt within corresponding holes of a screen assembly.

FIG. 22 shows a tray 450 like the tray 400 (and like parts are designated with the same numerals); but without any upstanding members 420 and with a hole 452 in each of its ends. The holes 452 are located, sized, and configured for receiving corresponding downwardly projecting members of a screen assembly emplaced on the tray 450.

FIGS. 23A-23D show a screen assembly 460 according to the present invention like the screen assembly 430, FIG. 20A, and like numerals designate like parts. Instead of holes 438, however, the screen assembly 460 has downwardly projecting members 468 on each of its ends. The downwardly projecting members 468 are located, sized, and configured for receipt within corresponding holes in a shale shaker's screen mounting structure, e.g., but not limited to, such as the holes 4552, FIG. 22.

Figure 24:
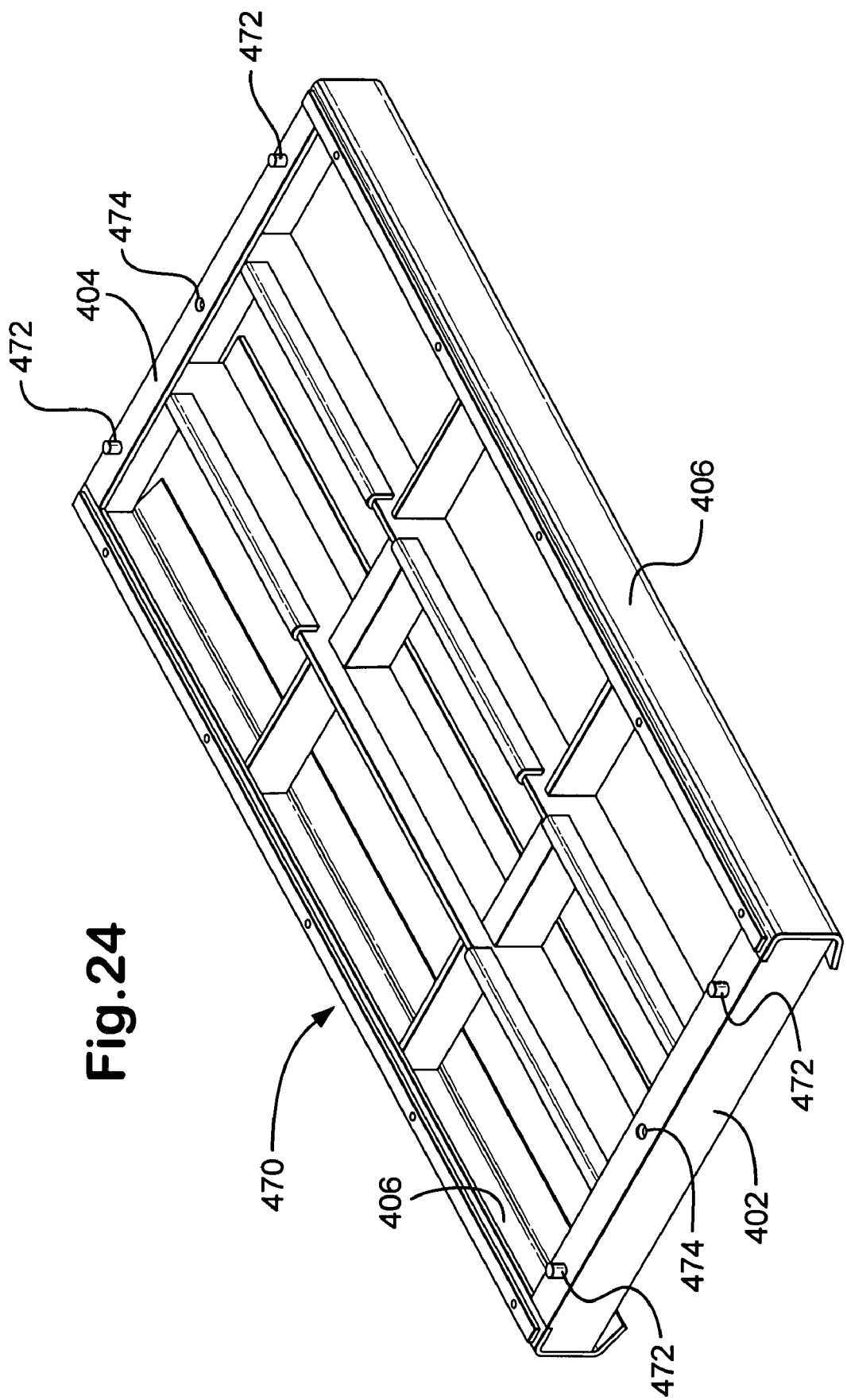
FIG. 24 is a perspective view of a screen assembly mounting structure for a shale shaker according to the present invention.

FIG. 24 shows a tray 470 according to the present invention like the trays 400 (FIG. 19) and 450 (FIG. 22); but with two upstanding members 472 at each of its ends and a hole 474 in each of its ends. Each upstanding member 472 is located, sized and configured for receipt within a corresponding hole of a screen assembly and the hole 474 is located, sized and configured for receiving a corresponding downwardly projecting member of a screen assembly. Either one or both of the upstanding members 472 may be deleted; there may be three or more upstanding members 4742; the hole 474 may be deleted; and/or there may be two, three or more holes 474—as is true for any tray according to the present invention.

FIGS. 25A-25H show schematically shale shakers according to the present invention with shale shaker decks (screen mounting structures) according to the present invention. The shale shakers of FIGS. 25A-25H are like the shale shaker of FIG. 10B and like numerals designate the same parts. It is within the scope of the present invention to employ any of the holes or upstanding members in FIGS. 25A-26H on any shale shaker mounting structure disclosed herein. Also, any screen assembly disclosed herein can have the hole(s) and/or downwardly projecting members of the screen assembly of FIG. 25G. It is to be understood that although the drawings of FIGS. 25A-25H show upstanding members or holes at only one side of a deck, the other side (not shown) of the deck may have the same structure, or it may have none of the structure shown.

Figure 25A:
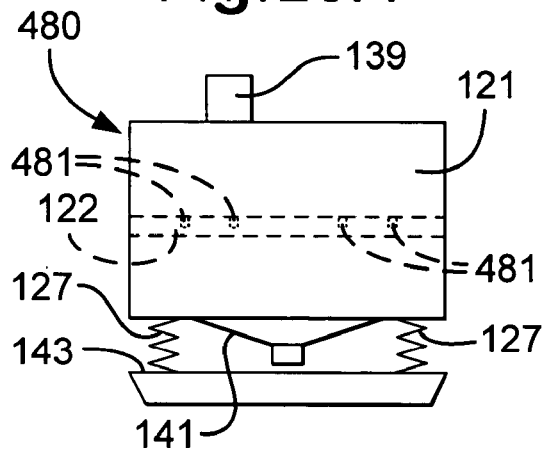
FIGS. 25A-F and 25H are side schematic views of shale shakers according to the present invention.

A shale shaker 480 shown in FIG. 25A has a plurality of spaced-apart holes 481, each hole for receiving a corresponding downwardly projecting member of a screen assembly placed on the shale shaker's deck. The holes 481 extend down substantially perpendicularly into the deck 122. Any number of holes 481 may be used (one-four or more).

Figure 25B:
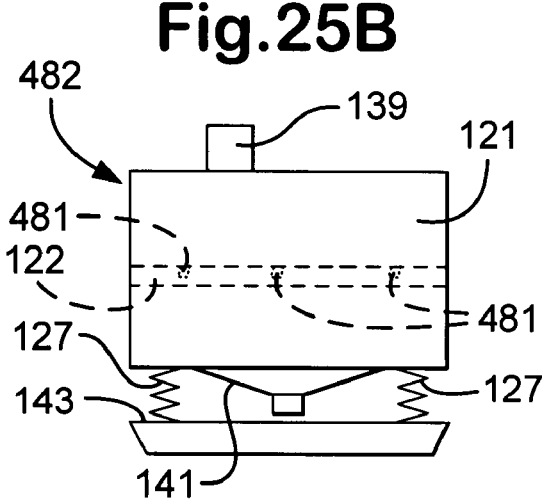

A shale shaker 482 shown in FIG. 25B has a plurality of spaced-apart holes 483, each hole for receiving a corresponding downwardly projecting member of a screen assembly placed on the shale shaker's deck. The holes 483 extend down at an angle (toward the left) into the deck 122. Any number of holes 483 may be used (one-four or more) and they may extend into the deck 122 at any desired angle, including, but not limited to, angled toward or away from a fluid introduction end or fluid exit end.

Figure 25C:
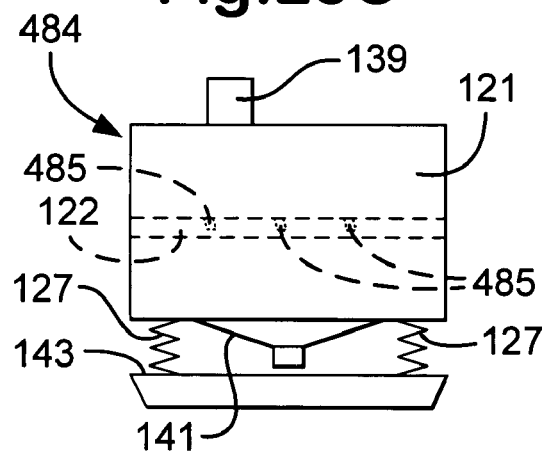

A shale shaker 484 shown in FIG. 25C has a plurality of spaced-apart holes 485, each hole for receiving a corresponding downwardly projecting member of a screen assembly placed on the shale shaker's deck. The holes 485 extend down at an angle into the deck 122. Any number of holes 485 may be used (one-four or more) and they may be angled at any desired angle in any desired direction.

Figure 25D:
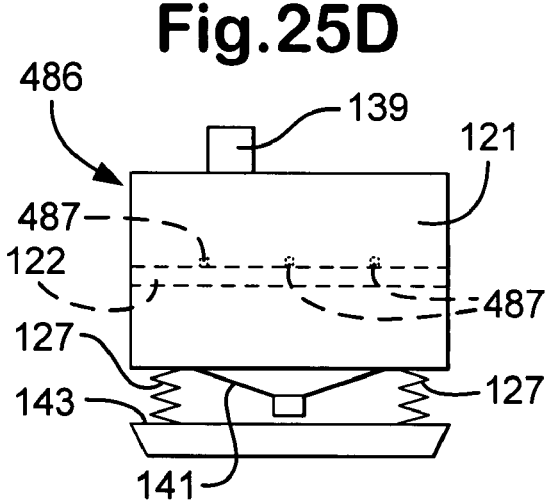

A shale shaker 486 shown in FIG. 25D has a plurality of spaced-apart upstanding members 487, each hole for receipt within a corresponding hole of a screen assembly placed on the shale shaker's deck. The upstanding members 487 extend up substantially perpendicularly to the deck 122. Any number of members 487 may be used (one-four or more).

Figure 25E:
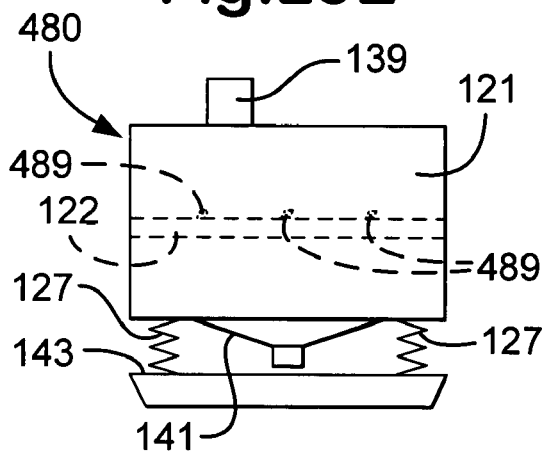

A shale shaker 488 shown in FIG. 25E has a plurality of spaced-apart upstanding members 489, each for receipt within a corresponding hole of a screen assembly placed on the shale shaker's deck. The upstanding members 489 extend up at an angle to the deck 122. Any number of members 489 may be used (one-four or more) and they may project from the deck at any desired angle in any desired direction.

Figure 25F:
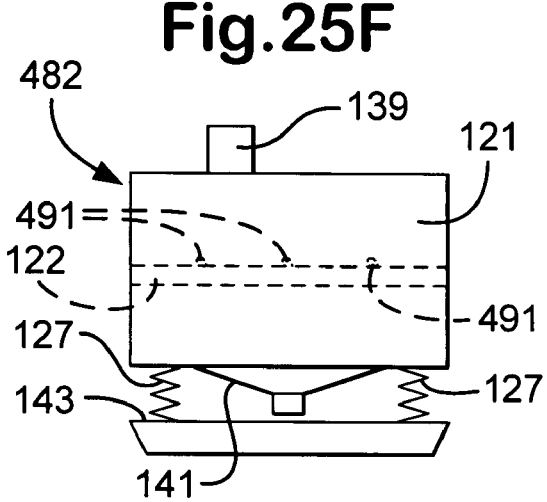

A shale shaker 489 shown in FIG. 25F has a plurality of spaced-apart upstanding members 491, each for receipt within a corresponding hole of a screen assembly placed on the shale shaker's deck. The upstanding members 491 extend up at an angle to the deck 122. Any number of upstanding members 491 may be used (one-four or more) and they may be at any desired angle in any desired direction.

Figure 25G:
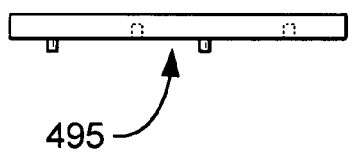
FIG. 25G is a side view of a screen assembly for the shale shaker of FIG. 25H.
Figure 25H:
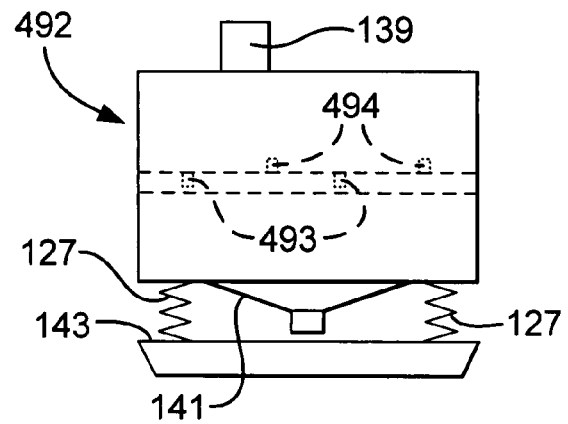

A shale shaker 492 shown in FIG. 25H has a plurality of spaced-apart holes 493, each hole for receiving a corresponding downwardly projecting member of a screen assembly placed on the shale shaker's deck and a plurality of spaced-apart upstanding members 494 projecting up from the deck 122. The holes 493 extend down substantially perpendicularly into the deck 122 (but may be at any angle at any direction) and the upstanding members 494 project up substantially perpendicularly to the deck 122, but may be at any angle in any direction. Any number of holes and/or upstanding members may be used (one-four or more).

FIG. 25G shows schematically a screen assembly 495 according to the present invention, useful on a shale shaker, which has a body or support 496 with two spaced-apart downwardly projecting members 497 and two spaced-apart holes 498. The downwardly projecting members 497 are for receipt within corresponding holes (e.g. but not limited to, such as the holes 493, FIG. 25H) in a shale shaker screen assembly mounting structure; and the holes 498 are for receiving corresponding upwardly projecting members of a shale shaker mounting structure (e.g., but not limited to, such as the upstanding members 494, FIG. 25H).

Figure 26:
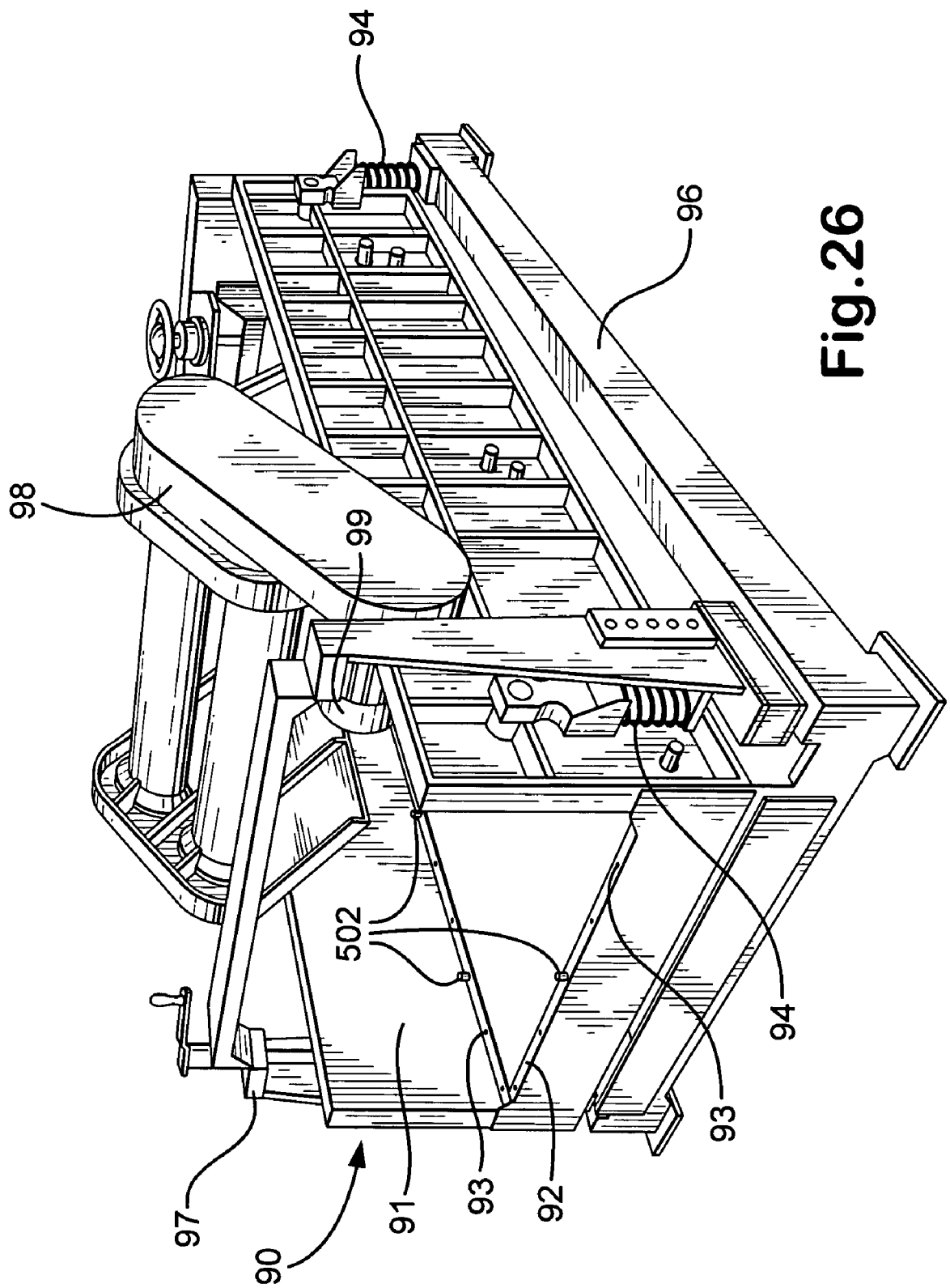
FIG. 26 is a perspective view of a shale shaker according to the present invention.

FIG. 26 shows a shale shaker 500 like the shale shaker of FIG. 19 (like numerals indicate the same parts); but with a plurality of spaced-apart upwardly projecting members 502 projecting up from the deck 92. It is to be understood, although not shown, that as desired, upstanding members 502 may be provided spaced-apart on both sides or around the entire periphery of the deck 92 (or of any shaker deck). Optionally, the holes 93 may be deleted or they may be sized for receiving downwardly projecting members of a screen assembly.

Figure 27:
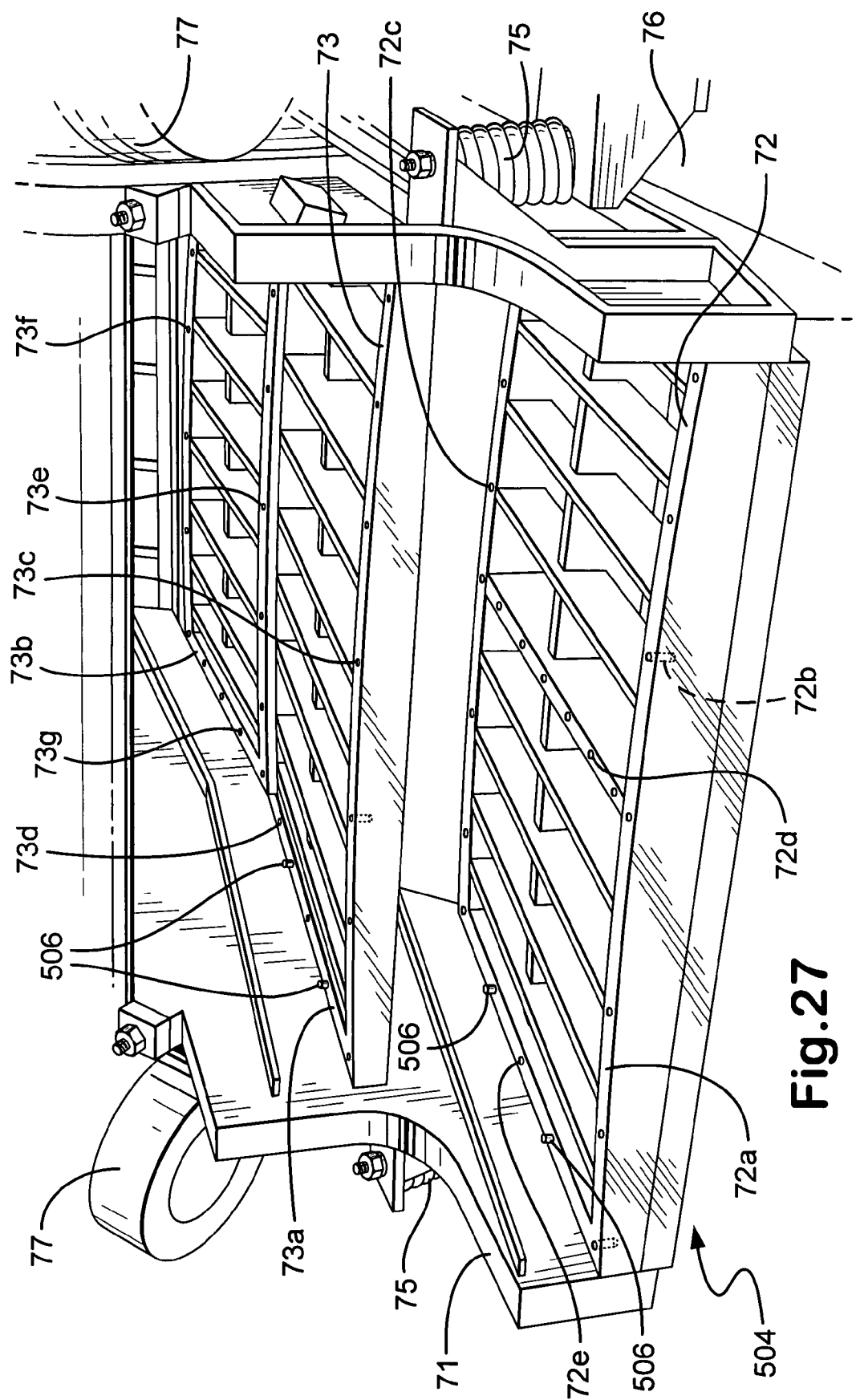
FIG. 27 is a perspective view of a shale shaker according to the present invention.

FIG. 27 shows a shale shaker 504 like that of FIG. 27 but with a plurality of spaced-apart upwardly projecting members 506 at the sides of the screen assembly mounting structures of the shale shaker. Optionally, the holes (or some of them) 72 and 73 may be deleted or they may be sized to receive a downwardly projecting member of a screen assembly.

Figure 28:
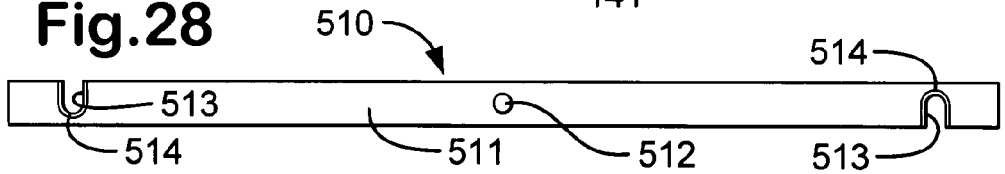
FIG. 28 is a top view of a wear strip according to the present invention.

FIG. 28 shows a wear strip 510 according to the present invention which has a body 511 and an upstanding member 512 for receipt within a corresponding hole of a screen assembly. Using openings 513 at either end of the body 511, the wear strip 510 is connectable to an end or side or crossmember of a shale shaker's screen assembly mounting structure. Each opening 513 has, optionally, a bevelled edge 514 for ease of installation, e.g., but not limited to with fasteners, bolts, screws, pins, and/or around upstanding connectors on a shale shaker mounting structure. In certain aspects the openings 513 are located so that the wear strip 510 is slipped onto corresponding upstanding members of a shale shaker mounting structure (e.g. as in FIG. 33). The wear strip (and any wear strip herein) 510 may be made of any suitable material, e.g., but not limited to fiberglass, rubber, zinc, zinc alloy, urethane, BUNA-N, aluminum, aluminum alloy, steel, stainless steel, wood, iron or plastic as may be the upstanding member 512 (as may be any wear strip or mounting structure disclosed herein).

Figure 29A:
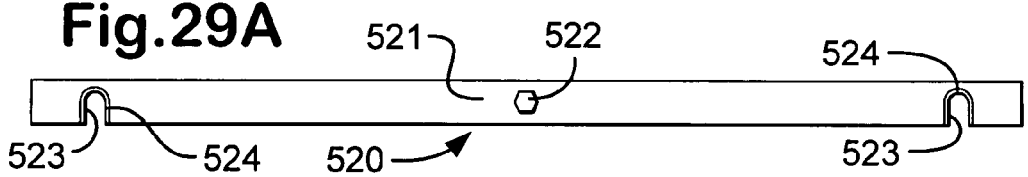
FIG. 29A is a top view of a wear strip according to the present invention.
Figure 29B:
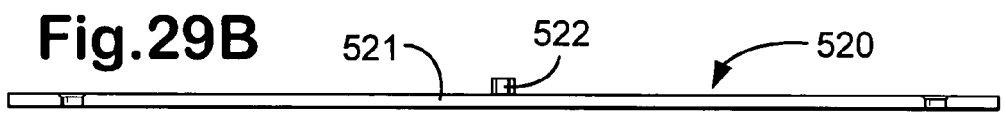
FIG. 29B is a side view of the wear strip of FIG. 29A.

FIGS. 29A and 29B show a wear strip 520 according to the present invention which has a body 521 and an upstanding member 522 for receipt within a corresponding hole of a screen assembly. Using openings 523 at either end of the body 521, the wear strip 520 is connectable to an end or side or crossmember of a shale shaker's screen assembly mounting structure. Each opening 523 has, optionally, a bevelled edge 524 for ease of installation, e.g., but not limited to with fasteners, bolts, screws, pins, and/or around upstanding connectors on a shale shaker mounting structure. In certain aspects the openings 523 are located so that the wear strip 520 is slipped onto corresponding upstanding members of a shale shaker mounting structure (e.g. as in FIG. 33). The wear strip (and any wear strip herein) 520 may be made of any suitable material, e.g., but not limited to fiberglass, rubber, steel, stainless steel, wood, iron or plastic as may be the upstanding member 522.

Figure 30A:
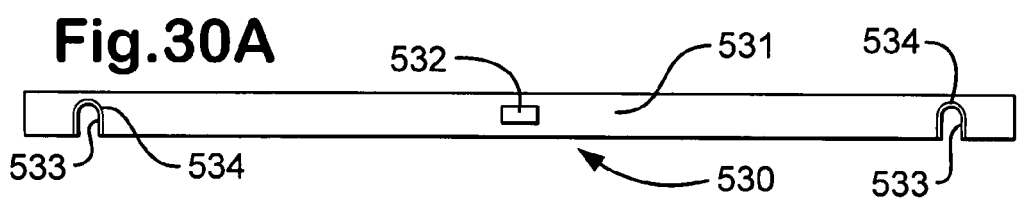
FIG. 30A is a top view of a wear strip according to the present invention.
Figure 30B:
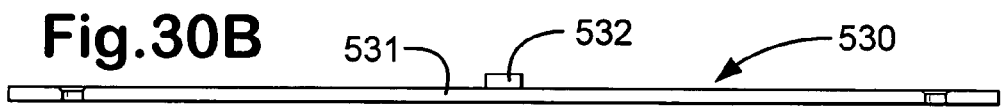
FIG. 30B is a side view of the wear strip of FIG. 30A.

FIGS. 30A and 30B show a wear strip 530 according to the present invention which has a body 531 and an upstanding member 532 for receipt within a corresponding hole of a screen assembly. Using openings 533 at either end of the body 531, the wear strip 530 is connectable to an end or side or crossmember of a shale shaker's screen assembly mounting structure. Each opening 533 has, optionally, a bevelled edge 534 for ease of installation, e.g., but not limited to with fasteners, bolts, screws, pins, and/or around upstanding connectors on a shale shaker mounting structure. In certain aspects the openings 533 are located so that the wear strip 530 is slipped onto corresponding upstanding members of a shale shaker mounting structure (e.g. as in FIG. 33). The wear strip (and any wear strip herein) 530 may be made of any suitable material, e.g., but not limited to fiberglass, rubber, steel, stainless steel, wood, iron or plastic as may be the upstanding member 532. As with any of the wear strips in FIGS. 28-32A, any desired number of upstanding members of any desired shape may be used. Also, any such upstanding member may be formed integrally of or connected to a wear strip according to the present invention.

Figure 31A:
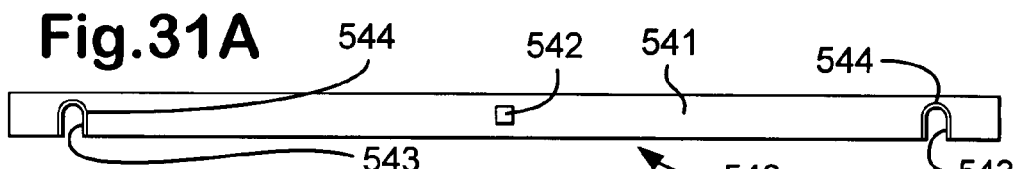
FIG. 31A is a top view of a wear strip according to the present invention.
Figure 31B:
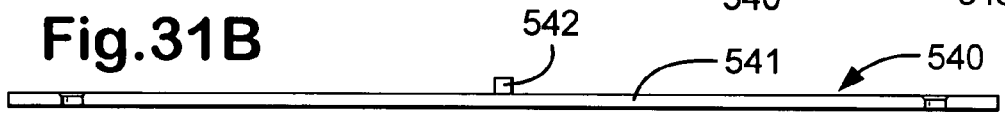
FIG. 31B is a side view of the wear strip of FIG. 31A.

FIGS. 31A and 31B show a wear strip 540 according to the present invention which has a body 541 and an upstanding member 542 for receipt within a corresponding hole of a screen assembly. Using openings 543 at either end of the body 541, the wear strip 540 is connectable to an end or side or crossmember of a shale shaker's screen assembly mounting structure. Each opening 543 has, optionally, a bevelled edge 544 for ease of installation, e.g., but not limited to with fasteners, bolts, screws, pins, and/or around upstanding connectors on a shale shaker mounting structure. In certain aspects the openings 543 are located so that the wear strip 540 is slipped onto corresponding upstanding members of a shale shaker mounting structure (e.g. as in FIG. 33). The wear strip (and any wear strip herein) 540 may be made of any suitable material, e.g., but not limited to fiberglass, rubber, steel, stainless steel, wood, iron or plastic as may be the upstanding member 542.

FIG. 32A-32C shows a wear strip 550 according to the present invention which has a body 551 and an upstanding member 552 (FIG. 32B) or 557 (FIG. 32C) for receipt within a corresponding hole of a screen assembly. Using openings 553 at either end of the body 551, the wear strip 550 is connectable to an end or side or crossmember of a shale shaker's screen assembly mounting structure. Each opening 553 has, optionally, a bevelled edge 554. Any upstanding member in any embodiment of the present invention may have a rounded surface as does the upstanding member 557. FIGS. 32D and 32E show wear strips with a hole at one end and an opening at the other end. FIG. 32D shows a wear strip 550*a* like the wear strip 550, FIG. 32A. The wear strip 550*a* has a body 551*a*, like the body 551 described above, with an opening 553*a*, like the opening 553 described above and with an upstanding member 557*a*, like the upstanding member 557 described above. The wear strip 550*a* also has a hole 573*a*, like the hole 573 described below. FIG. 32E shows a wear strip 550*b* like the wear strip 550, FIG. 32A. The wear strip 550*b* has a body 551*b*, like the body 551 described above, with an opening 613*a*, like the opening 613 described below and with an upstanding member 557*b*, like the upstanding member 557 described above. The wear strip 550*b* also has a hole 573*b*, like the hole 573 described below. The wear strips of FIGS. 32D and 32E are emplaceable on a tray with their end hole receiving an upstanding connector of the tray and with their other end opening encompassing another upstanding connector.

FIG. 33 discloses a tray 560 like the tray 400, FIG. 21 and like numerals indicate the same parts. Each end 402, 404 of the tray 560 has two spaced-apart upstanding connectors 562 useful for releasably attaching wear strips with appropriate openings (e.g., but not limited to, wear strips as in FIGS. 28-32C and 38A-41A, with appropriately sized openings) to the tray 560. Each connector 562 has a top 564 larger than a base 565 so that, e.g., upon sliding an opening (e.g., but not limited to an opening 513 of the wear strip 510, FIG. 28) around a connector 562, the top 564 abuts a top surface of the wear strip (which is made with an appropriate thickness) thereby holding the wear strip in position. One, three or more such connectors 562 may be used (with a corresponding opening or openings in a wear strip).

FIGS. 34A and 34B show a wear strip 570 according to the present invention with a body 571 and an upstanding member 572. Holes 573 at each end of the body 571 may be used for fasteners, bolts, screws, or pins to releasably secure the wear strip to a side of a shale shaker mounting structure which has corresponding holes for the fasteners, etc. Holes 573 (and any hole in FIGS. 35A-37A) may be bevelled as shown.

FIGS. 35A and 35B show a wear strip 580 according to the present invention with a body 581 and an upstanding member 582. Holes 583 at each end of the body 581 may be used for fasteners, bolts, screws, or pins to releasably secure the wear strip to a side of a shale shaker mounting structure which has corresponding holes for the fasteners, etc.

FIGS. 36A and 36B show a wear strip 590 according to the present invention with a body 591 and an upstanding member 592. Holes 593 at each end of the body 591 may be used for fasteners, bolts, screws, or pins to releasably secure the wear strip to a side of a shale shaker mounting structure which has corresponding holes for the fasteners, etc.

FIGS. 37A and 37B show a wear strip 600 according to the present invention with a body 601 and an upstanding member 602. Holes 603 at each end of the body 601 may be used for fasteners, bolts, screws, or pins to releasably secure the wear strip to a side of a shale shaker mounting structure which has corresponding holes for the fasteners, etc.

FIGS. 38A and 38B show a wear strip 610 according to the present invention which has a body 611 and an upstanding member 612 for receipt within a corresponding hole of a screen assembly. Using holes 613 at either end of the body 611, the wear strip 610 is connectable to an end or side or crossmember of a shale shaker's screen assembly mounting structure. Each opening 613 has, optionally, a bevelled edge portion 614 for ease of installation. A connector on a shaker tray can be inserted through a generally round part 615 of the openings 613 and then the wear strip is moved (to the left in FIG. 38A) to secure the wear strip in place with the connectors.

FIGS. 39A and 39B show a wear strip 620 according to the present invention which has a body 621 and an upstanding member 622 for receipt within a corresponding hole of a screen assembly. Using holes 623 at either end of the body 621, the wear strip 620 is connectable to an end or side or crossmember of a shale shaker's screen assembly mounting structure. Each opening 623 has, optionally, a bevelled edge portion 624 for ease of installation. A connector on a shaker tray can be inserted through a generally round part 625 of the openings 623 and then the wear strip is moved (to the left in FIG. 39A) to secure the wear strip in place with the connectors.

FIGS. 40A and 40B show a wear strip 630 according to the present invention which has a body 631 and an upstanding member 632 for receipt within a corresponding hole of a screen assembly. Using holes 633 at either end of the body 631, the wear strip 630 is connectable to an end or side or crossmember of a shale shaker's screen assembly mounting structure. Each opening 633 has, optionally, a bevelled edge portion 634 for ease of installation. A connector on a shaker tray can be inserted through a generally round part 635 of the openings 633 and then the wear strip is moved (to the left in FIG. 40A) to secure the wear strip in place with the connectors.

FIGS. 41A and 41B show a wear strip 640 according to the present invention which has a body 641 and an upstanding member 642 for receipt within a corresponding hole of a screen assembly. Using holes 643 at either end of the body 641, the wear strip 640 is connectable to an end or side or crossmember of a shale shaker's screen assembly mounting structure. Each opening 643 has, optionally, a bevelled edge portion 644 for ease of installation. A connector on a shaker tray can be inserted through a generally round part 645 of the openings 643 and then the wear strip is moved (to the left in FIG. 41A) to secure the wear strip in place with the connectors.

Figure 42:
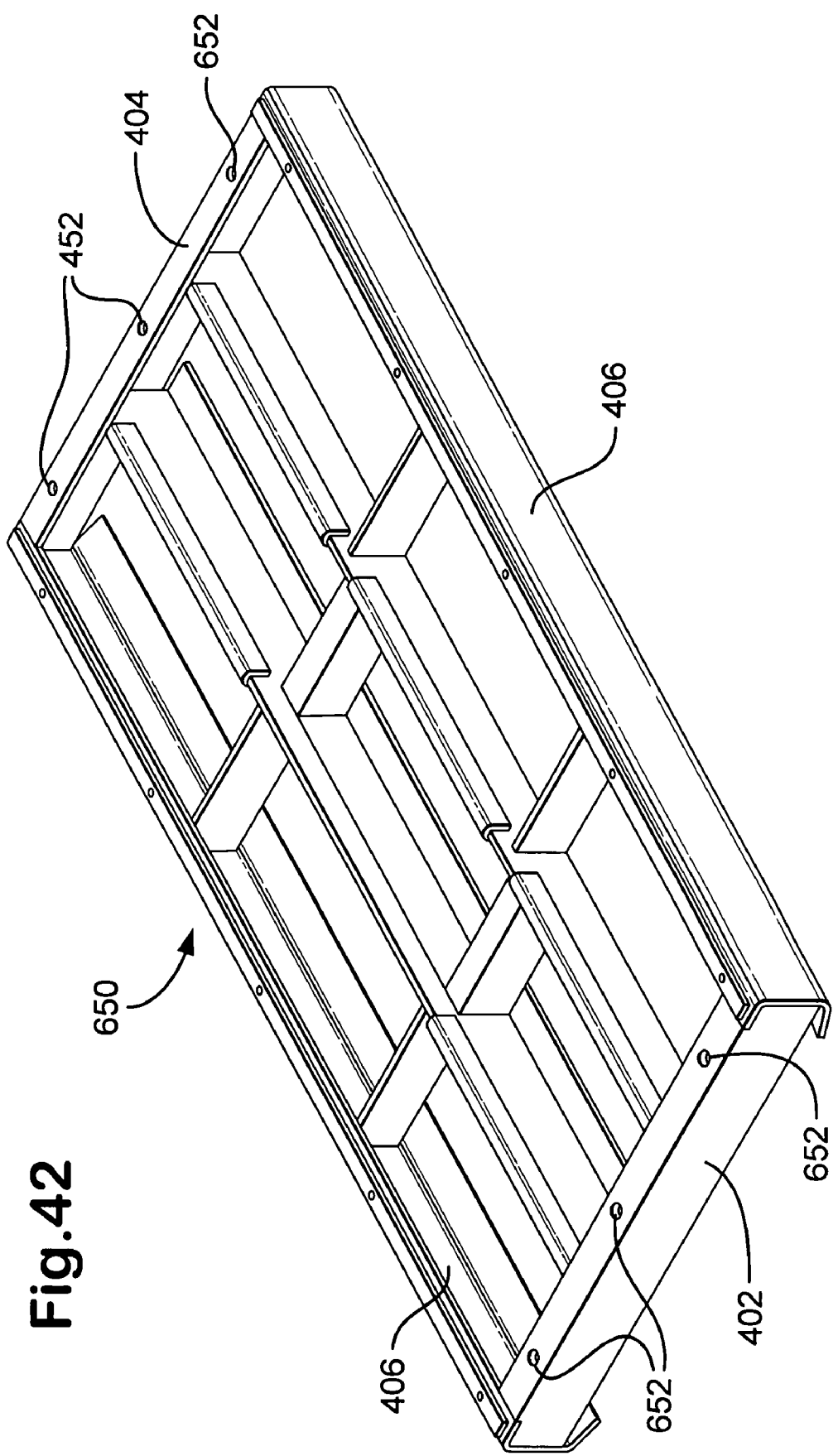
FIG. 42 is a perspective view of a screen assembly mounting structure for a shale shaker according to the present invention.

FIG. 42 shows a tray 650 according to the present invention for a screen assembly mounting structure of a shale shaker like the tray 400, FIG. 19, and like numerals indicate the same parts. The tray 650 has three holes 652 in each of its ends 402, 404. (Note that fluid flow over a screen assembly on the tray 650, and on any similar tray, may be from the top side 406 in FIG. 42 to the bottom side 406 in FIG. 42; or alternatively from end 402 to end 404). The holes 652 may be located, sized and configured for receipt therein of corresponding downwardly projecting members of a screen assembly or they may be used for releasably connecting a wear strip according to the present invention to the tray 65 (or they may be used for receiving fasteners that pass through a screen assembly, as may be any hole in any tray according to the present invention).

FIG. 43 shows a tray 660 according to the present invention like the tray 400 and like numerals indicate the same parts. Each end 402, 404 has on its top surface an amount 662 of releasably cooperating hook-and-loop connection material and each of two wear strips 664 has a corresponding amount 665 (see e.g. FIG. 44) of such releasably cooperating hook-and-loop connection material (e.g. but not limited to VELCRO™ material) for releasably connecting the wear strips 664 to the tops of the ends of tray 660. Each wear strip has an upstanding member 667 (like the upstanding member 420, FIG. 19). The wear strips 664 are shown above the tray 400 over the positions on the tray 664 at which they are connected in use (as is true for the wear strips shown above the tray in FIG. 45).

Figure 45:
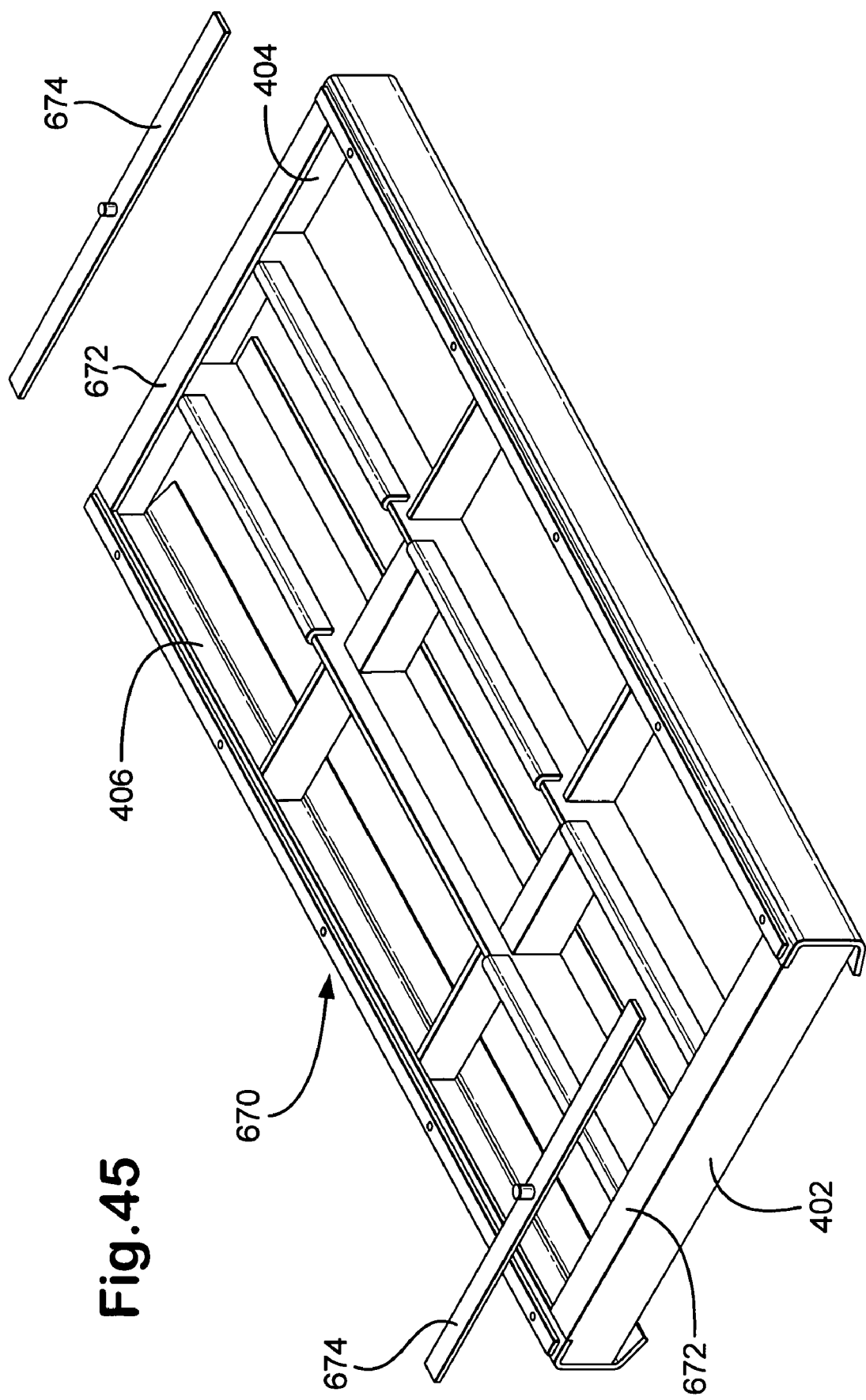
FIG. 45 is a perspective view of a screen assembly mounting structure for a shale shaker according to the present invention.

FIG. 45 shows a tray 670 according to the present invention like the tray 400 of FIG. 19 and like numerals indicate the same parts. Each end 402, 404 has on its top surface an amount 672 of two-sided adhesive tape for adhesively and releasably securing each of two wear strips 674 to the tops of the ends of tray 670. Each wear strip 674 has an upstanding member 677 (like the upstanding member 420, FIG. 19).

Figure 46:
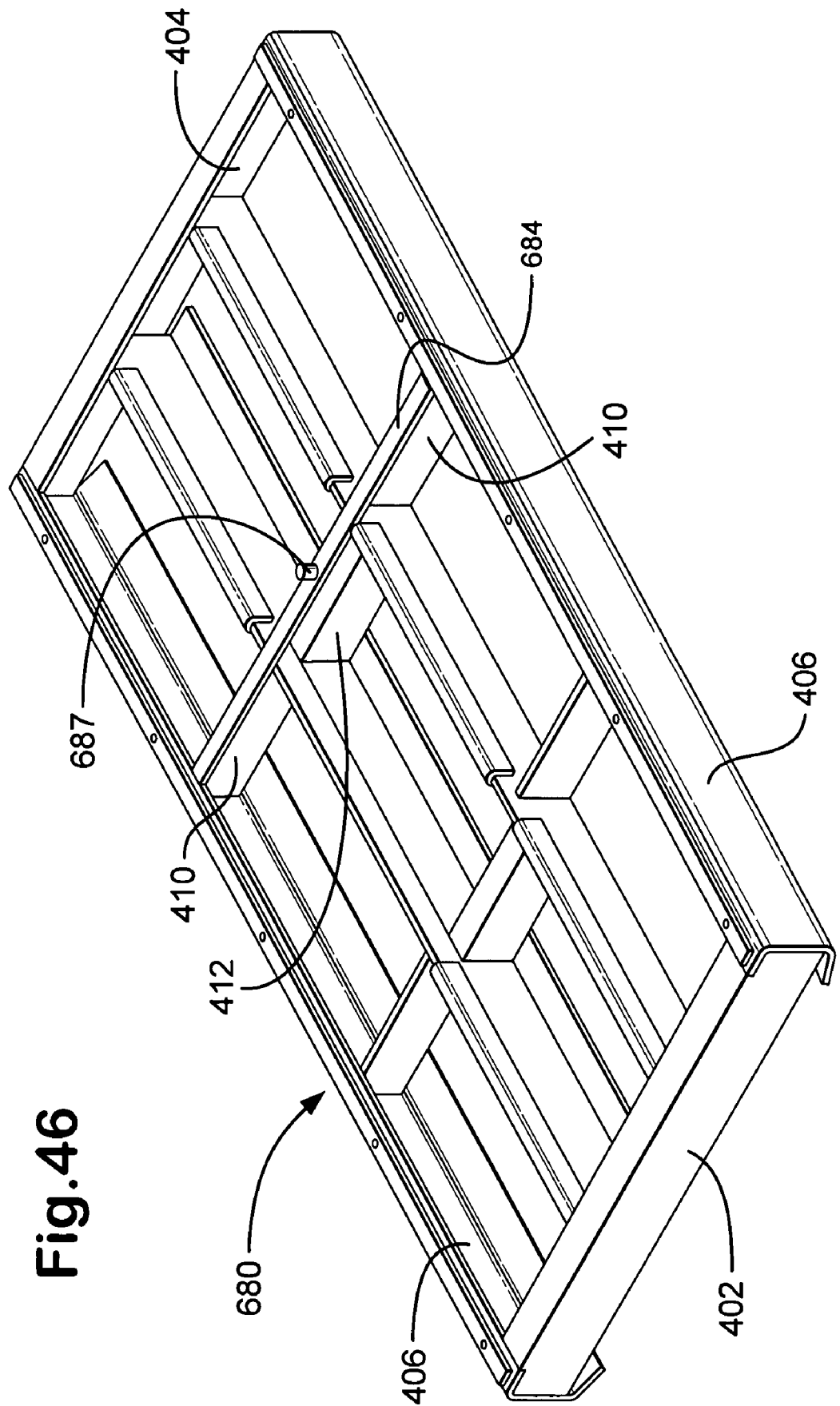
FIG. 46 is a perspective view of a screen assembly mounting structure for a shale shaker according to the present invention.

FIG. 46 shows a tray 680 according to the present invention like the tray 400, FIG. 19, and like numerals indicate the same parts. A wear strip 684 is secured on crossmembers 410, 412 as shown with any suitable securement, fastener, adhesive, and/or welding. It is within the scope of this invention to have a wear strip according to the present invention on any crossmember or crossmembers of a shale shaker's screen assembly mounting structure.

Figure 47:
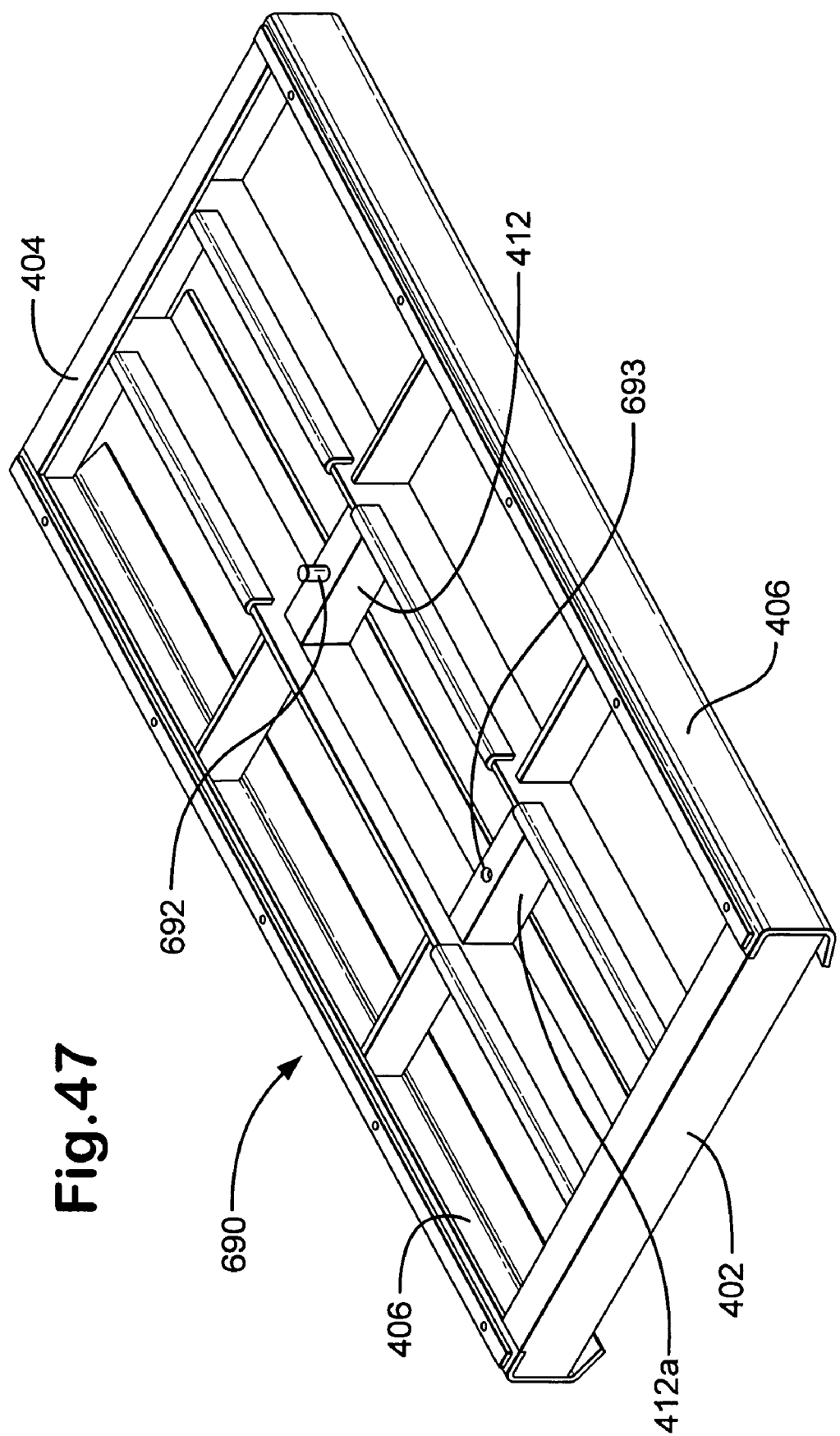
FIG. 47 is a perspective view of a screen assembly mounting structure for a shale shaker according to the present invention.

FIG. 47 shows a tray 690 according to the present invention like the tray 400, FIG. 19, and like numerals indicate the same parts. A crossmember 412 has an upstanding member 692 for receipt within a corresponding hole of a screen assembly emplaced on the tray 690. Another crossmember 412a has a hole 693 for receiving a downwardly projecting member of a screen assembly emplaced on the tray 690. Any number of holes 693 on any of the crossmembers may be used according to the present invention; and/or any number of upstanding members 692 may be used on any of the crossmembers. The hole 693 and upstanding member 692 may have any shape for holes and upstanding members, respectively, disclosed herein.

FIG. 48 shows a screen assembly 700 like the screen assembly 430, FIG. 20A, and like numerals indicate the same parts. One crossmember 432a of the frame 432 has a hole 703 sized, located and configured for receiving a corresponding upstanding member of a screen mounting structure of a shale shaker. A crossmember 432b of the frame 432 has a projecting member 702 for receipt within a corresponding hole in a screen mounting structure of a shale shaker. Any number of holes 703 may, according to the present invention, be used on a crossmember or crossmembers of the frame 432; and/or any number of projecting members 702 may, according to the present invention, be used on a crossmember or crossmembers of the frame 432.

FIG. 49A shows a projecting member 710 according to the present invention which may be used for any upstanding or upwardly projecting member or downwardly projecting member disclosed herein. The projecting member 710 has a base 712 larger than a top 714. FIG. 49B shows a hole 720 in material 722 which has a top opening 724 larger than a hole bottom 726. Such a hole may be used for any hole in any embodiment of the present invention. The base 712 and top 714 (and the top opening 724 and hole bottom 726) may be any desired size, and the distance between them may be any desired length; and the shape of the top 714 and base 712 (and of the top openings 724 and hole bottom 726) may be any shape disclosed herein for an upstanding or upwardly projecting member.

Figure 50B:
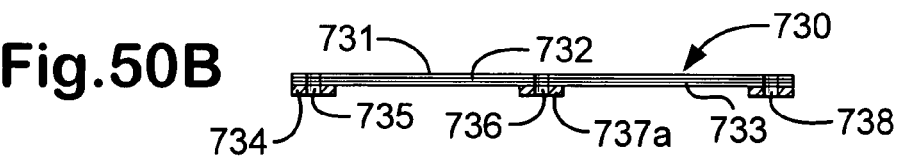
FIG. 50B is a side cross-section view of the screen assembly of FIG. 50A.

FIGS. 50A and 50B show a screen assembly 730 according to the present invention which has a plurality of glued-together layers of screening material 731, 732, 733 with a plate 734 attached at one end and secured to the lower layer 733 of screening material. Holes 735 extend through the screening material layers and through the plate 734. The plate 734 may be adhesively secured to the screening material and/or any suitable fastener and/or clamp apparatus may be used for such securement. The holes 735 may be used (as may the holes 743, FIG. 50C) as holes for receiving an upstanding member of a screen assembly mounting structure of a shale shaker; or fasteners may be inserted through the holes to releasably secure the screen assembly to a shale shaker screen assembly mounting structure. As with the glued-together layers of the screen assemblies of FIGS. 50C, 50E and 50G the screen assembly 730 may be any combination of two, three or more layers of screening material and/or mesh as disclosed in pending U.S. application Ser. No. 10/037,474 filed Oct. 19, 2001, and Ser. No. 10/087,025 filed Oct. 19, 2001 entitled "Glued Screens For Shale Shakers," said applications incorporated fully herein in their entirety for all purposes.

Optionally, the screen assembly 730 has holes 736 through the screening material and through plates 737a, 737b; and, optionally, holes 738 through a plate 739. It is within the scope of the present invention to provide a hole or holes on the outer periphery of the screen assembly 730 or to provide one or more holes with a corresponding lower plate (made of any suitable material including materials disclosed herein for wear strips and projecting members, rigid or flexible) at an inner area of the screen assembly 730 (and as may be provided in the screen assemblies of FIGS. 50C and 50E).

Figure 50C:
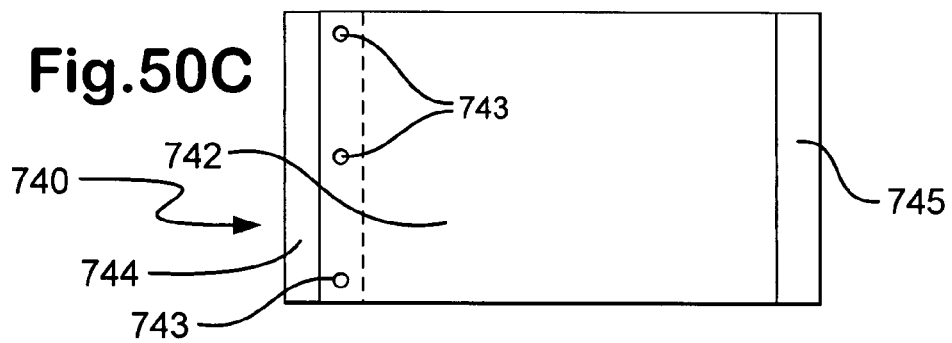
FIG. 50C is a top view of a screen assembly according to the present invention.
Figure 50D:
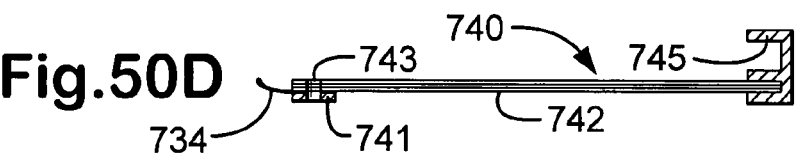
FIG. 50D is a side cross-section view of the screen assembly of FIG. 50C.

FIGS. 50C and 50D show a screen assembly 740 according to the present invention which has a plurality of glued-together layers of screening material 742 (like the layers 731-733, FIG. 50B) and holes 743 through a plate 741 (like the plate 734, FIG. 50B). Optionally, a flexible seal flap 744 is provided along an end (or side) of the screen assembly and it is within the scope of the present invention to provide such a flexible seal flap on the opposite side or end (or on any side or end of any known screen assembly) for sealing a screen-assembly-basket-wall interface when the screen assembly is in position in a shale shaker basket. A hook apparatus 745 is connected to one end (or side) of the screen assembly 740 and provides a hook structure that can be engaged by known screen mounting apparatuses. With pins or fasteners extending through the holes 743 to releasably connect the screen assembly 740 at one side of a screen basket, tension can be applied to the screen assembly 740 through the hook apparatus 745 for efficient tensioning and positioning of the screen assembly on a shale shaker.

Figure 50E:
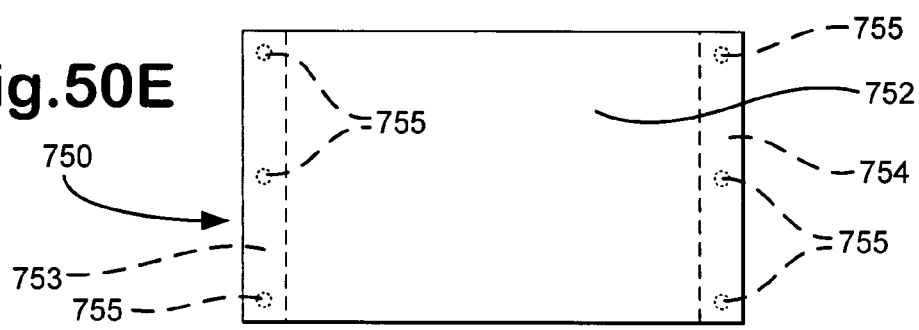
FIG. 50E is a top view of a screen assembly according to the present invention.
Figure 50F:
FIG. 50F is a side cross-section view of the screen assembly of FIG. 50E.

FIGS. 50E and 50F show a screen assembly 750 according to the present invention which has a plurality of glued-together layers of screening material 752 with plates 753, 754 on either side of the screen assembly 750. Downwardly projecting members 755 (which may be like any downwardly projecting members disclosed herein) project down from the plates 753, 754 and are sized, located, and configured for receipt in corresponding holes of a screen assembly mounting structure of a shale shaker.

Figure 50G:
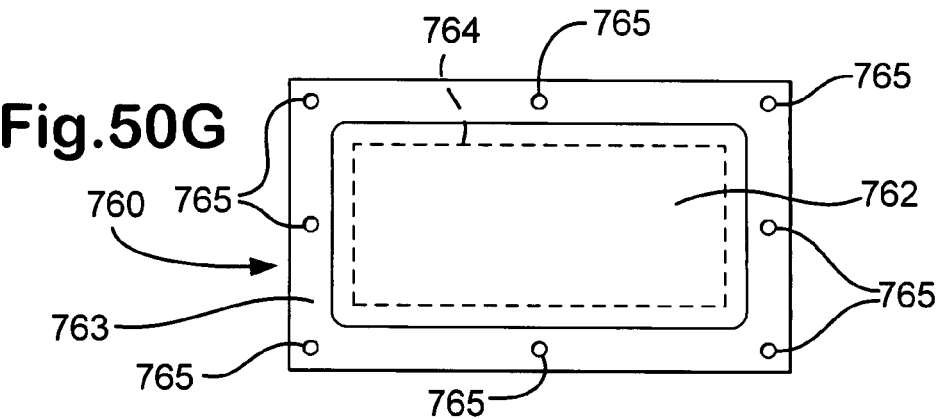
FIG. 50G is a top view of a screen assembly according to the present invention.

FIG. 50G shows a screen assembly 760 according to the present invention which has a plurality of glued-together layers of screening material 762 (like the layers 731-732, 742, and 752 disclosed above). An outer peripheral layer 763 of glue, adhesive, and/or epoxy surrounds the screen assembly 760 and a plurality of spaced-apart holes 765 extend through the layer 763 and through the layers of screening material. (Alternatively the layers 763 and/or 764 may be made of material like that of any plate in FIGS. 50A-50F). Optionally a layer 764 like the layer 763 is provided on the bottom of the screen assembly 760. Any one, two, or three sides of either layer 763, 764 may be deleted, e.g. if holes are desired on less than all sides of the screen assembly. A plate or plates (rigid or flexible) may be positioned above layers of screening material above any plate in FIGS. 50A-50F.

Figure 51:
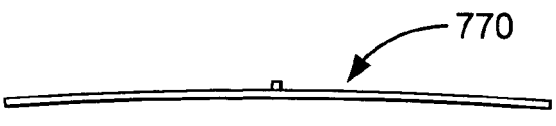
FIG. 51 is a side view of a wear strip according to the present invention.

FIG. 51 shows a wear strip 770 (which may be any wear strip according to the present invention) which is made in a bowed shape as shown in FIG. 51 so that it will exert an upward force on a screen assembly mounted above it in a shale shaker. Alternatively, any wear strip according to the present invention which is flexible may be connected to a shale shaker screen assembly mounting structure so that it is bowed upwardly. It is within the scope of the present invention to employ an initially-bowed wear strip in a flattened position so that in such flattened position it exerts an upward force on a screen assembly above it. This can be useful when wedges or other screen holding items are used which are made of a material such as rubber or urethane which can shrink or loose some of its resiliency in use thereby loosening the mounting of a screen assembly in a shale shaker.

The present invention, therefore, in some, but not necessarily in all embodiments, provides a vibratory separator including container apparatus, screen assembly apparatus removably secured in the container apparatus, the vibratory apparatus connected to the container apparatus for vibrating the container apparatus and the screen assembly apparatus, the screen assembly apparatus with screening material with opposed spaced-apart sides including a first side and a second side, a side mount on each of the opposed spaced-apart sides, each side of the opposed spaced-apart sides of screening material having an edge portion, each edge portion held within a side mount, seal structure on an exterior of each side mount for sealing a side mount/screen holding apparatus interface, wherein the screening material has a plurality of layers of screening material flexibly connected so that the screen assembly is foldable, wherein the side mount has a lower part with a plurality of spaced-apart holes for receiving a corresponding plurality of spaced-apart members which are part of screen mounting apparatus of the vibratory separator, the screening material including at least two layers of screening material including at least a first layer and a second layer, the first layer made of metal and with a first metal mesh through which liquid in the fluid is passable and having a first metal mesh pattern with an amount of hot melt glue in a glue pattern on the first layer of screening material, the second layer adjacent and in contact with the first layer glued together with the first layer by the hot melt glue, the second layer made of metal and with a second metal mesh through which liquid in the fluid is passable, wherein the glue pattern is different from the first metal mesh pattern, and handling apparatus on the screen assembly apparatus (on the seal structure or on each side mount, or both) for facilitating handling of the screen assembly apparatus. Such a vibratory separator or shale shaker may have one or some, in any possible combination, of the following: the screen assembly's screening material is suitable for treating drilling fluids with solids entrained therein; wherein the seal member includes the handling apparatus; and/or wherein at least one of the side mounts includes handling apparatus.

The present invention, therefore, in some, but in not necessarily all embodiments, provides a screen assembly for a vibratory separator, the screen assembly having screening material (e.g., one, two, three or more layers of screen mesh) with opposed spaced-apart sides including a first side and a second side, a side mount on each of the opposed spaced-apart sides, each of the first side and the second side of the opposed spaced-apart sides having a screening material edge portion, each screening material edge portion having part thereof extending into and held within a corresponding side mount. Such a screen assembly may have one or some, in any possible combination, of the following: seal structure on an exterior of each side mount for sealing a side mount/screen holding apparatus interface; wherein the seal structure includes a hollow portion; wherein the seal structure is positioned for location between the screen assembly and screen assembly mounting structure of the vibratory separator; wherein the screening material comprises a plurality of interconnected layers of screening material; wherein the layers of screening material are glued together with cured hot melt glue; wherein the screening material has a first layer of screening material made of metal and with a first metal mesh through which liquid in the fluid is passable and having a first metal mesh pattern with an amount of hot melt glue in a glue pattern on the first layer of screening material, a second layer of screening material adjacent and in contact with the first layer glued together with the first layer by the hot melt glue, the second layer of screening material made of metal and with a second metal mesh through which liquid in the fluid is passable, and wherein the glue pattern is different from the first metal mesh pattern; wherein the screening material has a length and a width and the hot melt glue is in intermittent or continuous lines of glue extending across the length and the width of the screening material; wherein the hot melt glue is in discrete amounts spaced-apart across the screening material; wherein the hot melt glue is in at least one line across the screening material; wherein the side mount has a lower part with a plurality of spaced-apart holes for receiving a corresponding plurality of spaced-apart members which are part of screen mounting apparatus of the vibratory separator; wherein the vibratory separator is a shale shaker and the screen assembly's screening material is suitable for treating drilling fluids; wherein an edge of the screening material passes between two opposed parts of the side mount, said two opposed parts secured together; wherein the two opposed parts of the side mount are welded together; wherein an edge of the screening material passes between two first opposed parts of each side mount and an end of the screening material is secured between two second opposed parts of each side mount; wherein each side mount has two spaced-apart openings, said openings sealed off with seal material; wherein the screening material is generally flat; wherein at least part of the screening material in cross-section is undulating; wherein the screening material has material flexible so that the screen assembly is foldable and/or can be rolled up; wherein the seal structure includes handling structure; wherein the handling structure is T shaped; wherein the handling structure is at least one handle; wherein the handling structure is at least one hole through the seal structure; wherein each side mount has an upper inwardly directed edge; wherein each side mount is made of a single piece of material; and/or at least one rigid handling apparatus formed of or connected to at least one of the side mounts.

The present invention, therefore, in some, but in not necessarily all embodiments, provides a screen assembly for a vibratory separator, the screen assembly having screening material with opposed spaced-apart sides including a first side and a second side, a side mount on each of the opposed spaced-apart sides, each side of the opposed spaced-apart sides of screening material having an edge portion, each edge portion held within a side mount, seal structure on an exterior of each side mount for sealing a side mount/screen holding apparatus interface, wherein the screening material is a plurality of layers of screening material flexibly connected so that the screen assembly is foldable and/or can be rolled up, and wherein the side mount has a lower part with a plurality of spaced-apart holes for receiving a corresponding plurality of spaced-apart members which are part of screen mounting apparatus of the vibratory separator.

The present invention, therefore, in some, but in not necessarily all embodiments, provides a screen assembly for a vibratory separator, the screen assembly having screening material with opposed spaced-apart sides including a first side and a second side, screen mounting apparatus on each of the opposed spaced-apart sides, each of the first side and the second side of the opposed spaced-apart sides having a screening material edge portion, each screening material edge portion having part thereof extending into and held within a side mount, and the screening material comprising flexible material so that the screen assembly is foldable and/or can be rolled up. Such a screen assembly may have one or some, in any possible combination, of the following: wherein the screening material is a first layer of screening material made of metal and with a first metal mesh through which liquid in the fluid is passable and having a first metal mesh pattern with an amount of hot melt glue in a glue pattern on the first layer of screening material, a second layer of screening material adjacent and in contact with the first layer glued together with the first layer by the hot melt glue, the second layer of screening material made of metal and having a second metal mesh through which liquid in the fluid is passable, and wherein the glue pattern is different from the first metal mesh pattern; wherein the screening material has a length and a width and the hot melt glue is in one or more continuous and/or intermittent lines of glue extending across the length and the width of the screening material; wherein the hot melt glue is in discrete amounts spaced-apart across the screening material; wherein the hot melt glue is in at least one line across the screening material; and/or wherein the screen mounting apparatus is hookstrip apparatus.

The present invention, therefore, in some, but in not necessarily all embodiments, provides a mount for a screen assembly for a vibratory separator, the mount for holding screening material of the screen assembly, the mount including a body with a bottom part, a side part extending up from and connected to the bottom part, a top part connected to the side part, a top lip formed by overlapping portions of the body, a bottom lip formed by overlapping portions of the top part and bottom part, a space defined between the top part, the side part, and the bottom part, which space is suitable for the passage therethrough of a portion of screening material, the overlapping portions of the bottom lip spaced-apart for the passage therethrough of a portion of the screening material, seal structure on an exterior of each side mount for sealing a side mount/screen holding apparatus interface, wherein the seal structure is positioned for location of at least a portion of the seal structure between the screen assembly and screen assembly mounting structure of the vibratory separator. Such a mount may have one or some, in any possible combination, of the following: the body having two sealed spaced-apart end openings; wherein the top lip includes a space therebetween suitable for holding a portion of the screening material; wherein the seal structure includes a hollow portion (e.g., either along the entire length of the seal structure or only in part thereof or with intermittent spaced-apart hollow portions), and the hollow portion is positioned for location above the top part of the mount; wherein each side mount has an upper inwardly directed edge; wherein the side mount is made of a single piece of material; and/or at least one rigid handling apparatus formed of or connected to the side mount.

The present invention, therefore, in some, but in not necessarily all embodiments, provides a mount for a screen assembly for a vibratory separator, the mount for holding screening material of the screen assembly, the mount including a body with a bottom part, a side part extending up from and connected to the bottom part, a top part connected to the side part, a top lip formed by overlapping portions of the body, a bottom lip formed by overlapping portions of the top part and bottom part, a space defined between the top part, the side part, and the bottom part, said space suitable for the passage therethrough of a portion of screening material, the overlapping portions of the bottom lip spaced-apart for the passage therethrough of a portion of the screening material, seal structure on an exterior of each side mount for sealing a side mount/screen holding apparatus interface, and handle apparatus formed of the seal structure. Such a mount may have one or some, in any possible combination, of the following: wherein the handle apparatus is at least one cut out portion of the seal structure; wherein the handle apparatus is an upwardly projecting portion of the seal structure formed integrally of the seal structure; and/or the body having two sealed spaced-apart end openings.

The present invention, therefore, in some, but in not necessarily all embodiments, provides a mount for a screen assembly for a vibratory separator, the mount for holding screening material of the screen assembly, the mount having a body with a bottom part, a side part extending up from and connected to the bottom part, the side part made of side part material, a top part connected to the side part, a top lip formed by overlapping portions of the body, a bottom lip formed by overlapping portions of the top part and bottom part, a space defined between the top part, the side part, and the bottom part, the space suitable for the passage therethrough of a portion of screening material, the overlapping portions of the bottom lip spaced-apart for the passage therethrough of a portion of the screening material, and handle apparatus formed of the side part, the handle apparatus made of side part material or of material different therefrom, and formed integrally of the side part. Such a mount may have two sealed spaced-apart end openings.

The present invention, therefore, in some, but in not necessarily all embodiments, provides a seal for sealing an interface between a screen assembly and part of a vibratory separator or shale shaker in which the screen assembly is mounted, the seal having handling apparatus. Such a seal may have one or some of the following, in any possible combination: wherein the handling apparatus is at least one handle formed of the body; wherein the handling apparatus is at least one cut out portion of the body; and/or wherein the handling apparatus is at least one projection projecting from the body, e.g., with cylindrical or T shape.

The present invention, therefore, in some, but in not necessarily all embodiments, provides a method for making a screen assembly for a vibratory separator, the method including connecting together a plurality of layers of screening material, securing each of two opposed edge portions of the screening material within a side mount according to the present invention. Such a method may include use of a screen assembly with layers of screening material wherein the layers of screening material are flexible and are glued together with hot melt glue.

The present invention, therefore, in some, but in not necessarily all embodiments, provides a seal for installation on a screen assembly for sealing a screen-assembly/screen-holder interface in a vibratory separator, the seal having a body with a portion thereof connectable to the screen assembly, and handling apparatus on the body for facilitating handling of the screen assembly.

The present application is a division of U.S. Ser. No. 10/429,233 filed 2 May 2003 which included, inter alia, the subject matter in the fifty seven claims repeated below, disclosed herein, and made a part hereof for all purposes. The repetition here of these claims is not meant to now present these fifty-seven claims in this application.

1. A vibratory separator comprising
container apparatus,
screen assembly apparatus removably secured in the container apparatus,
vibratory apparatus connected to the container apparatus for vibrating the container apparatus and the screen assembly apparatus,
the screen assembly apparatus comprising
screening material with opposed spaced-apart sides including a first side and a second side,
a side mount on each of the opposed spaced-apart sides,
each side of the opposed spaced-apart sides of screening material having an edge portion,
each edge portion held within a side mount,
seal structure on an exterior of each side mount for sealing a side mount/screen holding apparatus interface,
wherein the screening material comprises a plurality of layers of screening material flexibly connected so that the screen assembly is foldable,
wherein the side mount has a lower part with a plurality of spaced-apart holes for receiving a corresponding plurality of spaced-apart members which are part of screen mounting apparatus of the vibratory separator,
the screening material comprising at least two layers of screening material including at least a first layer and a second layer,
the first layer made of metal and comprising a first metal mesh through which liquid in the fluid is passable and having a first metal mesh pattern with an amount of hot melt glue in a glue pattern on the first layer of screening material,
the second layer adjacent and in contact with the first layer glued together with the first layer by the hot melt glue, the second layer made of metal and comprising a second metal mesh through which liquid in the fluid is passable, wherein the glue pattern is different from the first metal mesh pattern, and
handling apparatus on the screen assembly apparatus for facilitating handling of the screen assembly apparatus.

2. The vibratory separator of claim 1 wherein the vibratory separator is a shale shaker and the screen assembly's screening material is suitable for treating drilling fluids.

3. The vibratory separator of claim 1 wherein the seal member includes the handling apparatus.

4. The vibratory separator of claim 1 wherein at least one of the side mounts includes handling apparatus.

5. A screen assembly for a vibratory separator, the screen assembly comprising
screening material with opposed spaced-apart sides including a first side and a second side,
a side mount on each of the opposed spaced-apart sides,
each of the first side and the second side of the opposed spaced-apart sides having a screening material edge portion, each screening material edge portion having part thereof extending into and held within a corresponding side mount.

6. The screen assembly of claim 5 further comprising seal structure on an exterior of each side mount for sealing a side mount/screen holding apparatus interface.

7. The screen assembly of claim 6 wherein the seal structure includes a hollow portion.

8. The screen assembly of claim 6 wherein the seal structure is positioned for location between the screen assembly and screen assembly mounting structure of the vibratory separator.

9. The screen assembly of claim 5 wherein the screening material comprises a plurality of layers of screening material.

10. The screen assembly of claim 5 wherein the layers of screening material are glued together with cured hot melt glue.

11. The screen assembly of claim 9 wherein the screening material comprises
   a first layer of screening material made of metal and comprising a first metal mesh through which liquid in the fluid is passable and having a first metal mesh pattern with an amount of hot melt glue in a glue pattern on the first layer of screening material,
   a second layer of screening material adjacent and in contact with the first layer glued together with the first layer by the hot melt glue, the second layer of screening material made of metal and comprising a second metal mesh through which liquid in the fluid is passable, and
   wherein the glue pattern is different from the first metal mesh pattern.

12. The screen assembly of claim 11 wherein the screening material has a length and a width and the hot melt glue is in continuous lines of glue extending across the length and the width of the screening material.

13. The screen assembly of claim 11 wherein the hot melt glue is in discrete amounts spaced-apart across the screening material.

14. The screen assembly of claim 13 wherein the hot melt glue is in at least one line across the screening material.

15. The screen assembly of claim 5 wherein the side mount has a lower part with a plurality of spaced-apart holes for receiving a corresponding plurality of spaced-apart members which are part of screen mounting apparatus of the vibratory separator.

16. The screen assembly of claim 5 wherein the vibratory separator is a shale shaker and the screen assembly's screening material is suitable for treating drilling fluids.

17. The screen assembly of claim 5 wherein an edge of the screening material passes between two opposed parts of the side mount, said two opposed parts secured together.

18. The screen assembly of claim 17 wherein the two opposed parts of the side mount are welded together.

19. The screen assembly of claim 5 wherein an edge of the screening material passes between two first opposed parts of each side mount and an end of the screening material is secured between two second opposed parts of each side mount.

20. The screen assembly of claim 5 wherein each side mount has two spaced-apart openings, said openings sealed off with seal material.

21. The screen assembly of claim 5 wherein the screening material is generally flat.

22. The screen assembly of claim 5 wherein at least part of the screening material in cross-section is undulating.

23. The screen assembly of claim 5 wherein the screening material comprises material flexible so that the screen assembly is foldable.

24. The screen assembly of claim 6 wherein the seal structure includes handling structure.

25. The screen assembly of claim 24 wherein the handling structure is T shaped.

26. The screen assembly of claim 24 wherein the handling structure is at least one handle.

27. The screen assembly of claim 24 wherein the handling structure is at least one hole through the seal structure.

28. The screen assembly of claim 5 wherein each side mount has an upper inwardly directed edge.

29. The screen assembly of claim 28 wherein each side mount is made of a single piece of material.

30. The screen assembly of claim 5 further comprising
   at least one rigid handling apparatus formed of or connected to at least one of the side mounts.

31. A screen assembly for a vibratory separator, the screen assembly comprising
   screening material with opposed spaced-apart sides including a first side and a second side,
   a side mount on each of the opposed spaced-apart sides,
   each side of the opposed spaced-apart sides of screening material having an edge portion,
   each edge portion held within a side mount,
   seal structure on an exterior of each side mount for sealing a side mount/screen holding apparatus interface,
   wherein the screening material comprises a plurality of layers of screening material flexibly connected so that the screen assembly is foldable, and
   wherein the side mount has a lower part with a plurality of spaced-apart holes for receiving a corresponding plurality of spaced-apart members which are part of screen mounting apparatus of the vibratory separator.

32. A screen assembly for a vibratory separator, the screen assembly comprising
   screening material with opposed spaced-apart sides including a first side and a second side,
   screen mounting apparatus on each of the opposed spaced-apart sides,
   each of the first side and the second side of the opposed spaced-apart sides having a screening material edge portion,
   each screening material edge portion having part thereof extending into and held within a side mount, and
   the screening material comprising flexible material so that the screen assembly is foldable.

33. The screen assembly of claim 32 wherein the screening material comprises
   a first layer of screening material made of metal and comprising a first metal mesh through which liquid in the fluid is passable and having a first metal mesh pattern with an amount of hot melt glue in a glue pattern on the first layer of screening material,
   a second layer of screening material adjacent and in contact with the first layer glued together with the first layer by the hot melt glue, the second layer of screening material made of metal and comprising a second metal mesh through which liquid in the fluid is passable, and
   wherein the glue pattern is different from the first metal mesh pattern.

34. The screen assembly of claim 33 wherein the screening material has a length and a width and the hot melt glue is in continuous lines of glue extending across the length and the width of the screening material.

35. The screen assembly of claim 33 wherein the hot melt glue is in discrete amounts spaced-apart across the screening material.

36. The screen assembly of claim 35 wherein the hot melt glue is in at least one line across the screening material.

37. The screen assembly of claim 32 wherein the screen mounting apparatus comprises hookstrip apparatus.

38. A mount for a screen assembly for a vibratory separator, the mount for holding screening material of the screen assembly, the mount comprising a body with
- a bottom part,
- a side part extending up from and connected to the bottom part,
- a top part connected to the side part,
- a top lip formed by overlapping portions of the body,
- a bottom lip formed by overlapping portions of the top part and bottom part,
- a space defined between the top part, the side part, and the bottom part, said space suitable for the passage therethrough of a portion of screening material,
- the overlapping portions of the bottom lip spaced-apart for the passage therethrough of a portion of the screening material,
- seal structure on an exterior of each side mount for sealing a side mount/screen holding apparatus interface, wherein the seal structure is positioned for location of at least a portion of the seal structure between the screen assembly and screen assembly mounting structure of the vibratory separator.

39. The mount of claim 38 further comprising
the body having two sealed spaced-apart end openings.

40. The mount of claim 38 wherein the top lip includes a space therebetween suitable for holding a portion of the screening material.

41. The mount of claim 38 wherein the seal structure includes a hollow portion, and the hollow portion is positioned for location above the top part of the mount.

42. The mount of claim 38 wherein each side mount has an upper inwardly directed edge.

43. The mount of claim 38 wherein the mount is made of a single piece of material.

44. The mount of claim 38 further comprising
at least one rigid handling apparatus formed of or connected to the body.

45. A mount for a screen assembly for a vibratory separator, the mount for holding screening material of the screen assembly, the mount comprising
- a body with a bottom part,
- a side part extending up from and connected to the bottom part,
- a top part connected to the side part,
- a top lip formed by overlapping portions of the body,
- a bottom lip formed by overlapping portions of the top part and bottom part,
- a space defined between the top part, the side part, and the bottom part, said space suitable for the passage therethrough of a portion of screening material,
- the overlapping portions of the bottom lip spaced-apart for the passage therethrough of a portion of the screening material,
- seal structure on an exterior of each side mount for sealing a side mount/screen holding apparatus interface, and
- handle apparatus formed of the seal structure.

46. The mount of claim 45 wherein the handle apparatus comprises at least one cut out portion of the seal structure.

47. The mount of claim 45 wherein the handle apparatus comprises an upwardly projecting portion of the seal structure formed integrally of or connected to the seal structure.

48. The mount of claim 45 further comprising
the body having two sealed spaced-apart end openings.

49. A mount for a screen assembly for a vibratory separator, the mount for holding screening material of the screen assembly, the mount comprising
- a body with a bottom part,
- a side part extending up from and connected to the bottom part, the side part made of side part material,
- a top part connected to the side part,
- a top lip formed by overlapping portions of the body,
- a bottom lip formed by overlapping portions of the top part and bottom part,
- a space defined between the top part, the side part, and the bottom part, said space suitable for the passage therethrough of a portion of screening material,
- the overlapping portions of the bottom lip spaced-apart for the passage therethrough of a portion of the screening material, and
- handle apparatus formed of the side part, the handle apparatus made of side part material and formed integrally of the side part.

50. The mount of claim 49 further comprising
the body having two sealed spaced-apart end openings.

51. A mount for a screen assembly for a vibratory separator, the mount for holding screening material of the screen assembly, the mount comprising
- a body with a bottom part and a side part,
- the side part extending up from the bottom part,
- the body and the side part made of rigid material,
- handle apparatus on the side part, the handle apparatus made of rigid material and rigidly connected to or formed integrally of the side part.

52. The mount of claim 51 wherein the handle apparatus comprises at least one handle formed of the body.

53. The mount of claim 51 wherein the handle apparatus comprises at least one cut out portion of the body.

54. The mount of claim 51 wherein the handle apparatus comprises at least one projection projecting from the body.

55. A method for making a screen assembly for a vibratory separator, the method comprising
- connecting together a plurality of layers of screening material,
- securing each of two opposed edge portions of the screening material within a side mount, each side mount comprising a bottom part, a side part extending up from and connected to the bottom part, a top part connected to the side part, a top lip formed by overlapping portions of the body, a bottom lip formed by overlapping portions of the top part and bottom part, a space defined between the top part, the side part, and the bottom part, said space suitable for the passage therethrough of screening material, and the overlapping portions of the bottom lip spaced-apart for the passage therethrough of a portion of the screening material.

56. The method of claim 55 wherein the layers of screening material are flexible and are glued together with hot melt glue.

57. A seal for installation on a screen assembly for sealing a screen-assembly/screen-holder interface in a vibratory separator, the seal comprising
- a body with a portion thereof connectable to the screen assembly, and handling apparatus on or through the body for facilitating handling of the screen assembly.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A mount for a screen assembly for a vibratory separator, the mount for holding screening material of the screen assembly, the mount comprising a body with a bottom part and a side part, the side part extending up from the bottom part, the side part having an upper portion, the bottom part having a series of holes for receiving projections of a screen mounting structure of a vibratory separator, the body and the side part made of rigid material, a seal member secured to the side part, the seal member having an elongated portion adjacent the side part and a seal upper portion, the seal member located for trapping between the body part and a side wall of a basket of a vibratory separator, and handle apparatus connected to and projecting from the seal member and located for manual access when the screen assembly is in an operational position on a vibratory separator.

2. The mount of claim 1 wherein the handle apparatus comprises at least one handle.

3. The mount of claim 2 wherein the at least one handle has two handle sides and a crosspart, each of the two handle sides having a first end connected to the seal member and a second end connected to the crosspart so that an opening is defined by the two handle sides and the crosspart.

4. The mount of claim 1 wherein the handle apparatus is rigid.

5. The mount of claim 2 wherein the at least one handle is "T" shaped and has a first part and a crosspart, the first part with a first end and a second end, the first end connected to the seal member, and the crosspart connected to the second end of the first part.

6. The mount of claim 1 wherein the handle apparatus is formed integrally with the seal member.

7. The mount of claim 6 wherein the handle apparatus is made of plastic.

8. The mount of claim 1 wherein the seal upper portion is circular in cross-section.

9. The mount of claim 1 wherein the seal upper portion is hollow.

10. The mount of claim 1 further comprising screening material connected to the mount body, the screening material comprising a plurality of layers of flexible screening material connected together.

11. The mount of claim 10 wherein the screening material is foldable into a roll.

12. A vibratory separator comprising container apparatus;

screen assembly apparatus removably secured in the container apparatus;

vibratory apparatus connected to the container apparatus for vibrating the container apparatus and the screen assembly apparatus;

mounting structure associated with the container apparatus, the mounting structure including a plurality of upward projections for holding a screen assembly by receipt within corresponding holes in the bottoms of side mounts of a screen assembly;

the screen assembly apparatus comprising screening material with opposed spaced-apart sides including a first screen side and a second screen side, two side mounts, one each of the two side mounts on each of the opposed spaced-apart screen sides;

each side mount comprising a body with a bottom part and a side part, the side part extending up from the bottom part, the side part having an upper portion, the bottom part having a series of holes for receiving the upward projections of the mounting structure, the body and the side part made of rigid material, a seal member secured to the side part, the seal member having an elongated portion adjacent the side part and a seal upper portion, the seal member located for trapping between the body part and a side wall of a basket of a vibratory separator, and handle apparatus connected to and projecting from the seal member and located for manual access when the screen assembly is in an operational position on a vibratory separator.

13. The vibratory separator of claim 12 wherein the handle apparatus is rigid.

14. The mount of claim 12 wherein the vibratory separator is a shale shaker.

15. The mount of claim 12 wherein the screening material is a plurality of layers of flexible screening material connected together and foldable into a roll.

16. A screen assembly for a vibratory separator, the screen assembly comprising screening material with opposed spaced-apart sides including a first side and a second side, two side mounts, one each of the two side mounts on each of the opposed spaced-apart sides, each side mount comprising a body with a bottom part and a side part, the side part having an upper portion, the side part extending up from the bottom part, the bottom part having a series of holes for receiving the upward projections of the mounting structure, the body and the side part made of rigid material, a seal member secured to the side part, the seal member having an elongated portion adjacent the side part and a seal upper portion, the seal member located for trapping between the body part and a side wall of a basket of a vibratory separator, and handle apparatus connected to and projecting from the seal member and located for manual access when the screen assembly is in an operational position on a vibratory separator.

17. The screen assembly of claim 16 wherein the handle apparatus comprises at least one handle formed of the seal member.

18. The screen assembly of claim 16 wherein the handle apparatus is rigid.

19. The screen assembly of claim 16 wherein the at least one handle has two handle sides and a crosspart, each of the two handle sides having a first end connected to the side part of the body and a second end connected to the crosspart so that an opening is defined by the two handle sides and the crosspart.

20. The mount of claim 16 wherein the screening material is a plurality of layers of flexible screening material connected together and foldable into a roll.

* * * * *